United States Patent
Ito et al.

(10) Patent No.: US 9,088,375 B2
(45) Date of Patent: Jul. 21, 2015

(54) APPARATUS, PROGRAM, AND METHOD FOR DISPLAYING CONTENT INFORMATION WHILE CONTROLLING DISPLAY AREA SIZES

(75) Inventors: Akihiko Ito, Tokyo (JP); Hiroaki Nakano, Kanagawa (JP); Shusuke Eshita, Tokyo (JP); Tetsuo Maruyama, Tokyo (JP); Kazuhiro Fukuda, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 568 days.

(21) Appl. No.: 12/748,914

(22) Filed: Mar. 29, 2010

(65) Prior Publication Data
US 2010/0186040 A1      Jul. 22, 2010

Related U.S. Application Data

(63) Continuation of application No. 10/896,681, filed on Jul. 22, 2004, now Pat. No. 7,703,041.

(30) Foreign Application Priority Data

Jul. 25, 2003    (JP) ............................... P2003-280505

(51) Int. Cl.
*G06F 3/048* (2013.01)
*H04H 60/82* (2008.01)
(Continued)

(52) U.S. Cl.
CPC ............... *H04H 60/82* (2013.01); *H04H 60/63* (2013.01); *H04H 60/72* (2013.01);
(Continued)

(58) Field of Classification Search
CPC ... G06F 3/048; G06F 3/0481; G06F 3/04817; H04N 5/445; H04N 5/4453; H04N 5/44591; H04N 5/44595; H04N 21/4316; H04N 21/482; H04N 21/4821; H04H 60/82; H04H 60/63; H04H 60/72

USPC ........ 715/853, 738, 837, 788; 725/37, 39, 40, 725/43
See application file for complete search history.

(56) References Cited

U.S. PATENT DOCUMENTS 5,513,342 A        4/1996  Leong et al.
5,714,971 A   *   2/1998  Shalit et al. .................... 715/804
(Continued)

FOREIGN PATENT DOCUMENTS

JP           10-17859       6/1998
JP           2000-270276    9/2000
(Continued)

OTHER PUBLICATIONS

English Language Abstract for Japanese Patent Laid-open No. Hei 10-17859.

*Primary Examiner* — Patrick Riegler
(74) *Attorney, Agent, or Firm* — Finnegan, Henderson, Farabow, Garrett & Dunner, L.L.P.

(57) ABSTRACT

A screen display apparatus for controlling the size each display area to appropriately display content information of each display area into one display screen. The screen display apparatus includes a selection accept block for accepting selection of first content information displayed in a first display area, a content information acquisition block for acquiring the content information associated with the selected first content information, this content information being second content information located on a layer below the first content information, and, in order to allocate a second display area for displaying the second content information to the display screen, a display area control block for controlling either or both of the first display area and the second display area.

18 Claims, 38 Drawing Sheets

(51) Int. Cl.
    *H04H 60/63* (2008.01)
    *H04H 60/72* (2008.01)
    *H04N 5/445* (2011.01)
    *H04N 21/431* (2011.01)
    *H04N 21/482* (2011.01)
    *G06F 3/0481* (2013.01)

(52) U.S. Cl.
    CPC ...... *H04N 5/44543* (2013.01); *H04N 5/44591* (2013.01); *H04N 21/4316* (2013.01); *H04N 21/482* (2013.01); *H04N 21/4821* (2013.01); *G06F 3/048* (2013.01); *G06F 3/0481* (2013.01); *G06F 3/04817* (2013.01)

(56) References Cited

U.S. PATENT DOCUMENTS

| | | | |
|---|---|---|---|
| 5,920,315 A * | 7/1999 | Santos-Gomez | 715/792 |
| 6,008,809 A | 12/1999 | Brooks | |
| 6,111,614 A | 8/2000 | Mugura et al. | |
| 6,147,714 A * | 11/2000 | Terasawa et al. | 348/564 |
| 6,177,931 B1 | 1/2001 | Alexander et al. | |
| 6,928,262 B1 * | 8/2005 | Kanemitsu | 455/3.06 |
| 6,966,033 B1 | 11/2005 | Gasser et al. | |
| 6,968,340 B1 * | 11/2005 | Knowles | 1/1 |
| 7,191,407 B1 | 3/2007 | Kluttz et al. | |
| 7,293,275 B1 * | 11/2007 | Krieger et al. | 725/40 |
| 7,363,593 B1 * | 4/2008 | Loyens et al. | 715/853 |
| 7,870,587 B2 * | 1/2011 | Ellis et al. | 725/60 |
| 8,006,262 B2 * | 8/2011 | Rodriguez et al. | 725/37 |
| 2002/0143662 A1 * | 10/2002 | Clark et al. | 705/27 |
| 2002/0196287 A1 * | 12/2002 | Taylor et al. | 345/792 |
| 2003/0018971 A1 * | 1/2003 | McKenna, Jr. | 725/40 |
| 2003/0149988 A1 | 8/2003 | Ellis et al. | |
| 2003/0184585 A1 | 10/2003 | Lin et al. | |
| 2003/0222922 A1 * | 12/2003 | Rummel | 345/789 |
| 2004/0025112 A1 | 2/2004 | Chasen et al. | |
| 2004/0055007 A1 | 3/2004 | Allport | |
| 2004/0139465 A1 * | 7/2004 | Matthews et al. | 725/51 |
| 2004/0226042 A1 | 11/2004 | Ellis | |
| 2004/0268232 A1 * | 12/2004 | Tunning | 715/513 |
| 2005/0005236 A1 | 1/2005 | Brown et al. | |
| 2007/0101300 A1 | 5/2007 | Rodden et al. | |

FOREIGN PATENT DOCUMENTS

| | | |
|---|---|---|
| JP | 2002-073234 | 3/2002 |
| JP | 2002-288199 | 10/2002 |
| JP | 2002-374506 | 12/2002 |
| JP | 2003-141073 | 5/2003 |

* cited by examiner

FIG. 3

| TV PROGRAMS | FIRST DISPLAY AREA | | | SECOND DISPLAY AREA |
|---|---|---|---|---|
| | STATION A | STATION B | STATION C | ECG |
| 19 | 00 NEWS 7 [BILINGUAL][CAPTION] HIROMI ITOH  TIMER RECORDING<br>20 MY TREASURE VIDEO QUIZ [S][CAPTION] —MEMORIAL STAMPS OF 60'S  600 TIMER RECORDING | 00 THUNDER "KISHIRO IN CRISIS" [BILINGUAL][CAPTION] [REBROADCAST]  TIMER RECORDING<br>25 FUNNY ISLAND "VICIOUS PIRATES (12)" [BILINGUAL][CAPTION][REBROADCAST]  TIMER RECORDING<br>45 SIGN LANGUAGE NEWS  TIMER RECORDING | 55 DASH! [S] RUN FOR IWATE PREFECTURE! TRAVELING AROUND JAPAN ON A SOLAR CAR ▽THE SHIGEKO FAMILY MOVING HOUSE! THIS IS HOW SHIGEKO REFORMED HER HOUSE (SUBJECT TO CHANGE)  600 TIMER RECORDING | CONTENTS<br><br>DRAMA "MUSASHI"<br><br>THE 28TH STORY (ON AIR JULY 13) "FRAGILE LOVE"<br><br>SEVERAL MONTHS HAVE PASSED SINCE THE RECOVERY OF OTSU (ACTED BY KURA RYOKO) FROM HER ILLNESS. MUSASHI (ACTED BY KAWA SHINNOSUKE) AND OTSU WERE LIVING A PEACEFUL LIFE FOR THE FIRST TIME IN THEIR LIFE, EARNING THEIR KEEP BY TEACHING NEIGHBORHOOD CHILDREN. |
| 20 | 00 MUSASHI "INVITED BY THE YAGYU FAMILY" [S][CAPTION] KAWA SHINNOSUKE  600-1  600  TIMER RECORDING<br>45 NEWS/WEATHER FORECAST  TIMER RECORDING | 00 NEW SUNDAY ART "KAWANABE GYOSAI, PAINTER LOVED BY FOREIGNERS" ▽FLOURISHED IN LATE EDO PERIOD AS PAINTER OF KANO SCHOOL  600  TIMER RECORDING | 58 RESEARCH 200X-II UNBELIEVABLE DIETING BASED ON COOLER SHEET ▽JUST ATTACH ▽HOMICIDE COMMITTED BY AN AFFECTIONATE NURSE  600  TIMER RECORDING | |
| 21 | 00 SPECIAL "WORKER SUPPLY CONTINENTS INDIA AND AFRICA" [S][CAPTION] GLOBAL MARKET : BATTLES FOR WEALTH  600  TIMER RECORDING<br>50 SUNDAY SPORTS  TIMER RECORDING | 00 REMINDFUL SUBLIME PERFORMANCE "PIANO PLAYER OF EXCEPTIONAL TALENT, FRIEDRICH GULDA RECITAL" [S] BEETHOVEN "PIANO SONATA A FLAT MAJOR OPUS 100" ETC.  600  TIMER RECORDING | 54 NEWS SPOT  TIMER RECORDING | |

| TV PROGRAMS | FIRST DISPLAY AREA | | | | SECOND DISPLAY AREA | |
|---|---|---|---|---|---|---|
| | STATION A | STATION B | STATION C | | CONTENTS | ECG |
| 19 | 00 NEWS 7 [BILINGUAL][CAPTION] HIROMI ITOH  [TIMER RECORDING]  20 MY TREASURE VIDEO QUIZ [S][CAPTION] —MEMORIAL STAMPS OF 60'S  600-2  600 [TIMER RECORDING] | 00 THUNDER "KISHIRO IN CRISIS" [BILINGUAL][CAPTION] [REBROADCAST]  [TIMER RECORDING]  25 FUNNY ISLAND "VICIOUS PIRATES (12)" [BILINGUAL] [CAPTION] [REBROADCAST]  [TIMER RECORDING]  45 SIGN LANGUAGE NEWS  [TIMER RECORDING] | 55 DASH! [S] RUN FOR IWATE PREFECTURE! TRAVELING AROUND JAPAN ON A SOLAR CAR ▽THE SHIGEKO FAMILY MOVING HOUSE! THIS IS HOW SHIGEKO REFORMED HER HOUSE (SUBJECT TO CHANGE)  600  [TIMER RECORDING] | | PROGRAM | DRAMA "MUSASHI" |
| 20 | 00 MUSASHI "INVITED BY THE YAGYU FAMILY" [S][CAPTION] KAWA SHINNOSUKE SHINICHI  600  [TIMER RECORDING]  45 NEWS/WEATHER FORECAST  [TIMER RECORDING] | 00 NEW SUNDAY ART "KAWANABE GYOSAI, PAINTER LOVED BY FOREIGNERS" ▽FLOURISHED IN LATE EDO PERIOD AS PAINTER OF KANO SCHOOL  600  [TIMER RECORDING] | 58 RESEARCH 200X-II UNBELIEVABLE DIETING BASED ON COOLER SHEET ▽JUST ATTACH ▽HOMICIDE COMMITTED BY AN AFFECTIONATE NURSE  600  [TIMER RECORDING] | | CAST | MIYAMOTO MUSASHI — 603-1<br>KAWA SHINNOSUKE<br>OTSU — 603-2<br>KURA RYOKO<br>HONIDEN MATAHACHI — 603-3<br>SHINICHI<br>OSHINO — 603-4<br>SAWA RIE<br>AKEMI — 603-5<br>YAMA RINA<br>YAE/KOTO — 603-6<br>MAAO NORIE<br>TAKUAN — 603-7<br>SE TSUNEHIKO<br>OSUGI — 603-8<br>MURA TAMAO |
| 21 | 00 SPECIAL "WORKER SUPPLY CONTINENTS INDIA AND AFRICA" [S][CAPTION] GLOBAL MARKET BATTLES FOR WEALTH  [TIMER RECORDING]  50 SUNDAY SPORTS  [TIMER RECORDING] | 00 REMINDFUL SUBLIME PERFORMANCE "PIANO PLAYER OF EXCEPTIONAL TALENT, FRIEDRICH GULDA RECITAL" [S] BEETHOVEN "PIANO SONATA A FLAT MAJOR OPUS 100" ETC.  600  [TIMER RECORDING] | 54 NEWS SPOT  [TIMER RECORDING] | | | |

| TV PROGRAMS | FIRST DISPLAY AREA | | SECOND DISPLAY AREA | | THIRD DISPLAY AREA | | ECG |
|---|---|---|---|---|---|---|---|
| | STATION A | | CONTENTS | | | | |
| 19 | 00 NEWS 7 [BILINGUAL][CAPTION] HIROMI ITOH [TIMER RECORDING] 20 MY TREASURE VIDEO QUIZ [S][CAPTION] -MEMORIAL STAMPS OF 60'S 600 [TIMER RECORDING] | | PROGRAM | DRAMA "MUSASHI" | MUSASHI [S][CAPTION] /THE 26TH STORY "INVITED BY THE YAGYU FAMILY" STATION A 2003/06/15(SUN) 20:00-2003/06/15 20:45 ORIGINAL PIECE:YOSHIKAWA EI "MUSASHI" SCRIPT:KAMATA TOSHI | | |
| 20 | 00 MUSASHI "INVITED BY THE YAGYU FAMILY" [S][CAPTION] KAWA SHINNOSUKE SHINICHI 600 [TIMER RECORDING] 45 NEWS/WEATHER FORECAST [TIMER RECORDING] | | CAST | MIYAMOTO MUSASHI KAWA SHINNOSUKE OTSU 602 KURA RYOKO HONIDEN MATAHACHI SHINICHI OSHINO SAWA RIE AKEMI YAMA RINA YAE/KOTO MAAO NORIE TAKUAN SE TSUNEHIKO OSUGI MURA TAMAO | OTSU KURA RYOKO AUGUST 21,1992 RECEIVED JUDGE SPECIAL AWARD IN "THE 8TH ALL JAPAN BEAUTIFUL GIRL CONTEST" NOVEMBER 2002 RECEIVED "BEST HAIR STYLE AWARD IN 2002" DRAMA STATION A(SUN) 20:00-/ REBROADCAST (SAT) 13:05 STATION Z(SUN) 22:00- | | |
| 21 | 00 SPECIAL "WORKER SUPPLY CONTINENTS INDIA AND AFRICA" [S][CAPTION] GLOBAL MARKET: BATTLES FOR WEALTH [TIMER RECORDING] 600 50 SUNDAY SPORTS [TIMER RECORDING] | | RONSOKU WEB SITE | | | CD/DVD 600-3 CD1 SALE 600-4 CD2 SALE | BOOK/HOBBY 600-5 BOOK1 SALE 600-6 BOOK2 SALE | ITEM |

| TV PROGRAMS | FIRST DISPLAY AREA | | SECOND DISPLAY AREA | THIRD DISPLAY AREA | EPG |
|---|---|---|---|---|---|
| | STATION A | | CONTENTS | | |
| 19 | 00 NEWS 7 [BILINGUAL][CAPTION] HIROMI ITOH [TIMER RECORDING] 20 MY TREASURE VIDEO QUIZ [S][CAPTION] -MEMORIAL STAMPS OF 60'S ⊙ 🔍 600 [TIMER RECORDING] | | PROGRAM DRAMA "MUSASHI" | MUSASHI [S][CAPTION] /THE 26TH STORY "INVITED BY THE YAGYU FAMILY" STATION A.2003/06/15(SUN)20:00–2003/06/15 20:45 ORIGINAL PIECE:YOSHIKAWA EI "MUSASHI" SCRIPT:KAMATA TOSHI | |
| | | | CAST | | |
| 20 | 00 MUSASHI "INVITED BY THE YAGYU FAMILY" [S][CAPTION] KAWA SHINNOSUKE 🔍⊙◇ 600 [TIMER RECORDING] 45 NEWS/WEATHER FORECAST [TIMER RECORDING] | | BOOK NEW MUSASHI 602 ↘ | YOSHIKAWA EI "NEW MUSASHI" ACTUALLY, HOW MUSASHI AND SASAKI JIRO FOUGHT EACH OTHER IN GANRYU ISLAND | |
| | | | BOOK MUSASHI | | |
| | | | COMICS BAKABOND | | |
| 21 | 00 SPECIAL "WORKER SUPPLY CONTINENTS INDIA AND AFRICA" [S][CAPTION] GLOBAL MARKET: BATTLES FOR WEALTH 📱 600 [TIMER RECORDING] 50 SUNDAY SPORTS [TIMER RECORDING] | | BOOK MUSASHI THE STORY OF WIND (4) | | |
| | | | | RONSOKU WEB SITE | |
| | | | | CD/DVD | BOOK/HOBBY | ITEM |
| | | | | 600-8 [CD3 SALE] 600-9 [CD4 SALE] | 600-10 [BOOK3 SALE] | |

508

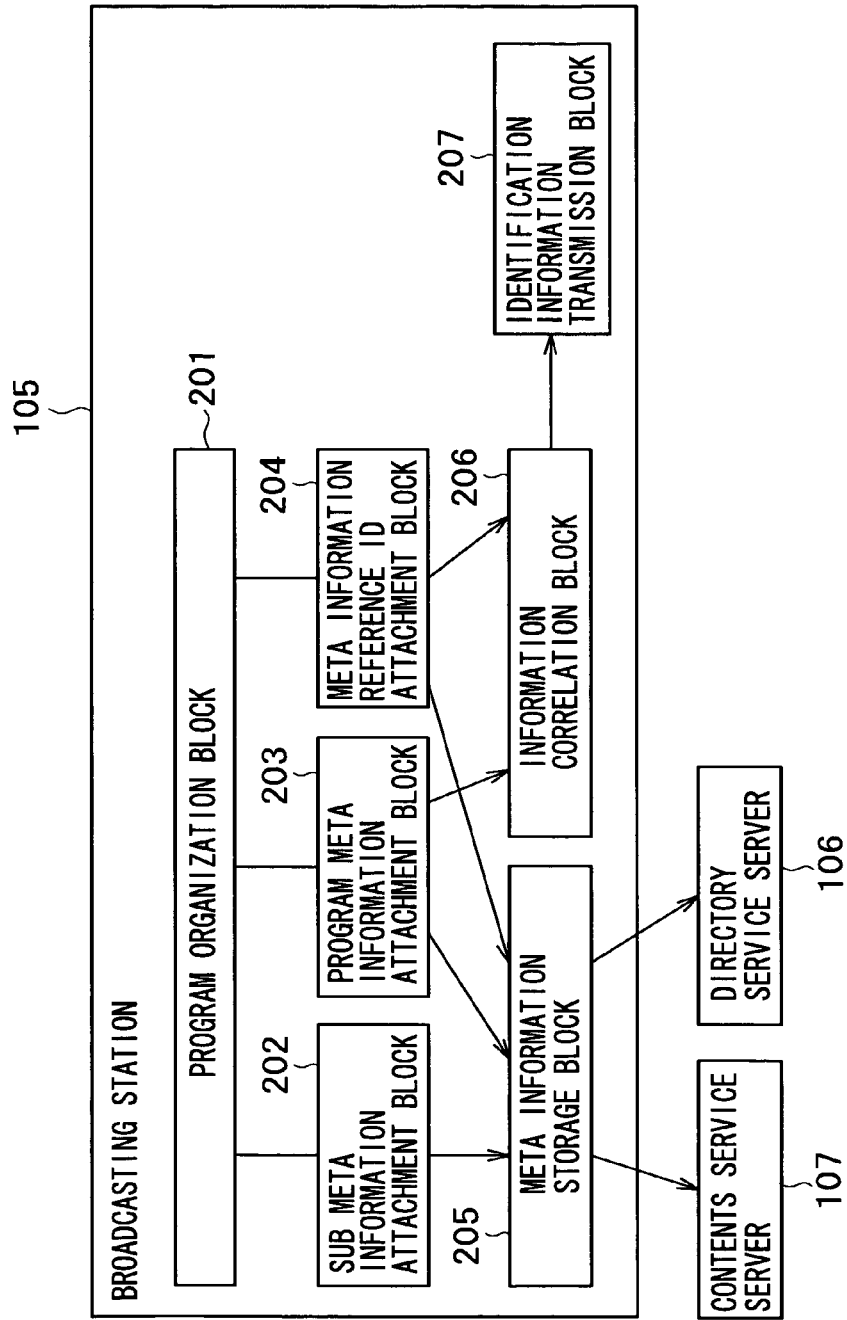

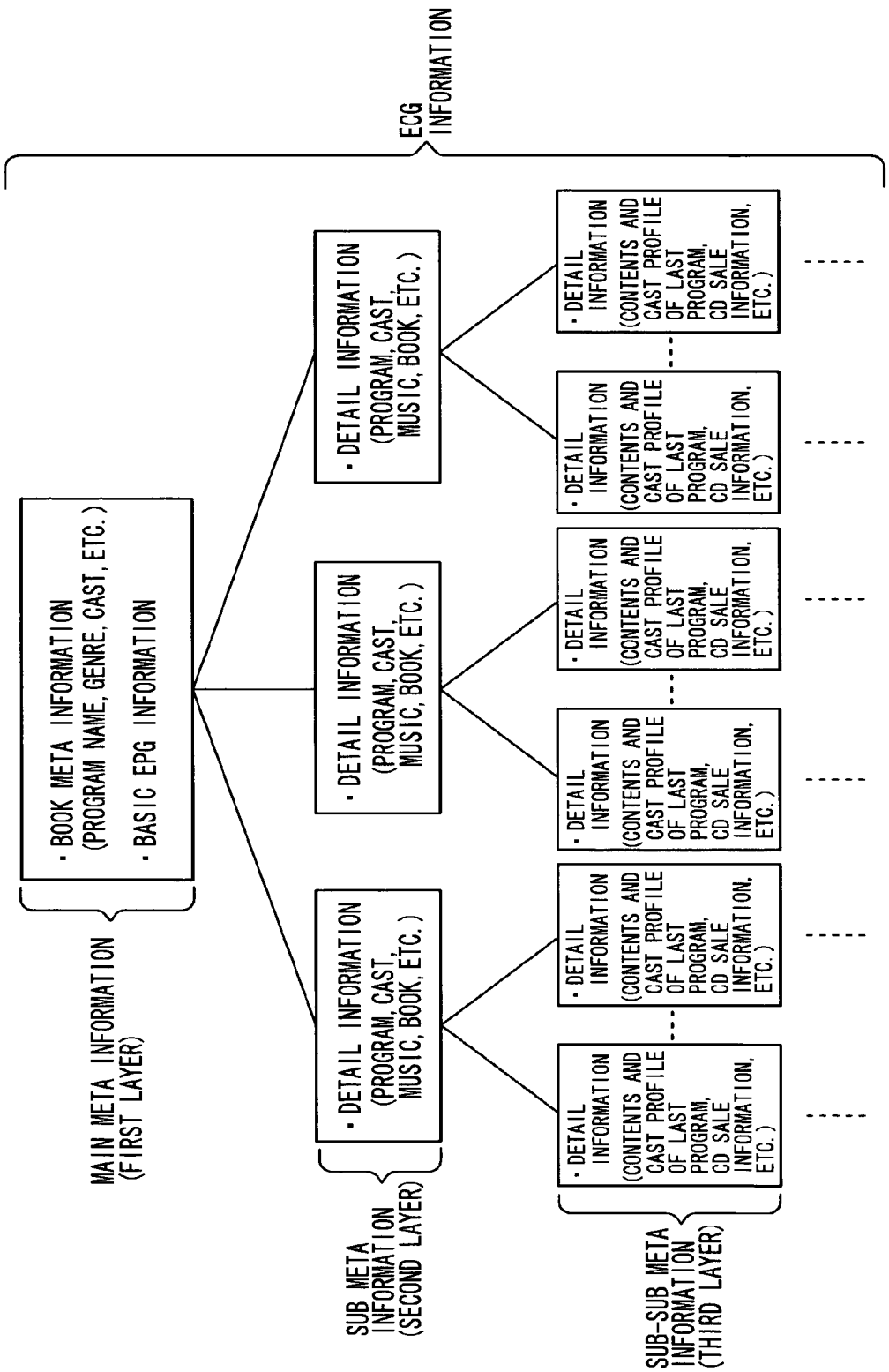

FIG. 10A

PROGRAM META INFORMATION

- PROGRAM NAME ⎫
- GENRE (DRAMA, MUSIC, VARIETY…) ⎬ ASSOCIATED WITH PROGRAM
- BROADCAST TIME (START TIME, END TIME) ⎭
- NAME, ABBREVIATED NAME ⎫
  (KIMURO TAKUYA, KIMUTA…) ⎪
- GENRE (ACTOR, SINGER, COMEDIAN…) ⎬ ASSOCIATED WITH CAST
- AGENCY ⎭
- META INFORMATION VERSION ⎫
- UPDATABILITY ⎬ ASSOCIATED WITH CONTROL
- UPDATE TIMING ⎭
  ⋮

FIG. 10B

SUB META INFORMATION

- MUSIC TITLE ⎫
- ARTIST NAME ⎪
- RECORD COMPANY ⎬ ASSOCIATED WITH MUSIC
- MUSIC SALE SITE URL ⎭
- STORE NAME ⎫ ASSOCIATED WITH STORE
- ADDRESS ⎭
- PRODUCT NAME ⎫ ASSOCIATED WITH PRODUCT
- GOODS SALE SITE URL ⎭
- URL OF SITE TO WHICH USER ⎫ ASSOCIATED WITH INDUCEMENT
  ACCESS IS DESIRED ⎭
  ⋮

F I G. 1 2

```
<BROADCASTING STATION STATION ID= "TPS" >
    <PROGRAM PROGRAM NAME="GUTTOLAKU",
     META INFORMATION REFERENCE ID="A-1", ···>
    <PROGRAM PROGRAM NAME="OUTABAN",
     META INFORMATION REFERENCE ID="A-2", ···>
    <PROGRAM···>
</BROADCASTING STATION>
<BROADCASTING STATION STATION ID= "BUSHI TV" >
    <PROGRAM PROGRAM NAME="PRO BASEBALL",
     META INFORMATION REFERENCE ID="B-1", ···>
    <PROGRAM···>
</BROADCASTING STATION>
```

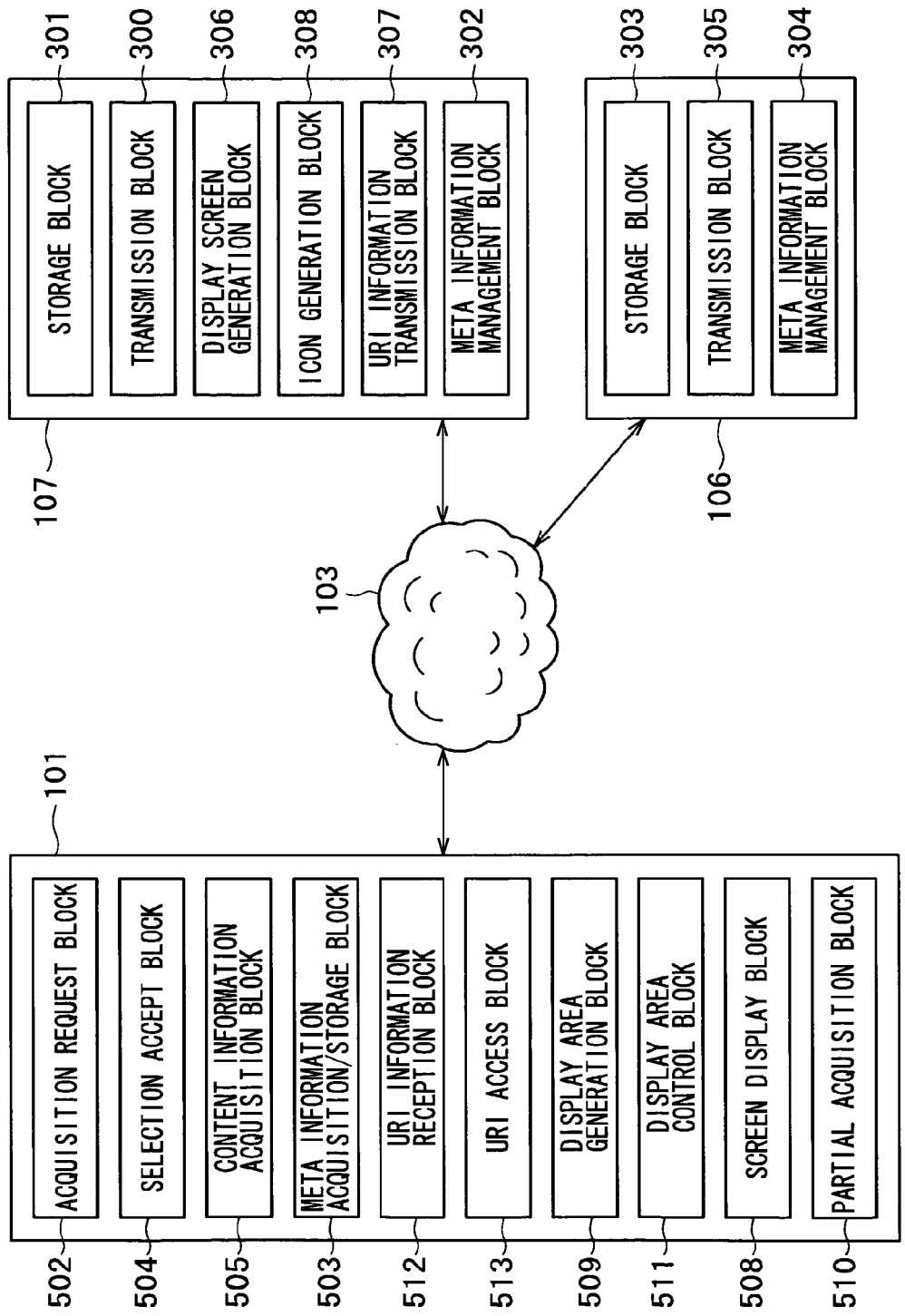

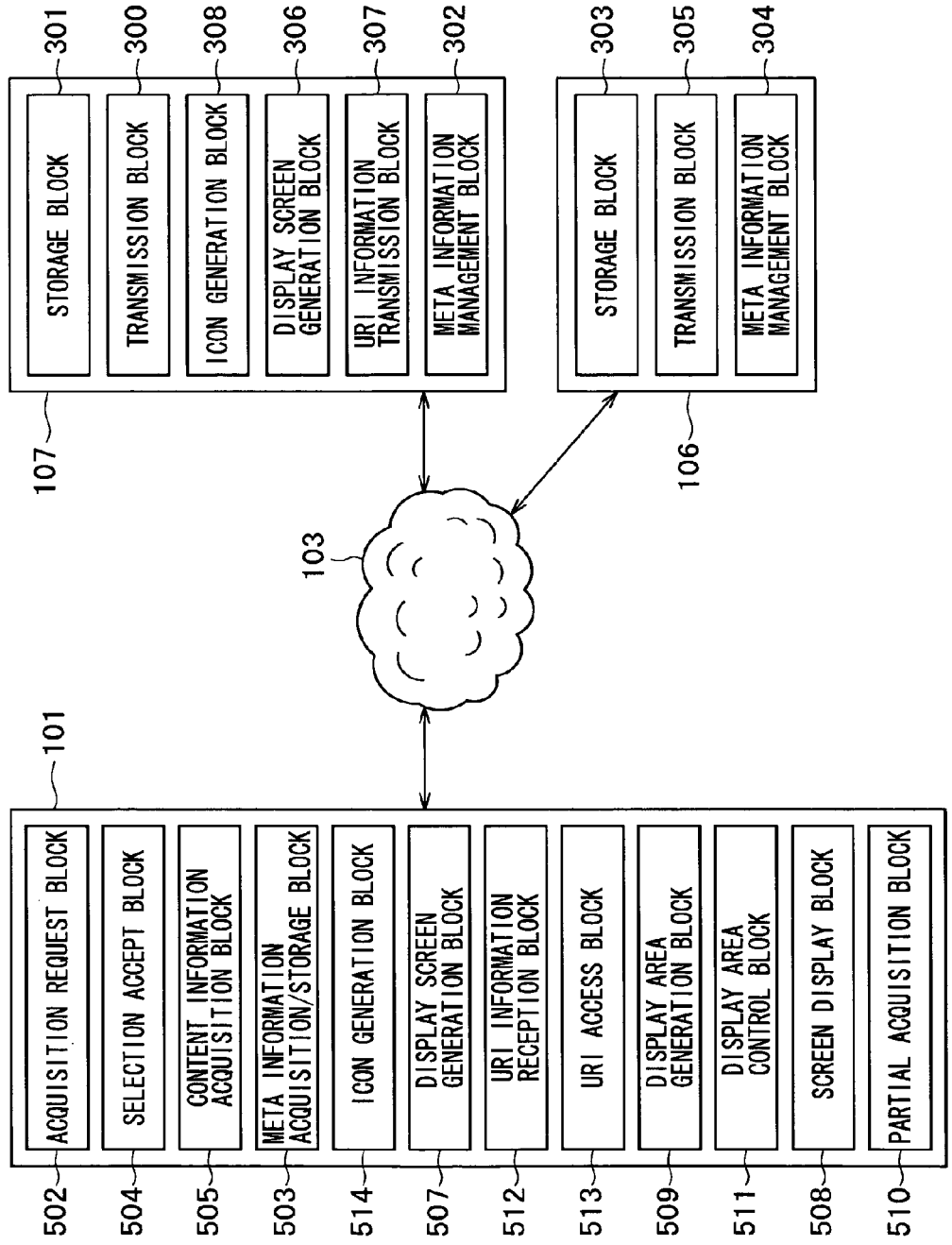

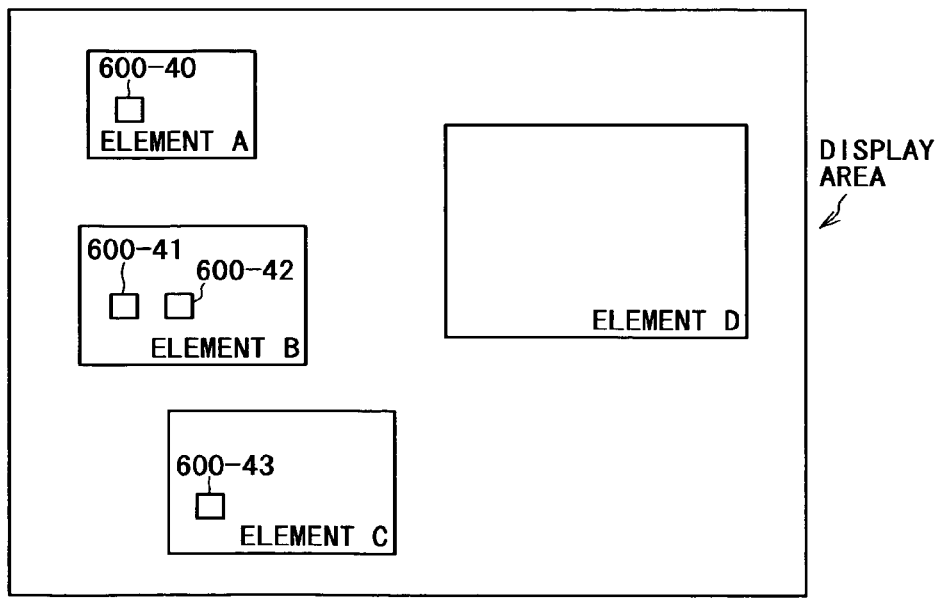

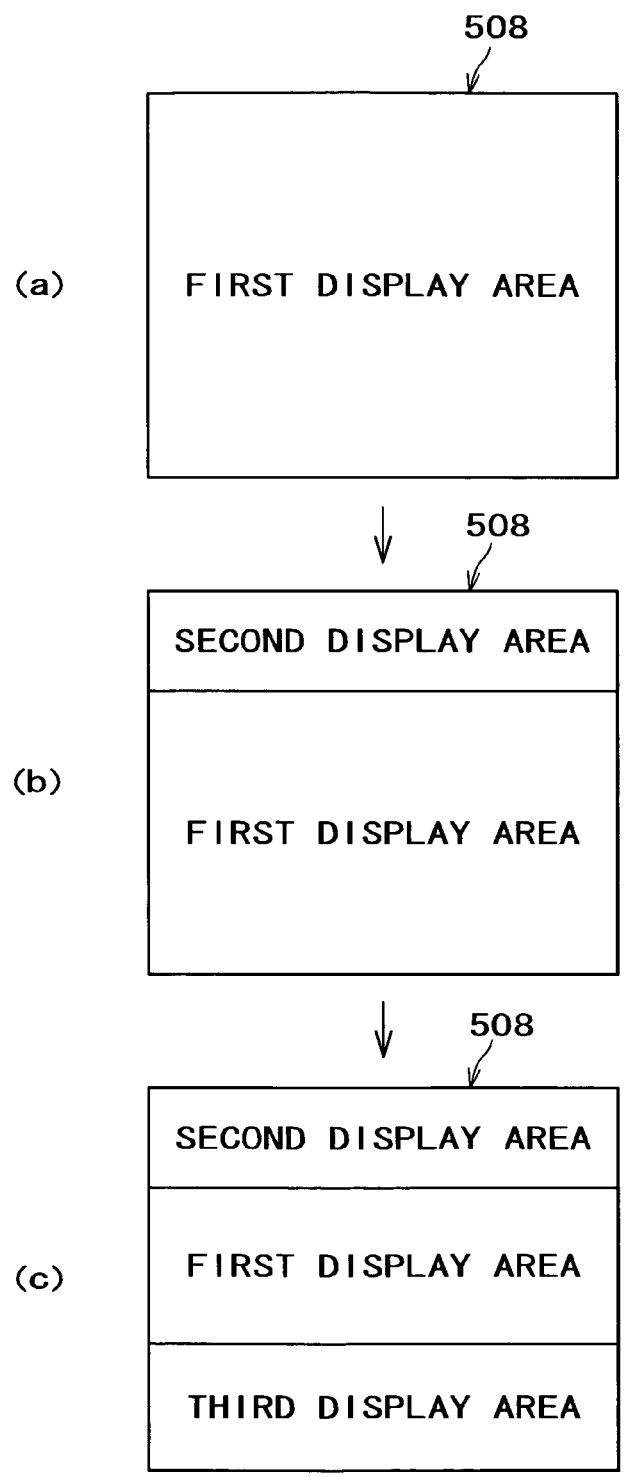

F I G. 1 8 E
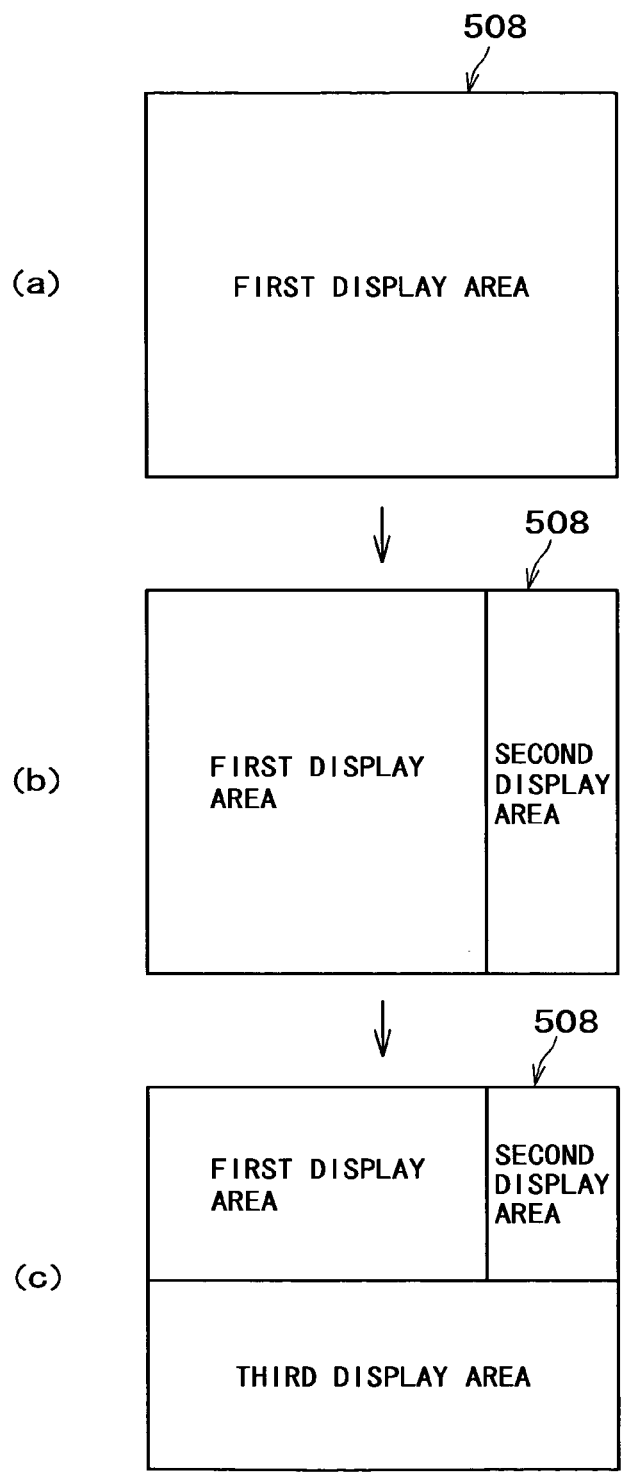

FIG. 19A

| | STATION A | STATION B | STATION C |
|---|---|---|---|
| 19 | | PROGRAM B1 | |
| 20 | PROGRAM A1 / PROGRAM A2 | PROGRAM B2 | PROGRAM C1 / PROGRAM C2 |
| 21 | | | |

FIRST DISPLAY AREA (rows 20, and partial 19/21 — dashed outline) — 508

FIG. 19B

| | STATION A | STATION B | STATION C |
|---|---|---|---|
| 20 | PROGRAM A1 / PROGRAM A2 | PROGRAM B2 | PROGRAM C1 / PROGRAM C2 |

FIRST DISPLAY AREA — 508

DETAIL INFORMATION OF PROGRAM B2 IS DISPLAYED (SECOND DISPLAY AREA)

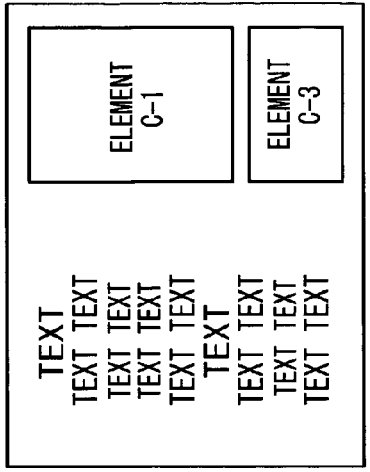
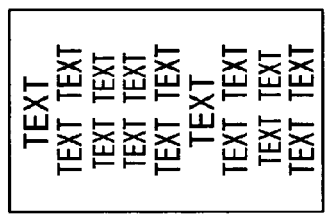
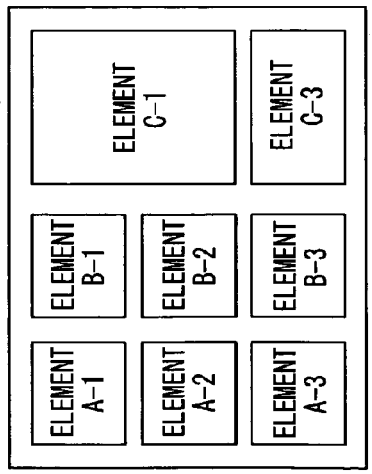
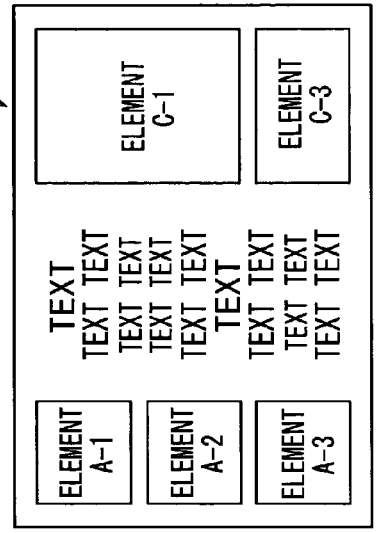
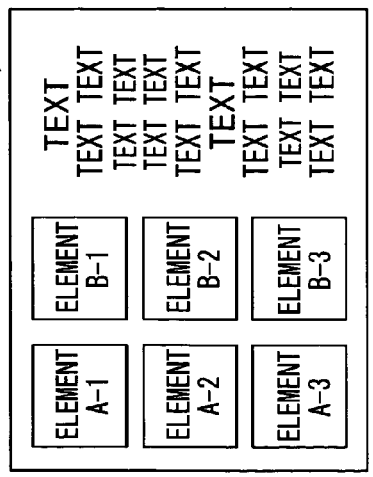

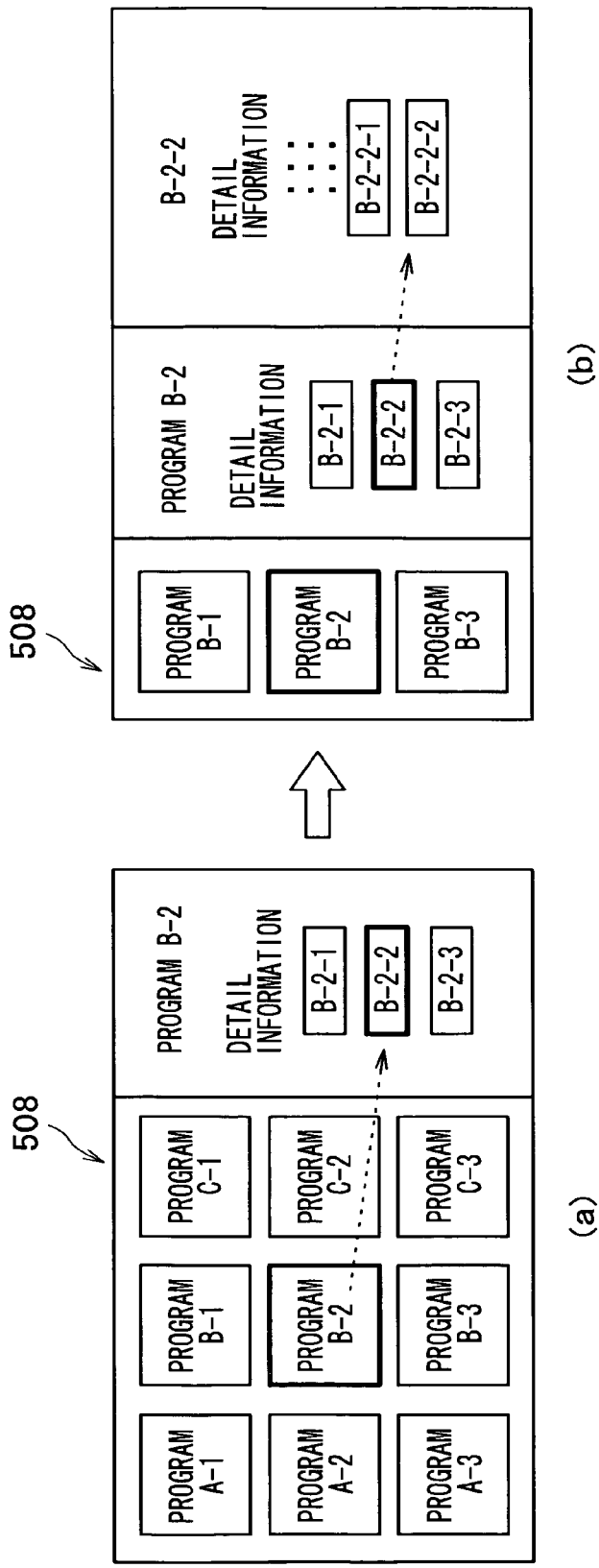

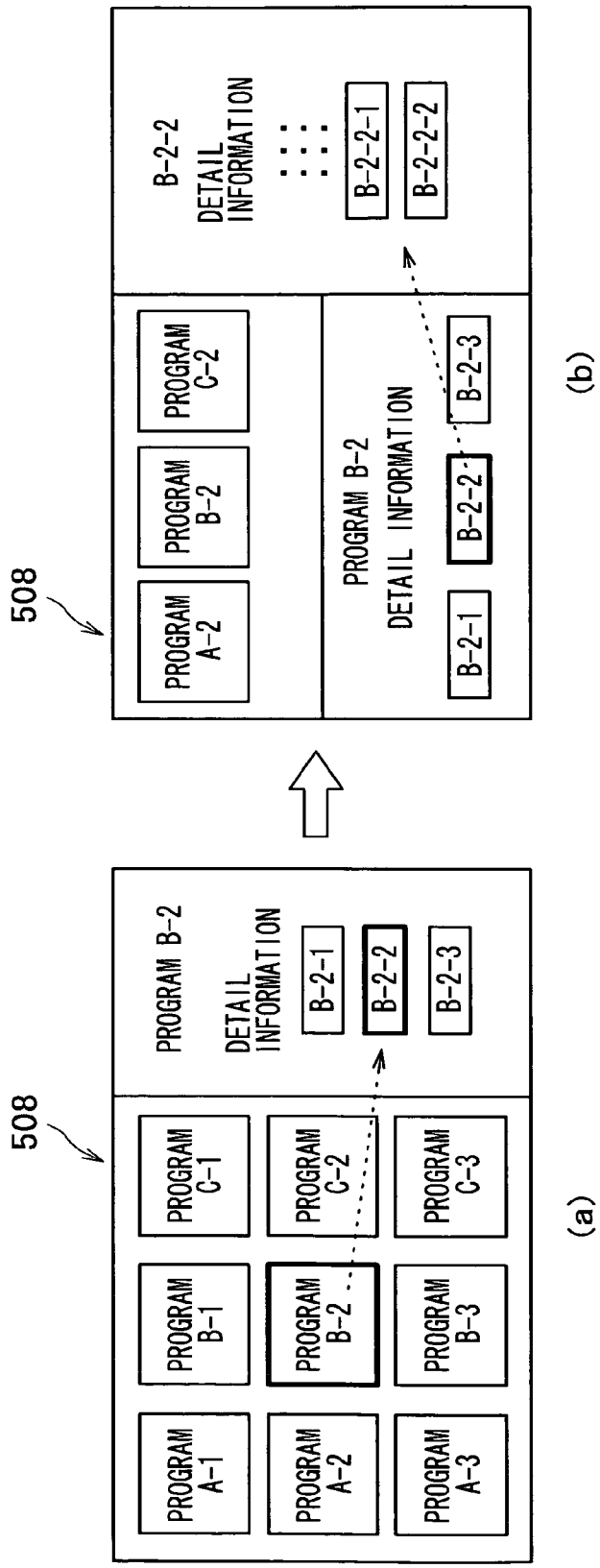

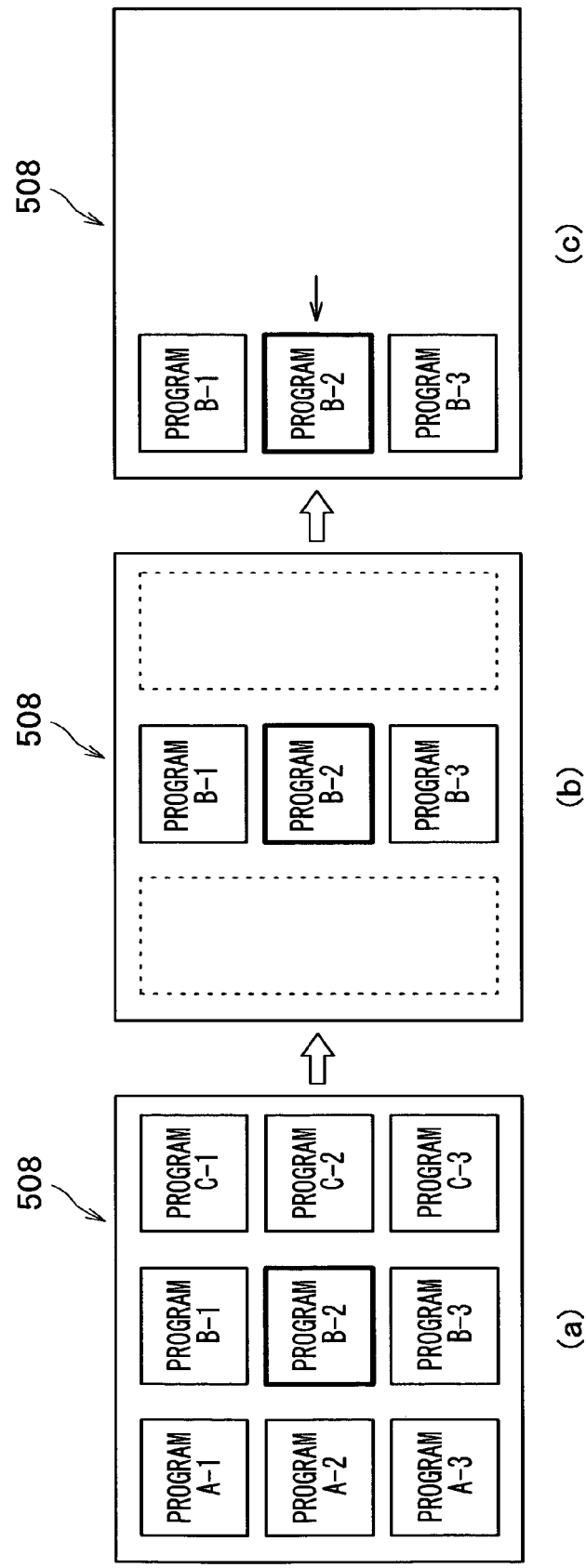

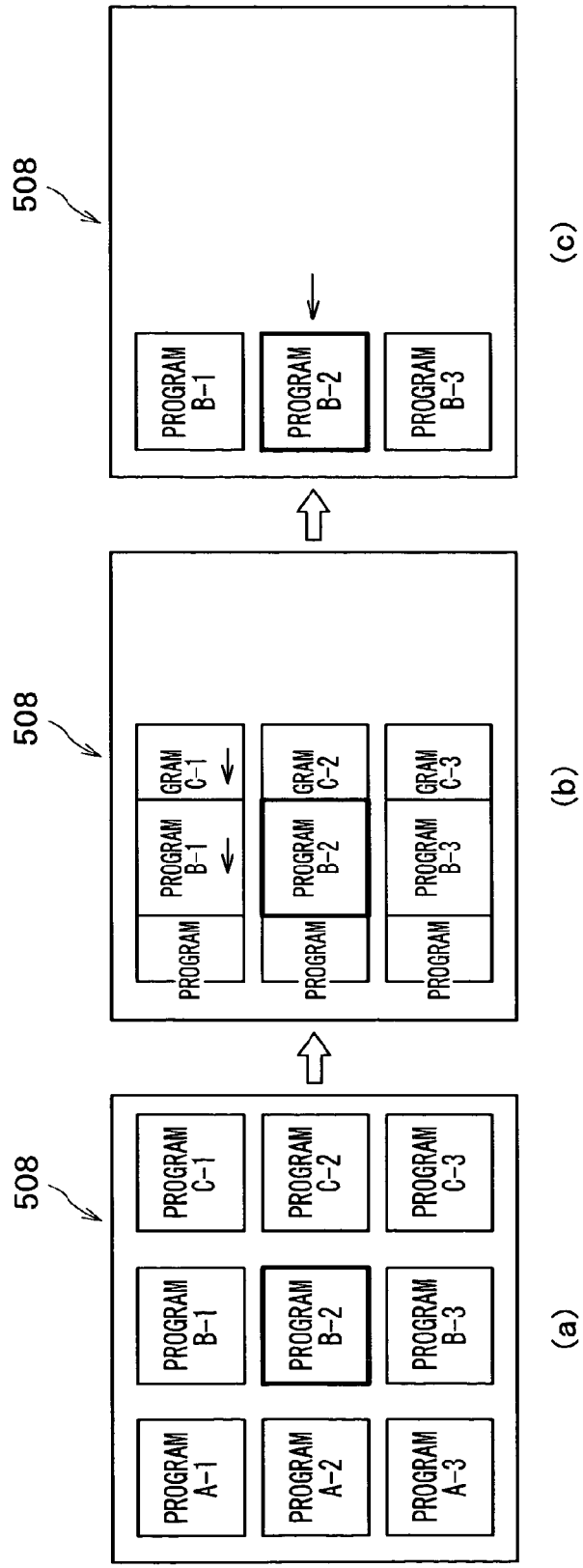

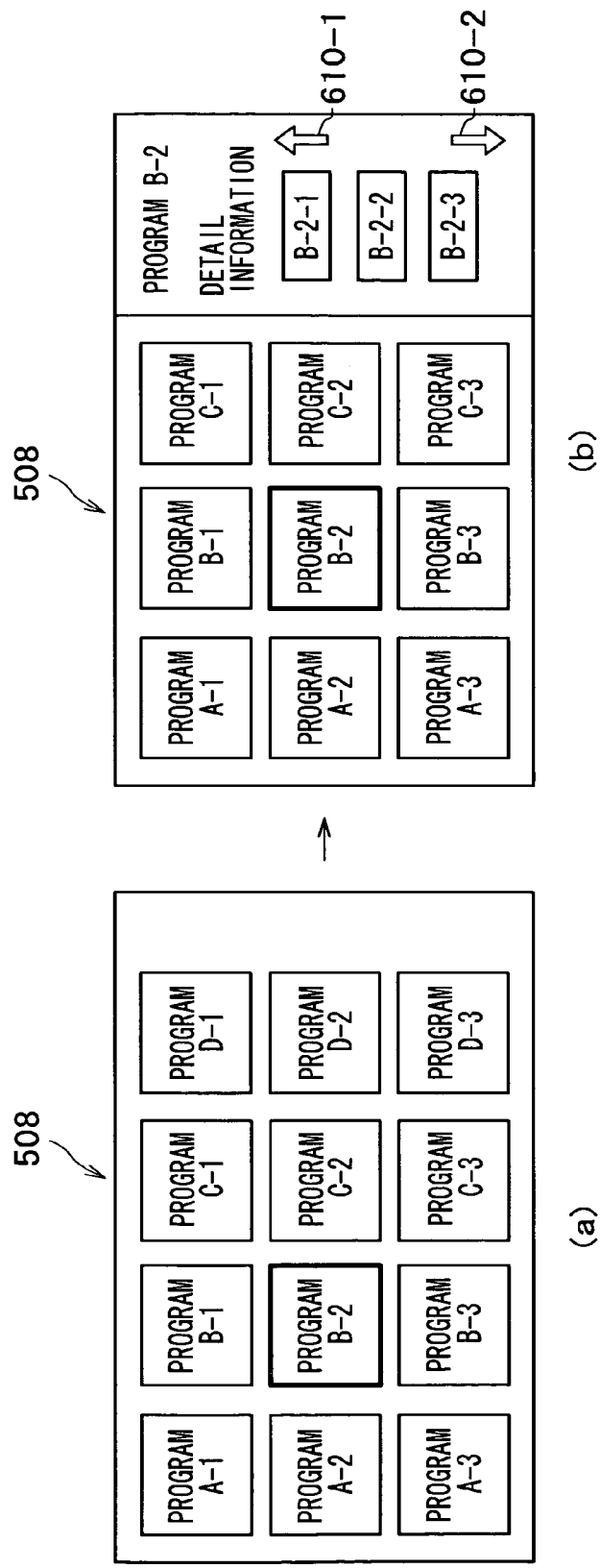

APPARATUS, PROGRAM, AND METHOD FOR DISPLAYING CONTENT INFORMATION WHILE CONTROLLING DISPLAY AREA SIZES

This is a continuation of application Ser. No. 10/896,681, filed Jul. 22, 2004, now U.S. Pat. No. 7,703,041 now allowed, which claims the priority of Japanese Application No. 2003-280505, filed Jul. 25, 2003 in Japan, both of which are incorporated herein by reference.

BACKGROUND OF THE INVENTION

The present invention relates generally to a screen display apparatus for displaying content information on a display screen.

It is known that there exist display apparatuses for displaying various kinds of content information such as EPG information and product catalog information in addition to broadcast programs. The display screen of each of these display apparatuses has one or more display areas for displaying content information.

The display areas assigned to the above-mentioned display screen display a broadcast program, EPG information, product catalog information, and other content information (for example, refer to patent document 1 below). It should be noted that the technical document information associated with the present invention includes the following:
[Patent document 1]
Japanese Patent Laid-open No. Hei 10-178597

However, with the above-mentioned related art technology, the layout of the display areas on the display screen in which information is displayed is predetermined and therefore the sizes of these display areas do not change in accordance with the size of information to be displayed changes. Consequently, the above-mentioned related-art technology cannot ensure the proper display of content information in each display area, making it necessary to scroll the display screen for the full viewing of content information. This, however, presents a problem of making it difficult for the user to understand the correlation between the content information displayed in one display area and the content information displayed in another.

SUMMARY OF THE INVENTION

It is therefore an object of the present invention to provide a novel and improved screen display apparatus capable of controlling the size of each of display areas on the display screen of the screen display apparatus to properly display content information of these display areas within the display screen.

In carrying out the invention and according to one aspect thereof, there is provided a screen display apparatus for displaying at least one piece of content information onto a display area in a display screen, including: a selection accept block for accepting selection of first content information displayed in a first display area; a content information acquisition block for acquiring content information associated with the selected first content information, the content information being second content information located on a layer below the first content information; and a display area control block for controlling at least one of the first display area and the second display area in order to allocate a second display area for displaying the second content information to the display screen.

According to the invention, the display screen shows one or more pieces of content information. When a piece of content information is shown in one display area is selected, the information associated with the selected content information is shown at least one of other display areas. This novel configuration facilitates the understanding of correlation between plural pieces of content information shown on the display screen by controlling the display areas allocated to the display screen. Also, this configuration significantly enhances the visual recognition of the plurality of content information shown on the display screen.

In the above-mentioned screen display apparatus, in accordance with an information amount of at least the second content information, the display control block can dynamically control at least one of the first display area and the second display area. This novel configuration allows the appropriate understanding of the second content information shown in the second display area as well as the understanding of the association between this second content information and the first content information shown in the first display area.

In the above-mentioned screen display apparatus, the display area control block may control the size of one or both of the first display area and the second display area or reduce the size of one or both of the first display area and the second display area.

In the above-mentioned screen display apparatus, the display area control block may control the size of one or both of the first display area and the second display area so as to allocate the first display area and the second display area into the display screen.

In the above-mentioned screen display apparatus, the display screen may display the first display area and the second display area in a layered manner.

In the above-mentioned screen display apparatus, the first display area and the second display area may be configured side by side without a space.

In the above-mentioned screen display apparatus, the content information may be configured in a layered manner on the basis of the degree of information detail or rarity.

In the above-mentioned screen display apparatus, the display control block may control the display area so as to display only a part of the content information onto the display area.

In the above-mentioned screen display apparatus, the content information may partially include the selected content information.

The above-mentioned screen display apparatus may further include a partial acquisition block for partially acquiring content information associated with a selected part of the content information.

In the above-mentioned screen display apparatus, the screen display block may display the partially selected part of the content information and the associated part acquired by the partial acquisition block onto the display area or the selected part of the content information and the content information of the associated part in the first display area in a layered manner.

In the above-mentioned screen display apparatus, the display area control block may control a pattern in which the display area changes in size or a pattern in which the display area changes in position.

In carrying out the invention and according to another aspect thereof, there is provided a computer program for making a computer function as a screen display apparatus for displaying at least one piece of content information onto a display area in a display screen, including: selection accept means for accepting selection of first content information displayed in a first display area; content information acquisition means for acquiring content information associated with the selected first content information, the content information being second content information located on a layer below the first content information; and display area control means for controlling at least one of the first display area and the second display area in order to allocate a second display area for displaying the second content information to the display screen.

In the above-mentioned computer program, in accordance with an information amount of at least the second content information, the display control means may dynamically control one or both of the first display area and the second display area.

In the above-mentioned computer program, the display area control means may control the size of one or both of the first display area and the second display area or reduce the size of one or both of the first display area and the second display area.

In the above-mentioned computer program, the display area control means may control the size of one or both of the first display area and the second display area so as to allocate the first display area and the second display area into the display screen.

In the above-mentioned computer program, the display screen may display the first display area and the second display area in a layered manner.

In the above-mentioned computer program, the display area control means may control the display area so as to display only a part of the content information onto the display area or reduce the display area. This novel configuration reduces the possibility of generating empty area.

In the above-mentioned computer program, the content information may partially include selected content information.

The above-mentioned computer program according further including: partial acquisition means for partially acquiring content information associated with a selected part of the content information.

In the above-mentioned computer program, the screen display means may display the partially selected part of the content and the associated part acquired by the partial acquisition block onto the display area.

In the above-mentioned computer program, the display area control means may control a pattern in which the display area changes in size or a pattern in which the display area changes in position.

In carrying out the invention and according to still another aspect thereof, there is provided a screen display method for displaying at least one piece of content information onto a display area in a display screen, including the steps of: accepting selection of first content information displayed in a first display area; acquiring content information associated with the selected first content information, the content information being second content information located on a layer below the first content information; and controlling at least one of the first display area and the second display area in order to allocate a second display area for displaying the second content information to the display screen.

In the above-mentioned screen display method, in accordance with an information amount of at least the second content information, the display control step may dynamically control one or both of the first display area and the second display area.

In the above-mentioned screen display method, the display area control step may control the size of one or both of the first display area and the second display area or reduce the size of one or both of the first display area and the second display area.

In the above-mentioned screen display method, the display area control step may control the size of one or both of the first display area and the second display area so as to allocate the first display area and the second display area into the display screen.

In the above-mentioned screen display method, the display screen may display the first display area and the second display area in a layered manner.

In the above-mentioned screen display method, the display control step may control the display area so as to display only a part of the content information onto the display area. This novel configuration reduces the possibility of generating empty area.

In the above-mentioned screen display method, the content information may partially include selected content information.

The above-mentioned screen display method may further include a partial acquisition step for partially acquiring content information associated with a selected part of the content information.

In the above-mentioned screen display method, the screen display step may display the partially selected part of the content and the associated part acquired by the partial acquisition step onto the display area.

In the above-mentioned screen display method, the display area control step may control a pattern in which the display area changes in size or a pattern in which the display area changes in position.

In carrying out the invention and according to yet another aspect thereof, there is provided a screen display method including the steps of: accepting the selection of content information displayed in a predetermined display area; and controlling the predetermined display area and a display area for displaying content information associated with selected content information, the associated content information being on a layer below the content information displayed in the predetermined display area.

In the above-mentioned screen display method, the predetermined display area and the display area for displaying the content information on a layer below the content information displayed in the predetermined display area may be displayed in one screen.

In the above-mentioned screen display method, in displaying the content information on a layer below the content information displayed in the predetermined display area, the controlling step may display only a part of the predetermined display area.

In the above-mentioned screen display method, a part of the predetermined display area may include selected content information.

In the above-mentioned screen display method, the controlling step may control the sizes of the predetermined display area and the display area for displaying the content on a layer below the content information displayed in the predetermined display area.

In the above-mentioned screen display method, the controlling step may reduce the display area or control the change in size of the display area which is displayed in one display screen.

As described and according to the invention, a plurality of display areas can be allocated to one display screen, in which, of the content information displayed in one of these display areas, the detail information and so on of a selected content element are displayed in another of these display area. Newly allocating display areas to the display screen allows to always display most detail content information in the display area of another layer, while making sure of the content information and so on of the upper layer.

In allocating a new display area, the existing displaying areas are moved in a sliding manner, thereby visually impressing the transition of display positions. This novel configuration facilitates the recognition of the association between the content information on the upper layer and the content information on the lower layer.

BRIEF DESCRIPTION OF THE DRAWINGS

These and other objects of the invention will be seen by reference to the description, taken in connection with the accompanying drawing, in which:

FIG. 3 is another diagram explaining the outline of control processing applied to a screen display apparatus practiced as another embodiment of the invention;

FIG. 4 is still another diagram explaining the outline of control processing applied to a screen display apparatus practiced as another embodiment of the invention;

FIG. 5 is yet another diagram explaining the outline of control processing applied to a screen display apparatus practiced as another embodiment of the invention;

FIG. 6 is a different diagram explaining the outline of control processing applied to a screen display apparatus practiced as another embodiment of the invention;

FIG. 7 is a still different diagram explaining the outline of control processing applied to a screen display apparatus practiced as another embodiment of the invention;

FIG. 8 is a block diagram illustrating an approximate configuration of broadcasting station practiced as still another embodiment of the invention;

FIG. 9 is a diagram illustrating an approximate data structure of ECG (Electronic Content Guide) information practiced as yet another embodiment of the invention;

FIGS. 10A and 10B are diagrams illustrating approximate meta information included in ECG information practiced as a different embodiment of the invention;

FIG. 12 is a diagram illustrating a data structure of EPG data practiced as one embodiment of the invention;

FIG. 13 is a first variation to the block diagram shown in FIG. 11;

FIG. 14 is a second variation to the block diagram shown in FIG. 11;

FIGS. 17A to 17E are diagrams illustrating approximate configurations of content elements to be displayed in display areas practiced as yet another embodiment of the invention;

FIGS. 18A to 18F are diagrams schematically illustrating a transition in which the above-mentioned display areas are allocated;

FIGS. 19A and 19B are diagrams schematically illustrating an allocation transition of display areas with EPG information displayed in a first display area practiced as a still different embodiment of the invention;

FIGS. 20A, 20B, 20C, and 20D are diagrams schematically illustrating an allocation transition of display areas with EPG information displayed in the first display area;

FIGS. 24A to 24E are diagrams schematically illustrating the processing of determining display areas practiced as yet different embodiment of the invention;

FIGS. 26A, 26B and 26C are diagrams schematically illustrating another transitional operation of the above-mentioned display areas;

FIGS. 27A and 27B are diagrams schematically illustrating a different transitional operation of the above-mentioned display areas; and FIGS. 28A and 28B are diagrams schematically illustrating the processing of allocating the above-mentioned display areas.

DETAILED DESCRIPTION OF PREFERRED EMBODIMENTS

This invention will be described in further detail by way of example with reference to the accompanying drawings. It should be noted that, in the following descriptions and drawings, components similar to those previously described are denoted by the same references for the brevity.

[Screen Display System]

Figure 1:
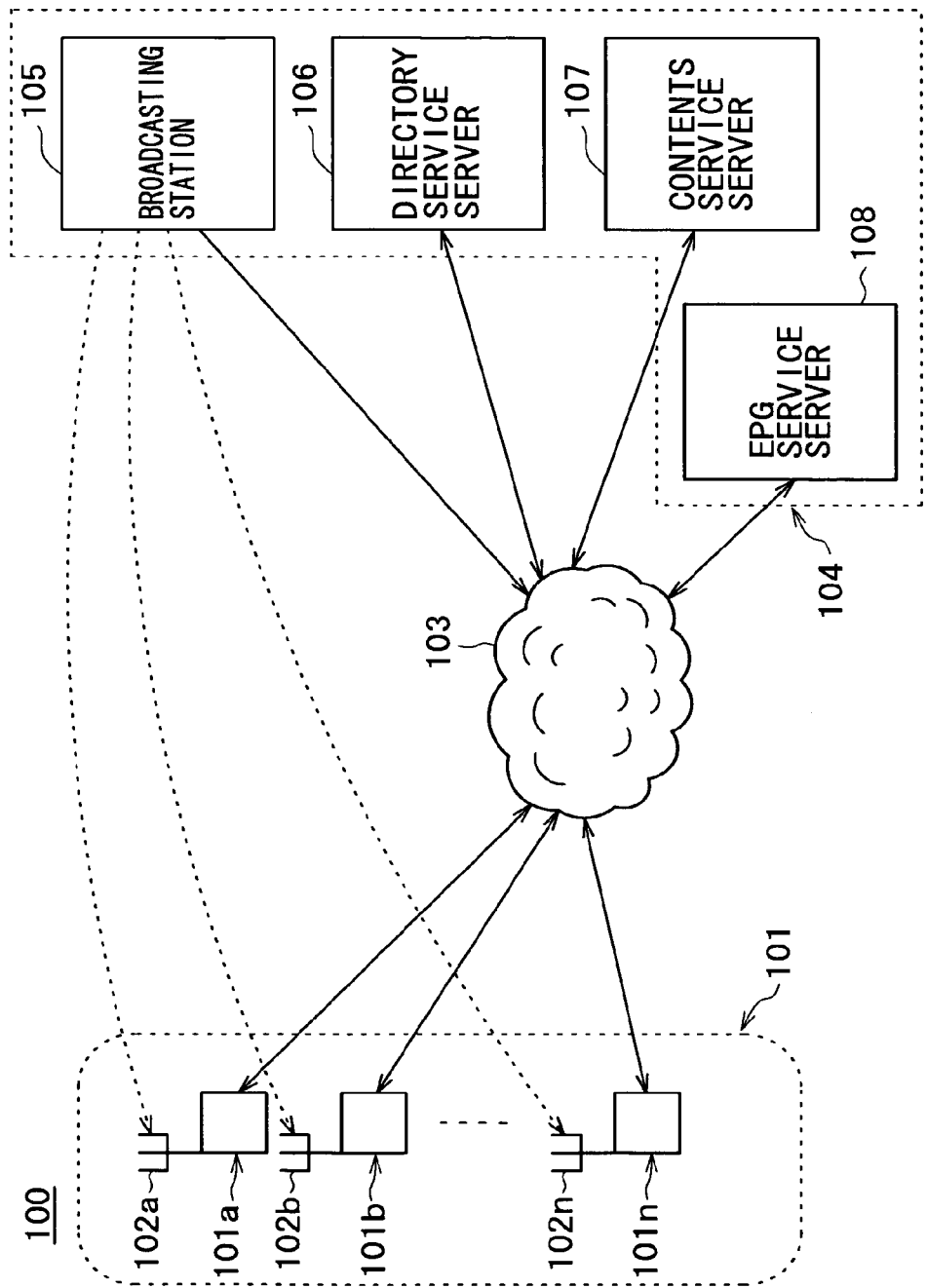
FIG. 1 is a schematic block diagram illustrating an approximate configuration of a screen display system practiced as one embodiment of the invention.

First, referring to FIG. 1, a screen display system 100 practiced as one embodiment of the invention will be described. FIG. 1 shows a schematic diagram illustrating an exemplary configuration of the above-mentioned screen display system.

As shown in FIG. 1, the screen display system 100 is configured by at least a screen display apparatus 101 (101a, 101b, ..., 101n), a network 103, and an information providing apparatus 104.

In the screen display system 100 associated with the invention, the information providing apparatus 104 provides a broadcast program guide (main contents) such as an EPG (Electronic Program Guide) to the screen display apparatus 101. The main contents is content information which includes books (or a book list) or movies (or a movie list) for example in addition to broadcast program guides.

The above-mentioned main contents has one or more content elements. For example, if the main contents is EPG information, the content element is "Program" and, if the main contents is a book list, the content element is "Book". It should be noted that there is one or more content elements which contain content information, of which details will be described later.

Therefore, the main contents plays a role of a portal for searching and browsing the above-mentioned content elements, for example. The portal main contents provides a key or entrance for finding desired content elements. Displaying the main contents onto the display screen enhances the efficiency of the selection and browsing a plurality of content elements.

The screen display apparatus 101 displays the above-mentioned main contents. When the displayed main contents is chosen, the screen display apparatus 101 searches for the sub contents associated with the main contents via meta information, thereby getting the sub contents such as detail information, for example. It should be noted that the detail information according to the present embodiment of the invention is the information which belongs to a layer below the main contents and is not always restricted to the detailed information.

In addition, the screen display apparatus 101 can display the obtained sub contents in a display area in the display screen. It should be noted that sub contents is located below the layer of the main contents and subordinate thereto. The above-mentioned main contents, sub contents and meta information will be described later.

The following describes the screen display system 100 according to the present embodiment of the invention by use of an example in which the main contents to be displayed on the screen display apparatus 101 is a broadcast program guide such as an EPG.

The information providing apparatus 104 has at least a broadcasting station 105, a directory service server 106, a contents service server 107, or an EPG service server 108.

The broadcasting station 105 broadcasts various broadcast programs to the screen display apparatus 101 and sends basic EPG information thereto as data broadcasting. By receiving this basis EPG information, the screen display apparatus 101 enables to display an EPG (Electronic Program Guide) which is to be a broadcast program guide.

It should be noted that the information providing apparatus 104 according to the present embodiment of the invention has, but not exclusively, the broadcasting station 105 by way of example. For example, if the main contents is "game software sale list" or "book browsing list" rather than "broadcast program guide or EPG", it is practicable for the information providing apparatus 104 to be configured by an ISP (Internet Service Provider) or a selling apparatus (not shown) for selling game software, for example.

The EPG service server 108 obtains the organization information for example from each broadcasting station 105 to generate EPG information having electronic program guide (EPG) form. Alternatively, the EPG service server 108 obtains externally generated EPG information. The organization information is used to broadcast programs as scheduled, thereby making programs to progress.

The basic EPG information is distributed from the EPG service server 108 to the screen display apparatus 101 in a lump. Other additional ECG (Electronic Contents Guide) information such as sub meta information to be added to sub contents which is detail information can be managed uniquely in the broadcasting station 105 which is the service providing side. It should be noted that the ECG information and the sub meta information will be described later. The ECG information may be managed in any other apparatuses than the broadcasting station 105, in accordance with the service to be provided by the information providing apparatus 104.

The screen display apparatus 101 has an identification information reception block 102 (102a, 102b, . . . , 102n) which receives broadcast waves including such identification information such as meta information reference ID, thereby receiving the broadcast waves transmitted from the broadcasting station 105 as indicated dashed lines shown in FIG. 1.

Also, the screen display apparatus 101 sends and receives data with the information providing apparatus 104 via the network 103. It should be noted that, by receiving broadcast waves, the screen display apparatus 101 can display programs such as a television program.

For the screen display system 100 according to the present embodiment of the invention, the description is made by use of only one information providing apparatus 104 for example; it will be apparent that a plurality of information providing apparatuses 104 may also be provided for each broadcasting station, for example.

In addition, the screen display system 100 according to the present embodiment of the invention may have an account aggregation server (not shown). An account aggregation server has functions of authenticating viewers (or users) when they use the screen display system 100 or executing billing and settlement at purchasing sub contents for example by the user of the screen display system 100 in a centralized manner without depending on the broadcasting station 105 or programs.

To be more specific, the arrangement of an account aggregation server allows the centralization of the authentication information of all users for integrated authentication as well as the centralization of billing and settlement information on a user basis. It should be noted that these centralization processing operations are executed on the basis of the integrated user ID information obtained by integrating a plurality of user IDs.

When the user intends to purchase various sub contents on the basis of sub meta information, these sub contents may be managed by various content holders or sale companies.

Capabilities of putting together all services such as billing and settlement and carrying out the authentication for the access to all services on the basis of one integrated user ID are realized by a dedicated server, for example.

If it is necessary to disclose the customer information in the marketing activities by contents holders who hold the rights of works such as movie, music, and game software for example, the above-mentioned user information can be used effectively. In the above-mentioned case, the contents service is notified thereof by including the user ID in an electronic certificate.

[Display Area Control Processing]

The following describes the processing of controlling the display areas of the screen display apparatus 101 with reference to FIGS. 2 through 7. FIGS. 2 through 7 illustrate the outline of the control processing applied to the screen display apparatus 101 of the present embodiment of the invention.

Figure 2:
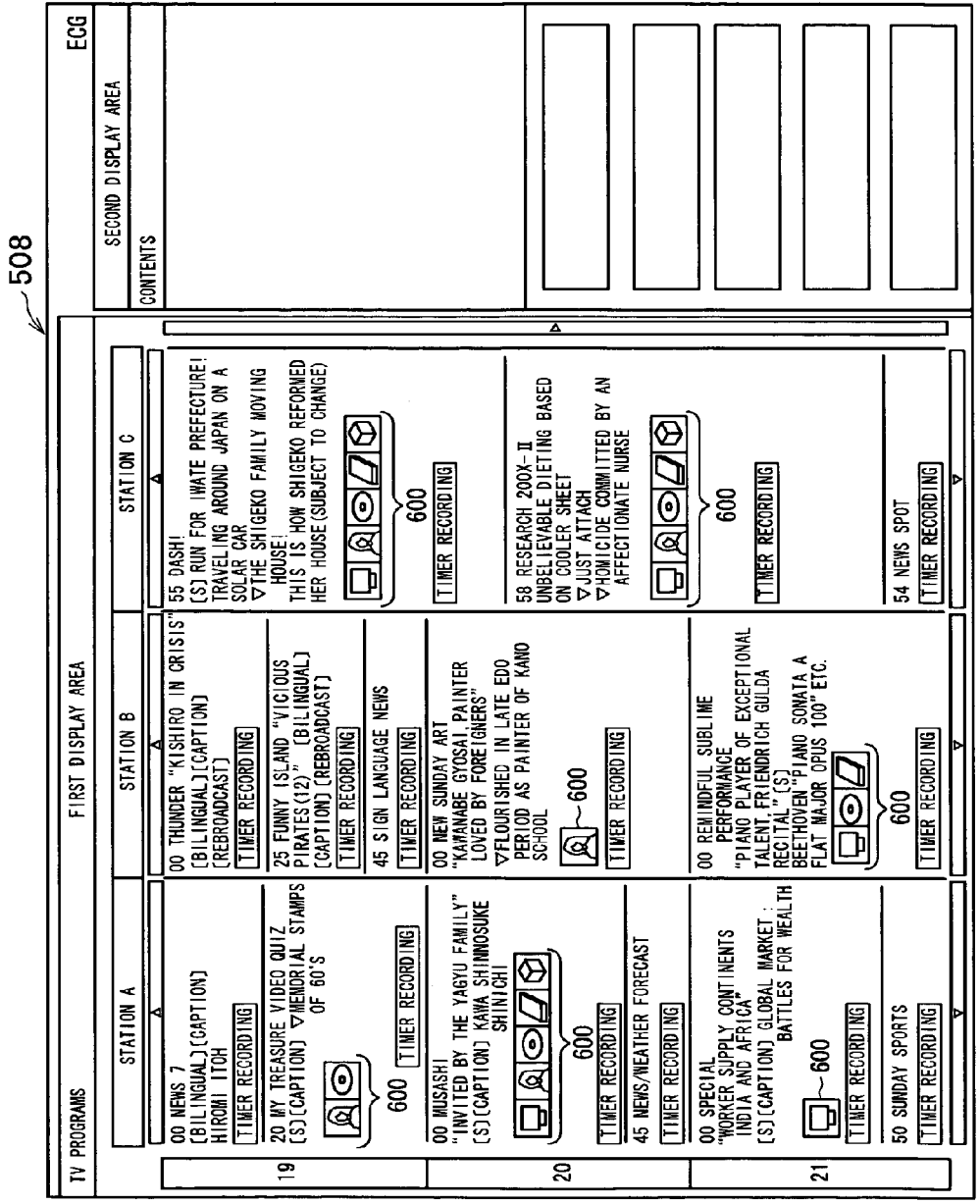
FIG. 2 is a diagram explaining the outline of control processing applied to a screen display apparatus practiced as another embodiment of the invention.

Referring to FIG. 2, a screen display block 508 shows a first display area and a second display area so that they are contained within one screen.

The first display area shows EPG information. It should be noted that, with the EPG information shown in FIG. 2, only the programs of broadcast stations "Station A" through "Station C" in time zones "19:00 through 21:00" are shown in the first display area; however, by choosing the scroll icon like "▲" through the input block, programs of other stations and other time zones can be displayed.

The following description is made by use of an example in which EPG information, but not exclusively, is displayed in the first display area according to the present embodiment of the invention; for example, the content information and the like associated with radio programs may be displayed in the first display area.

The second display area shows nothing and blank at this point of time. Of the EPG information shown in the first display area, by moving the mouse pointer for example to the area in the frame of each program which is a content element, the sub contents information such as detail information based on the program concerned is displayed in the second display area.

If program-associated detail information exists in a display area in the second display area for example, an icon 600 is shown in the frame of each program. The icon 600 is shown in a plurality of categories. Therefore, the icon 600 is chosen through the input block, the detail information belonging to the category of the icon is shown in the second display area, for example. It should be noted that the icon 600 associated with the present invention is not restricted to an icon as long as it is in a form which symbolizes a category related to each program. For example, a linked text, symbol, or index may also be practicable as the present embodiment of the invention.

As shown in FIG. 3, the icon 600 consisting of five categories is displayed in the frame of program "Musashi" which is broadcast by broadcast station A from 20:00. The category of icon 600-1 is "Contents of Program", which is the contents of the program broadcast last time or to be broadcast next time, for example.

When the icon 600-1 is chosen through the input block such as the mouse, the second display area shows the sub contents information indicative of the contents of a program associated with program "Musashi" as shown in FIG. 3.

Program "Musashi" and the sub contents information of the program contents shown in the second display area in FIG. 3 are in a parent-child relationship. Therefore, program "Musashi" is followed one layer below by the sub contents information of program contents as one of child information.

Referring to FIG. 4, the category of an icon 600-2 shown in the frame of program "Musashi" which is broadcast by broadcasting station A from 20:00 is "Cast", which corresponds to a list of names of the cast appearing on the program, for example.

When the icon 600-1 is chosen through the input block (not shown) such as the mouse, the second display area shows the sub contents information indicative of a list of names of cast associated with program "Musashi" for example as shown in FIG. 4.

When an item 603-1 to 603-8 indicative of the names of the cast shown in the second display area is chosen through the input block, the first display area or the second display area is reduced in display size to allocate a third display area, in which the detail information for example associated with the selected item 603 is shown. It should be noted that the item 603 shown in the second display area is equivalent to one of the content elements constituting the content information shown in the second display area.

Next, when the item 603-2 shown in FIG. 4 is chosen, item "Otsu" pointed by a pointer 602 shown in the second display area is turned active, its color being reversed.

Further, as shown in FIG. 5, the first display area is reduced to newly allocate a third display area, in which the content information associated with "Otsu" selected in the second display area is displayed.

The content information shown in the third display area includes a plurality of content elements. For example, an icon 600-3 and an icon 600-4 are displayed to allow the user to purchase "CD1" and "CD2" respectively composed by "Kura Ryoko" who acted "Otsu".

Likewise, an icon 600-5 and an icon 600-6 are displayed to allow the user to purchase "Book1" and "Book2" respectively written by "Kura Ryoko" who acted "Otsu".

Consequently, the content information displayed in the third display area is in a master-servant relationship with the content information shown in the second display area.

Figure 6:
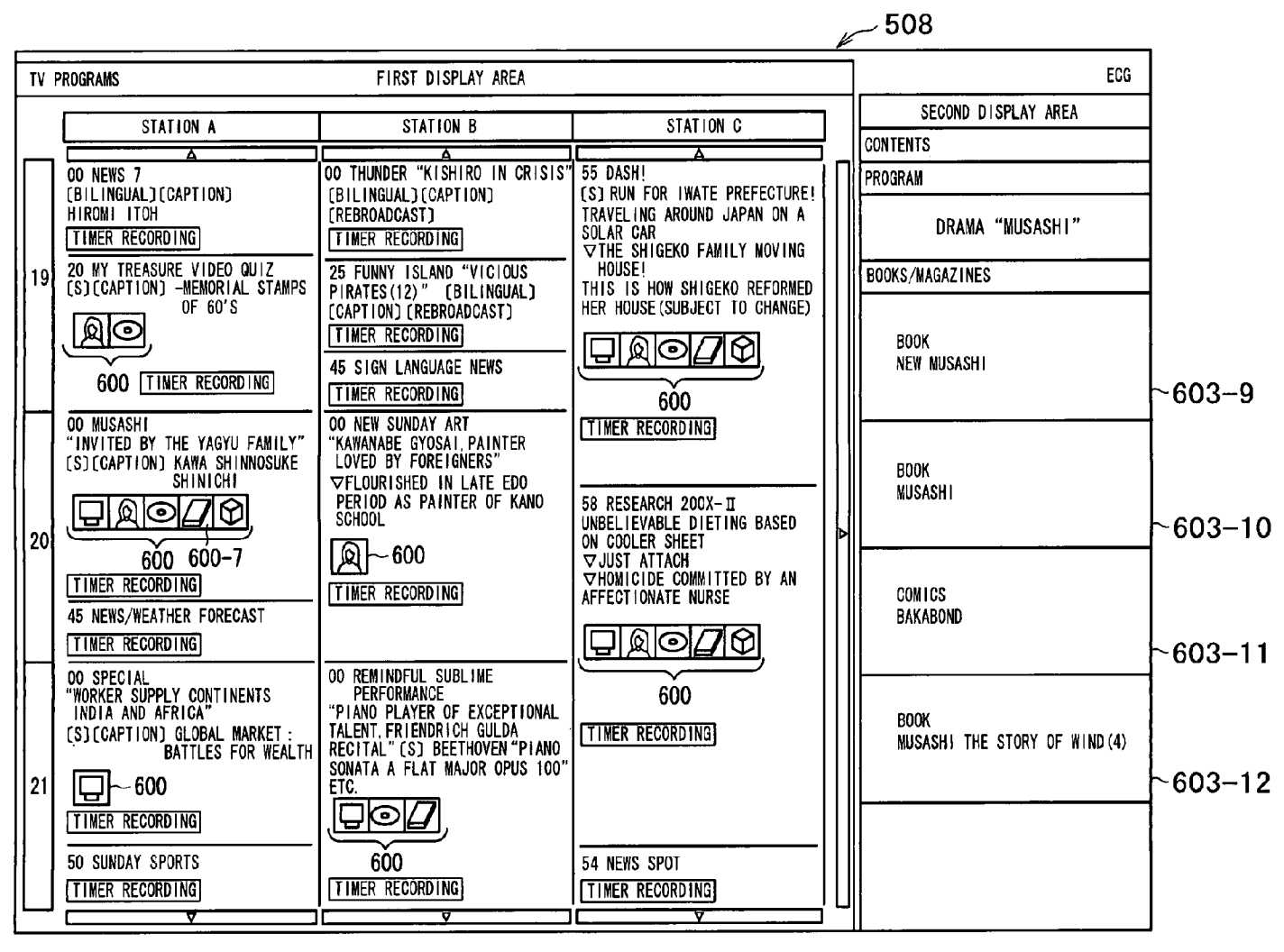

Next, as shown in FIG. 6, the category of an icon 600-7 shown in the frame of program "Musashi" which is broadcast by broadcast station A from 20:00 is "Book", which corresponds to a list of books associated with the original of the program, for example.

When the icon 600-7 is chosen through the input block (not shown), the second display area shows the sub contents information indicative of a list of books for example associated with program "Musashi" as shown in FIG. 4.

When one of items 603-9 through 603-12 indicative of the names of books shown in the second display area is chosen through the input block for example, the first display area or the second display area is reduced to newly allocate a third display area, in which the detail information for example associate with the selected item 603 is shown. It should be noted that item 603 shown in the second display area is equivalent to one of the content elements constituting the content information shown in the second display area.

When the item 603-9 shown in FIG. 6 is chosen, item "New Musashi" pointed by the pointer 602 displayed in the second display area is turned active, its color being reversed, as shown in FIG. 7.

Further, as shown in FIG. 7, the first display area is reduced to newly allocate a third display area, in which the content information associated with "New Musashi" chosen in the second display area is shown.

The content information shown in the third display area includes a plurality of content elements. For example, of these content elements, the icon 600-3 and the icon 600-4 are displayed to allow the user to purchase "CD3" and "CD4" respectively composed by the author of book "New Musashi".

Likewise, the icon 600-5 and the icon 600-6 are displayed to allow the user to purchase "Book3" written by the author of book "New Musashi".

Consequently, the content information shown in the third display area is in a parent-child relationship with the content information shown in the second display area.

It should be noted that, when a program or the icon 600 associated with the present invention is selected, the selection is shown in the second display area in this example but not exclusively; for example, the selection may alternatively be shown in the third display area.

The following describes each of the components of the screen display system 100 associated with the present invention with reference to FIGS. 1, 8 through 10. Referring to FIG. 8, there is shown a schematic block diagram of a broadcasting station according to the present embodiment of the invention. Referring to FIG. 9, there is shown a schematic diagram of a data structure of the ECG information according to the present embodiment of the invention. FIGS. 10A and 10B are explanatory diagrams showing outline of the meta information included in the ECG information according to the present embodiment of the invention.

First, the network 103 associated with the present invention will be described. As shown in FIG. 1, the network 103 interconnects the screen display apparatus 101 and the information providing apparatus 104 in a bidirectional manner. Typically, the network 103 is based on ADSL (Asymmetric Digital Subscriber Line) or FTTH (Fiber To The Home), for example. The connection media include the optical fiber cable based on FDDI (Fiber Distributed Data Interface), the coaxial cable or twisted pair cable based on Ethernet (trademark), the wireless transmission based on IEEE 802.11b, or the satellite communication network.

As shown in FIG. 8, the broadcasting station 105 according to the present embodiment of the invention has a program organization block 201, a sub meta information attachment block 202, a program meta information attachment block 203, a meta information reference ID attachment block 204, a meta information storage block 205, an information correlation block 206, and an identification information transmission block 207, in addition to ordinary broadcasting facilities.

It should be noted that, if the service provided by the screen display system 100 according to the present embodiment of the invention is "Broadcast", then the screen display system 100 has the broadcasting station 105 according to the present embodiment of the invention shown in FIG. 1. It is assumed that the main contents provided by the broadcasting station 105 to viewers be EPG information.

The main contents according to the present embodiment of the invention has been described by use of EPG information for examples but not exclusively; for example, the main contents may also be a game software sale list, a CD sale list, a book sale list, or a movie broadcasting schedule.

The program organization block 201 organizes the programs to be broadcast by the broadcasting station 105, generating organization information, for example.

The sub meta information attachment block 202 generates sub meta information and attaches the generated sub meta information to sub contents, substance (goods) of sub contents, or organization information. It should be noted that sub contents is the detail information for example bound to main contents and the goods of sub contents denote content constituted by at least one of a commercial product, a program, a package, service, still-picture data, moving-picture data, music data and text bound to the sub contents, which are provided by the contents service server 107.

The above-mentioned sub meta information belongs below the main meta information (or program meta information) associated with the main contents. Therefore, by accessing main meta information, the screen display apparatus 101 can derivatively access the sub meta information associated with main meta information.

Accordingly, the screen display apparatus 101 can access sub contents such as detail information from the main contents and further access the desired goods of sub contents. The user can purchase the above-mentioned goods by going through billing and settlement procedures.

The program meta information attachment block 203 generates program meta information which is main meta information and attaches the generated program meta information to the organization information generated by the program organization block 201. It should be noted that the program meta information attached to the organization information is also configured as basic EPG information which is distributed to the screen display apparatus 101. Basic EPG information is configured in the form of an electronic program guide (EPG). Program meta information or sub meta information is meta information indicative of the information about information. The above-mentioned program meta information belongs to meta information. Main meta information will be described later.

The above-mentioned basic EPG information includes program meta information and has structure information as a program guide. If the basic EPG information is transmitted via the network 103, its distribution is made in the form of HTML (Hyper Text Markup Language); if the basic EPG information is transmitted by broadcast wave, the transmission is made in the form of SI (Service Information), for example.

The meta information reference ID attachment block 204 allocates meta information reference IDs and adds these IDs to the organization information generated by the program organization block 201 and the sub meta information. In order to correlate the ECG information including program meta information or sub meta information with programs, the above-mentioned meta information reference ID is allocated to each program. Consequently, the attachment of meta information reference ID to the program meta information and sub meta information attached to organization information allows the acquisition of program meta information or sub meta information on the basis of the meta information reference ID.

Referencing the above-mentioned meta information reference ID, the screen display apparatus 101 can acquire the program meta information or the sub meta information to access the sub contents or the information associated with each broadcast program. It should be noted that each meta information reference ID may only be unique within the broadcasting station 105.

The meta information storage block 205 stores at least the above-mentioned organization information, sub meta information, program meta information, meta information reference ID, and sub contents. It should be noted that the above-mentioned sub meta information, program meta information, meta information reference ID, and sub contents belong to ECG information, which will be described later.

The information correlation block 206 correlates the basic EPG information attached to the above-mentioned organization information with the meta information reference ID. This correlation of the meta information reference ID with the basic EPG information allows the screen display apparatus 101 to obtain the broadcasting station information etc. for identifying the broadcasting station 105 included in the basic EPG information on the basis of the meta information reference ID. The broadcasting station information will be described later.

The identification information transmission block 207 sends the above-mentioned EPG information and the meta information reference ID of each program via the broadcast wave or the network 103. The meta information reference ID is distributed from the identification information transmission block 207 along with the basic EPG information.

In order to distribute the meta information reference ID from the identification information transmission block 207 via the broadcast wave, it is necessary to define the attribute value or the like of the descriptor indicative of meta information reference ID, of the SI which is a scheme for transmitting basic EPG information.

In order to send basic EPG information or meta information reference ID via the network 103 such as the Internet, it is necessary to define the distribution format and the distribution scheme or the like which are compliant with the screen display apparatus 101.

The above-mentioned distribution format is HTML or XML (eXtensible Markup Language), for example. Therefore, when HTML or XML is used as a distribution format, the attribute indicative of meta information reference ID is included in the meta information.

Also, when HTML or XML is used as a distribution format, the attribute value of meta information reference ID is attached to the basic EPG information compliant with these distribution formats.

The sub meta information or program meta information stored in the meta information storage block 205 are sent to the directory service server 106 from time to time. The sub contents or sub meta information stored in the meta information storage block 205 are sent to the contents service server 107.

The following describes the ECG (Electronic Content Guide) information according to the present embodiment of the invention with reference to FIG. 9. As shown in FIG. 9, the ECG information is made up of main meta information and sub meta information which belong to meta information.

ECG information extends basic EPG information as the data for searching for TV (Television) programs and searches for not only TV programs but also various contents on the Internet, thereby obtaining necessary information.

ECG information includes the above-mentioned program meta information, basic EPG information, sub meta information, sub-sub meta information, and so on in a layer structure. The above-mentioned program meta information and basic EPG information belong to EPG information. EPG information provides electronic program guide data for searching for TV programs. It should be noted that if the above-mentioned EPG information is shown in the first display area of the screen display block 508, the EPG information is equivalent to the main contents information.

Use of the above-mentioned ECG information obtained by extending EPG information allows the searching not only for the TV programs but also for the detail information and various goods which can be obtained via the network 103, thereby obtaining various goods and so on.

The main meta information shown in FIG. 9 is the meta information which is attached to the main contents among the meta information provided as ECG information. It should be noted that the main contents is the content which is provided by the information providing apparatus 104 as main contents; for example, if the information providing apparatus 104 has the broadcasting station 105, the main contents is a broadcast program, EPG information, or organization information, and if the information providing apparatus 104 has a DVD (Digital Versatile Disc) sale machine instead of the broadcasting station 105, the main contents is a DVD software sale list and goods are DVD software and so on.

If the above-mentioned main contents is EPG information or organization information, the main meta information according to the present embodiment of the invention is especially "program meta information". The program meta information (program name, genre, category, cast, etc.) is the meta information which is distributed by the SI (Service Information) in the current broadcast wave or the EPG service (its contents partially dependent on each service). It should be noted that meta information is the information about a particular piece of information.

If various pieces of meta information such as program meta information and sub meta information are displayed in the display areas of the screen display block 508, the above-mentioned meta information also is equivalent to content information. For example, the program meta information such as program title, broadcasting time, and cast displayed in the first displayed area of the screen display block 508 is equivalent to content information.

The sub meta information such as the book name and cast name associated with a program displayed in the second display area is equivalent to sub contents information.

The sub meta information shown in FIG. 9 belongs to the layer below the first layer of main meta information. Of the meta information provided as ECG information, sub meta information is the meta information which is attached to sub contents. It should be noted that sub contents is one or more pieces of detail information associated with the main contents and obtainable by referencing the sub meta information.

The sub contents have sub-sub contents which, bound to the sub contents, belongs to the layer (the third layer) below the above-mentioned sub contents. Likewise, content exists also below the layer of the sub-sub contents such as detail information, for example. Consequently, below the main contents, there exist one or more layers such as the first layer, the second layer, and so on. Below each layer, there exist detail information and so on.

The substance (or goods) of sub contents is a commercial product, a package, electronic data such as moving-picture and music, or a service, for example. It should be noted that the substance of sub contents according to the present embodiment of the invention is not restricted to those mentioned above.

The program meta information shown in FIG. 9 is the meta information associated with programs, of the meta information provided as ECG information. The program meta information is the program name, genre, and cast associated with a program, for example.

The program meta information is similar to the information which is distributed by the SI in the current broadcast wave and the EPG service server 108 (its contents partially dependent on each EPG service) on the Internet. The program meta information differs from basic EPG information in data structure; however, if program meta information is expressed as basic EPG information, its contents substantially remain the same.

The sub meta information is the meta information included in ECG information. The sub meta information is added to the sub contents which is provided by the contents service server 107 to be described later.

The above-mentioned sub meta information is the location information of sub contents which is URI (Universal Resource Identifier), name of sub contents, name of author, name of sub contents producer, and service expiration date of the above-mentioned sub contents, for example. It should be noted that URL (Universal Resource Locator) is included in the above-mentioned URI system.

The following describes the program meta information and sub meta information according to the present embodiment of the invention with reference to FIGS. 10A and 10B. FIGS. 10A and 10B outline the configurations of the program meta information and sub meta information respectively according to the present embodiment of the invention.

As shown in FIG. 10A, the program meta information included in ECG information is such program meta information belonging to program as "Program Name", "Program Genre", "Broadcast Time", or "Rebroadcast", such program meta information belong to the cast as "Name, Abbreviated Name", "Cast Genre", and "Agency", the program meta information belonging to the control for controlling such meta information as "Meta Information Version" indicative of the version of program meta information, "Updatability" indicative of the possibility of updating a plurality of program meta information groups belonging to meta information reference ID, and "Update Timing" indicative of the timing of updating program meta information groups, for example.

The above-mentioned "Broadcast Time" is indicative of the time on which a program is broadcast (broadcast start time and broadcast end time). "Genre" associated with a program is indicative of the genre of a program to be broadcast, which is drama, music, or a variety, for example. "Name, Abbreviated Name" is indicative of the name or abbreviated name of the main cast of the program, which is "Kimuro Takuya" or "Kimuta" respectively, for example.

The above-mentioned "Rebroadcast" is set if there is a program to be rebroadcast and indicates the original program of this rebroadcast program. Therefore, searching for the above-mentioned "Rebroadcast" allows to list the rebroadcast programs of original programs. It should be noted that the above-mentioned rebroadcast programs include those which are approximately the same as their original programs as well as others which are sequels of the original programs, special versions and summarizing an entire of the original programs, and DVDs in which the original programs are recorded.

The above-mentioned "Genre" associated with cast is indicative of the genre of the cast performing in a program to be broadcast, which is program meta information such as "Actor", "Singer", "Comedian", or "Painter", for example. It should be noted that, in the above-mentioned examples, the program meta information according to the present embodiment of the invention is associated with programs and cast; however, it is clear that the program meta information is not restricted thereto.

As shown in FIG. 10B, the sub meta information included in ECG information is such sub meta information belonging to music as "Music Title", "Artist Name", "Record Company" or "Music Sale Site URL", such sub meta information associated with store as "Store Name" or "Store Address", such sub meta information associated with product as "Product Name" or "Goods Sale Site URL", such sub meta information associated with inducement as "URL of Site to Which User Access Is Desired", and sub meta information belonging to the control of such sub meta information as "Meta Information Version" indicative of the version of sub meta information, "Updatability" indicative of the possibility of updating a plurality of sub meta information groups belonging to meta information reference ID, and "Update Timing" indicative of the timing of updating sub meta information groups, for example.

The above-mentioned program meta information is in a master-servant relationship with the above-mentioned sub meta information, the sub meta information being associated with the program meta information in the layer below it. It is also practicable that the sub meta information associated with the program meta information be included therein beforehand. Likewise, it is practicable to attach sub-sub meta information to the sub meta information in the layer below it. It is also practicable to include sub-sub meta information in the sub meta information beforehand. This holds true with the subsequent layers.

In the above-mentioned examples, the sub meta information according to the present embodiment of the invention is associated with music, stores, products, or inducement, for example. It is clear that the sub meta information is not restricted thereto. The sub-sub meta information according to the present embodiment of the invention has substantially the same structure as that of the sub meta information, so that the detail description of the sub-sub meta information will be omitted.

[The Contents Service Server 107]

Figure 11:
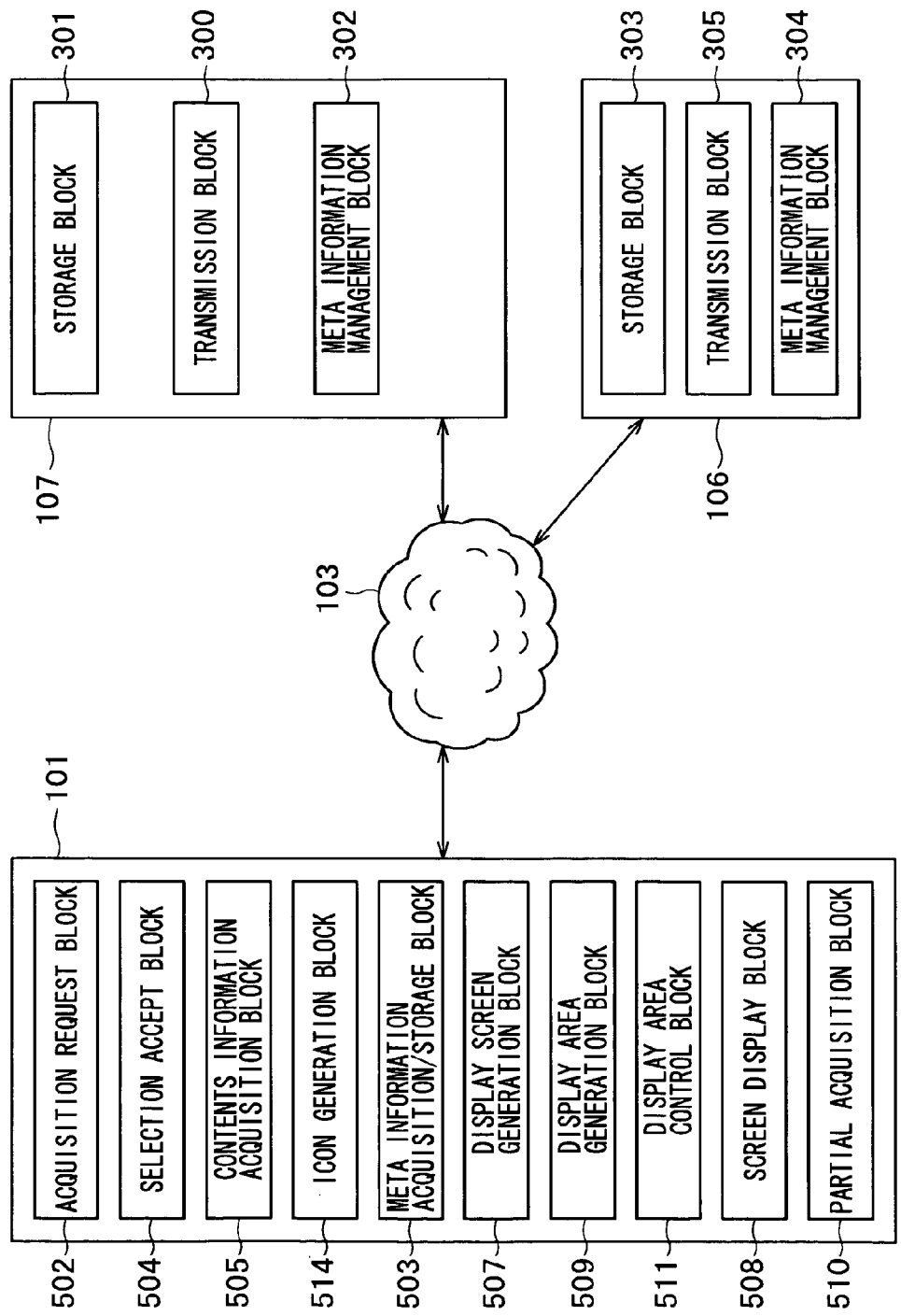
FIG. 11 is a schematic block diagram illustrating approximate configurations of a screen display apparatus, a directory service server, and a contents service server practiced as other embodiments of the invention.

The following describes the screen display apparatus 101, the directory service server 106, and the contents service server 107, which are according to the present embodiment of the invention, with reference to FIG. 11. FIG. 11 is a block diagram approximately illustrating the configurations of the screen display apparatus 101, the directory service server 106, and the contents service server 107.

The contents service server 107 according to the present embodiment of the invention holds, in a layered manner, the main contents and various kinds of detail information which are provided by content providers such as broadcasting stations to viewers. It should be noted that the above-mentioned detail information includes the information necessary for purchasing goods, the location of detail information in layers below the above-mentioned detail information, and the method of retrieving the detail information, as required.

As shown in FIG. 11, the contents service server 107 has at least a storage block 301, a meta information management block 302, a control block (not shown) for controlling the other components of the contents service server 107, a transmission block 300 for sending data via the network 103, and a reception block (not shown) for receiving data via the network 103.

The storage block 301 stores the detail information (or sub contents) provided by the broadcasting station 105. The sub contents are the detail information or the like bound to the main contents. For example, if the main contents is EPG information, the sub contents are the information bound to a program in the above-mentioned EPG information. Therefore, of the information associated with a program, the information of the child whose parent is the main contents becomes sub contents.

If the main contents is EPG information, the sub contents are story information about the previous program, cast information about the program, book information associated with the program, and music information associated with the program, for example. The main contents and the sub contents are included in content information.

The storage block 301 also stores, as detail information, the Web site information for selling such goods as books and CDs associated with the main contents. It should be noted that the storage block 301 stores especially the Web site information associated with programs.

The sub contents according to the present embodiment of the invention exists in the storage block 301 of the contents service server 107 installed in each broadcasting station and may also exist in the storage block 301 of the contents service server 107 on the network 103 in a distributed manner.

The sub meta information provided as ECG information can be added to the above-mentioned sub contents. The meta information management block 302 stores this sub meta information. Consequently, the sub contents may be provided after providing the sub meta information to the screen display apparatus 101.

It should be noted that the storage block 301 according to the present embodiment of the invention stores the main contents in addition to the sub contents and the meta information management block 302 stores the main meta information in addition to the sub meta information.

If the screen display system 100 according to the present embodiment of the invention has a plurality of broadcasting stations 105, it is also practicable to share one contents service server 107 with these broadcasting stations 105.

[The Directory Service Server 106]

The directory service server 106 according to the present embodiment of the invention is operated as a server dedicated to directory service, for example. As shown in FIG. 11, the directory service server 106 has a storage block 303, a meta information management block 304, a transmission block 305 which sends data via the network 103, a control block (not shown) for controlling the other components of the directory service server 106, and a reception block (not shown).

The meta information management block 304 holds the sub meta information group which is a collection of a plurality of pieces of sub meta information associated with various attributes such as the locations, titles genres, associated personal names (of cast and authors for example), prices, and service expiration dates of various sub contents and a main meta information group (or program meta information group) provided by the contents service server 107 as ECG information.

The meta information management block 304 also holds the program meta information associated with ordinary programs and the above-mentioned sub meta information group in a correlated manner. It should be noted that the program meta information may be configured as a program meta information group consisting of a plurality of pieces of program meta information.

It is also practicable for the meta information management block 304 to store program meta information, sub meta information, and meta information reference ID for each broadcasting station 105 independently.

The above-mentioned sub meta information is edited on a program basis at the broadcasting station 105 and is configured as a sub meta information group consisting of one or more pieces of sub meta information. In addition, a meta information reference ID is allocated for referring to the sub meta information group.

On the basis of the above-mentioned meta information reference ID, the screen display apparatus 101 accesses the directory service server 106 to obtain the meta information such as sub meta information, for example. It should be noted that the directory service server 106 can obtain the access information which is generated every time access is made by the screen display apparatus 101 and store the obtained access information for each screen display apparatus 101.

It should be noted that, if the screen display system 100 according to the present embodiment of the invention has a plurality of broadcasting stations 105, it is also practicable to share one directory service server 106 with these broadcasting stations 105.

[The Screen Display Apparatus 101]

The following describes the screen display apparatus 101 according to the present embodiment of the invention shown in FIG. 11. The screen display apparatus 101 includes various consumer electronics (CE) equipment such as STBs (Set Top Box) for broadcasting, information appliances, video recorders, game machines, personal computers, PDAs (Personal Digital Assistants), and mobile equipment such as mobile phones, for example.

The screen display apparatus 101 has a reception block (not shown) for receiving identification information for example, an acquisition request block 502, a meta information acquisition/storage block 503, a selection accept block 504, a content information acquisition block 505, a display screen generation block 507, a display area generation block 509, a screen display block 508, a partial acquisition block 510, a display area control block 511, an icon generation block 514, and an input block (not shown).

It should be noted that the content information acquisition block 505 according to the present embodiment of the invention is also equivalent to a detail information acquisition block for obtaining detail information, for example.

The reception block (not shown) for receiving identification information for example receives basic EPG information and meta information reference ID in the form of broadcast wave through an antenna (not shown) and stores the received information and ID. A reception block (not shown) capable of receiving via a network receives basic EPG information and meta information reference ID via the network 103 and stores them.

The screen display apparatus 101 according to the present embodiment of the invention receives from the broadcasting station 105 which broadcasts data, by way of example. However, the reception by the screen display apparatus 101 is not restricted to the data broadcasting; for example, the screen display apparatus 101 may also receive meta information reference ID or the like from an ISP other than the broadcasting station 105.

The screen display apparatus 101 according to the present embodiment of the invention has been described by use of the acquisition of meta information reference ID through the reception block (not shown), for example. However, if the main contents is a CD sale list and the goods is a CD like a music CD, it is also practicable that the screen display apparatus 101 which can reproduce CDs has capabilities of reading the meta information reference ID stored in the extended storage area of each CD to acquire meta information reference ID from the information providing apparatus 104.

If the main contents is a book publishing list and the goods is a book and, if the meta information reference ID is directly written on the cover of the book, it is practicable that the screen display apparatus 101 acquires the meta information reference ID through the input block such as a keyboard attached to the screen display apparatus 101. It should be noted that the above-mentioned meta information reference ID may be a one-dimensional, a two-dimensional, or a three-dimensional barcode.

The reception block receives locational information such as the URI for example of the directory service server 106 via the network 103 and stores the received URI. It is also practicable that the locational information such as the URI for example is entered through the input block 511 of the screen display apparatus 101 and the entered URI is stored. The above-mentioned URI allows the screen display apparatus 101 to access the directory service server 106.

It should be noted that the screen display apparatus 101 can be connected to the network 103 by means of dial-up connection, ADSL/FTTH, or others.

The screen display apparatus 101 receives the basic EPG information distributed via the broadcast wave or the network 103 as well as the meta information reference ID attached to each program.

The screen display apparatus 101 manages the location information (for example, URI) on the Internet of the directory service server 106 corresponding to each broadcast station. If there is a change in URI, the screen display apparatus 101 updates the URI so that the latest URI is always stored. The updating of URI is executed by the update data received via the broadcast wave or the network 103.

The broadcast wave reception block or the reception block (not shown) receives the SI via the broadcast wave or the EPG information attached with the meta information reference ID transmitted via the network 103 and stores each meta information reference ID.

In the acquisition of meta information reference ID, the meta information reference ID is stored as correlated with broadcasting station information (not shown) so as to identifying to which broadcasting station the program corresponding to the received meta information reference ID belongs.

It should be noted that, if meta information reference ID is acquired from the SI, the reception of the above-mentioned broadcasting station information allows to determine from which broadcasting station the program is broadcast. For example, according to the broadcasting standard specified by ARIB (Association of Radio Industries and Business), the SI always includes the service ID indicative of each broadcasting station. The broadcasting information including the above-mentioned service ID and the meta information reference ID are correlated with each other.

If the EPG service server 108 provides broadcasting station information via the network 103, the broadcasting station information is distributed in a discriminatory manner. The following describes the EPG data which is distributed via the network 103 with reference to FIG. 12. FIG. 12 shows a data structure of the EPG data according to the present embodiment of the invention.

As shown in FIG. 12, the data structure of the EPG data is based on XML. The EPG data are configured by a tag indicative of the basic EPG information, a tag indicative of broadcasting station information, and a tag indicative of program meta information, for example. It should be noted that the data structure of the EPG data according to the present embodiment of the invention is applicable based on not only XML but also HTML, for example.

The meta information reference ID which is distributed with the basic EPG information is always distributed with the broadcasting station information indicative of a broadcasting station. The broadcasting station information is, but not exclusively, meta information.

It should be noted that, in the above-mentioned example, the meta information reference ID shown in FIG. 12 is, but not exclusively, an attribute. For example, the meta information reference ID may be a tag having an index capability of indicating the meta information reference ID.

As shown in FIG. 12, what indicates a broadcasting station is "Broadcasting Station ID". This "Broadcasting Station ID" is set to "TPS" or "Bushi TV". It should be noted that, instead of "TPS" or "Bushi TV", an appropriate ID may be allocated to "Broadcasting Station ID".

The broadcasting station information shown in FIG. 12 has "Broadcasting Station Tag (<Broadcasting Station>)" and "Program Tag (<Program>)" in a layered structure. The meta information reference ID for each program is defined as a child element of the element indicative of a broadcasting station ("Broadcasting Station ID").

In the case of the data structure shown in FIG. 12, when acquiring the meta information reference ID, referencing "Broadcasting Station ID" which is the parent element of the layer structure allows to determine to which broadcasting station the program belongs.

Other broadcasting station information which is distributed via the network 103 is one that sets the rules of naming the ID of meta information reference ID. This broadcasting station information defines that a character string for identifying each broadcasting station be always provided at the beginning for example of the ID as meta information reference ID.

By referencing the meta information reference ID with the above-mentioned predetermined character string set, the screen display apparatus 101 can determine to which broadcasting station 105 this program belongs. However, this may lose the advantage of uniquely managing the ID for each broadcasting station 105.

Accordingly, when distributing, by the EPG service server 108, the meta information reference ID (not including the character string for identifying the broadcasting station 105) uniquely named by the broadcasting station 105, a character string for broadcasting station identification is added.

When acquiring data such as meta information reference ID, the screen display apparatus 101 must delete the character string for the identification of the broadcasting station 105 and add a process of returning the meta information reference ID specified by the broadcasting station 105.

Having acquired the basic EPG information, the screen display apparatus 101 displays an EPG display screen in the screen display block 508. When the user specifies to show the program meta information or sub meta information associated with a desired program displayed on the EPG display screen, the screen display apparatus 101 obtains the corresponding sub meta information on the basis the meta information reference ID and the URI information of the directory service server 106 of the corresponding broadcasting station 105.

It should be noted that the directory service server 106 and the contents service server 107 according to the present embodiment of the invention are practicable also when operated for each broadcasting station 105 independently. The screen display apparatus 101 makes distinction between meta information reference ID and sub meta information for each broadcasting station 105 to acquire sub contents which is detail information.

For example, on the basis of a keyword included in the program meta information or sub meta information obtained from a broadcasting station 105-A, it is practicable to search for the program meta information or sub meta information of a broadcasting station 105-B, thereby allowing the viewer to obtain program meta information or sub meta information without being aware of the difference between broadcasting stations 105.

Also, the directory service server 106 and the contents service server 107 according to the present embodiment of the invention are practicable if they are operated independently for each program sponsor or content provider, for example. It should be noted that, if the directory service server 106 and the contents service server 107 are operated for each program sponsor or content provider, the broadcasting station 105 allocates meta information reference ID.

When the directory service server 106 and the contents service server 107 are operated independently for each program sponsor or content provider, a directory service server 106-A holds the meta information reference ID or sub meta information associated with the sponsor of program A for example and a directory service server 106-B holds the meta information reference ID and sub meta information associated with the sponsor of program B, for example.

The input block (not shown) equipped on the screen display apparatus 101 shown in FIG. 11 according to the present embodiment of the invention is composed of, but not exclusively, a pointing device such as a mouse, a track ball, a track pad, a stylus pen, or a joy stick and a keyboard.

The input block (not shown) selects a desired broadcast program from a list shown on the EPG display screen on the screen display block 508, obtains the detail information of the sub contents for example associated with the selected broadcast program, and allocates a new display area on the screen display block 508, displaying the obtained detail information in this display area. It should be noted that the processing of displaying contents on the screen display block 508 will be described later.

By selecting a broadcast program, the input block can obtain the sub meta information associated with the selected program. Therefore, the input block can obtain desired sub meta information from the main meta information displayed on the screen display block 508 as well as the sub contents associated with this sub meta information. It should be noted that the input block can obtain not only the sub meta information but also main meta information.

On the basis of operator instruction information entered through the input block, the selection accept block 504 generates query information set with the meta information reference ID of the selected broadcast program and the attribute value such as "Title" of the broadcast program.

The acquisition request block 502 sends the query information received from the selection accept block 504 to the directory service server 106 via the network 103. It should be noted that the destination to which the query information is sent includes all URIs of the directory service servers 106 held in the screen display apparatus 101.

The meta information acquisition/storage block 503 requests the directory service server 106 to send the program meta information or sub meta information in the layer below the program inquired by the acquisition request block 502, receives the requested program meta information or sub meta information via the network 103, and stores the received information.

On the basis of the program meta information or sub meta information retrieved by the query information from the acquisition request block 502, the content information acquisition block 505 accesses the meta information management block 302 via the network 103 to obtain the meta information (the sub meta information, for example) associated with the retrieved sub meta information.

Also, in addition to obtaining the meta information concerned, the content information acquisition block 505 obtains the sub contents information (the detail information for example) of the link destination from the URI information included in the retrieved meta information. It should be noted that the content information acquisition block 505 according to the present embodiment of the invention is also equivalent to a detail information acquisition block for acquiring detail information such as sub contents, for example.

On the basis of the information received from the servers 106 and 107, the display screen generation block 507 generates data to be displayed on the screen display block 508 by use of a template, for example. For example, the display screen generation block 507 obtains the sub meta information or sub contents received from the servers 106 and 107 and generates the data by template conversion based on XML and XSLT.

The display area generation block 509 allocates display areas in which to display the data generated by the display screen generation block 507 onto the screen display block 508, thereby generating the display areas.

When EPG information (or main contents) is reduced for example, the partial acquisition block 510 extracts only necessary parts. For example, the partial acquisition block 510 illustrates with the extraction when acquiring, among the selected programs, main contents of a same broadcasting station which are close in time or acquiring main contents of different broadcasting stations in a same time zone of the selected programs.

On the basis of the generated display screen data, the display area control block 511 reduces or expands the allocated one or more display areas and displays the EPG information and the detail information such as sub contents or the like so that they can be accommodated within the screen of the screen display block 508.

The icon generation block 514 generates icon data for each category associated with the content information such as detail information, for example. This category is included in the sub meta information for example of content information as an attribute value. The icon generation block 514 instructs the screen display block 508 to display the generated icon data so that icons 600 are displayed in a row as shown in FIG. 2, for example.

Accordingly, on the basis of the attribute value of category which is an attribute of the content information received from the storage unit of the screen display apparatus 101 or the directory service server 106, the icon generation block 514 generates icon data. The generated icon data is displayed on the screen display block 508 as the icon 600.

It should be noted that, in the above-mentioned example, the icon generation block 514 according to the present embodiment of the invention gives an instruction to display the generated icon data in a row, but not exclusively. For example, when giving an instruction to display the generated icon data in a column, the icon generation block 514 gives an instruction to arrange the icons in accordance with the category priorities registered with the setting information beforehand.

When the icon 600 is selected by the input block such as mouse, the icon generation block 514 acquires the category corresponding to the selected icon 600 and retrieves other meta information belonging to a layer below the layer matching this category or the URI information included in the meta information.

It should be noted that an image composed of at least one of character, graphic, and pattern which configure the icon 600 may be stored in a storage block beforehand or received from the directory service server 106.

In the above-mentioned example, the display area control block 511 according to the present embodiment of the invention controls the display areas, but not exclusively. For example, it is also practicable that the display area control block 511 reduces texts such as sub meta information, texts of contents such as sub contents, and images to accommodate them into the display screen of the screen display block 508, for example.

The following describes variations to the screen display apparatus 101, the directory service server 106, and the contents service server 107 according to the present embodiment of the invention with reference to FIG. 13. FIG. 13 is a block diagram illustrating a general configuration of a first variation to the screen display apparatus 101, the directory service server 106, and the contents service server 107 according to the present embodiment of the invention.

The following describes the differences between the screen display apparatus 101, the directory service server 106, and the contents service server 107 shown in FIG. 11 and those shown in FIG. 13.

As shown in FIG. 13, as compared with the contents service server 107 shown in FIG. 11, the contents service server 107 shown in FIG. 13 further includes a display screen generation block 306, a URI information transmission block 307, and an icon generation block 308.

It should be noted that, in the above-mentioned example, the contents service server 107 according to the present embodiment of the invention includes, but not exclusively, the display screen generation block 306, the URI information transmission block 307, and the icon generation block 308, for example. These component blocks may also be arranged on the directory service server 106.

The display screen generation block 306 generates display screen data (detail information or sub contents) in advance so as to make display onto the screen display block 508 of the screen display apparatus 101. For example, these display screen data include the display screen data (or detail information) of a Web screen composed of still picture, moving picture, and text. It should be noted that the display screen data includes URI information.

The display screen data according to the present embodiment of the invention is not restricted to the detail information as sub contents; for example, the display screen data may also be sub-sub contents below sub contents or sub sub-sub contents below sub-sub contents.

The URI information transmission block 307 controls the display screen generation block 306 by starting a CGI program or the like stored in the storage block 301 through the CPU (not shown) in accordance with query information received from the screen display apparatus 101, thereby making the display screen generation block 306 generate display screen data.

Further, the URI information transmission block 307 sends the URI information of dynamically generated detail information via the network 103.

Accordingly, receiving the URI information from the contents service server 107, the screen display apparatus 101 can display the detail information such as sub contents onto the screen display block 508.

On the basis of the attribute value of the meta information indicative of the attribute of the category managed by the meta information management block 302, the icon generation block 308 generates icon data. The icon data may be generated and stored in the storage block 301 beforehand or may be generated immediately before they are sent to the screen display apparatus 101. The generated icon data is displayed as the icon 600 onto the screen of the screen display apparatus.

As compared with the screen display apparatus 101 shown in FIG. 11, the screen display apparatus 101 shown in FIG. 13 does not have the display screen generation block 507 and has a URI information reception block 512 and a URI access block 513.

Consequently, as shown in FIG. 13, the detail information as display screen data is not generated by the screen display apparatus 101 but is generated in the contents service server 107.

The URI information reception block 512 receives the URI information from the URI information transmission block 307 of the contents service server 107 via the network 103.

On the basis of the URI information received from the contents service server 107, the URI access block 513 accesses the detail information held in the contents service server 107 or the directory service server 106 which corresponds to the URI information.

The detail information accessed by the URI access block 513 is sent to the screen display apparatus 101 via the network 103 to be displayed in an allocated display area on the screen display block 508.

The following describes variations to the screen display apparatus 101, the directory service server 106, and the contents service server 107 according to the present embodiment of the invention with reference to FIG. 14. Referring to FIG. 14, there is shown a block diagram illustrating a generation configuration of a second variation of the screen display apparatus 101, the directory service server 106, and the contents service server 107 according to the present embodiment of the invention.

A contents service server 107 shown in FIG. 14 is obtained by combining the contents service server 107 shown in FIG. 11 with the contents service server 107 shown in FIG. 7.

A screen display apparatus 101 shown in FIG. 14 is obtained by combining the screen display apparatus 101 shown in FIG. 11 and the screen display apparatus 101 shown in FIG. 13. Therefore, as shown in FIG. 14, the detail information for example as display screen data is generated by either the screen display apparatus 101 or the contents service server 107.

It should be noted that, in the above-mentioned example, the contents service server 107 according to the present embodiment of the invention has, but not exclusively, both the display screen generation block 306 and the URI information transmission block 307; for example, these blocks may also be arranged on the directory service server 106.

[Configuration of the Display Screen]

Figure 15A:
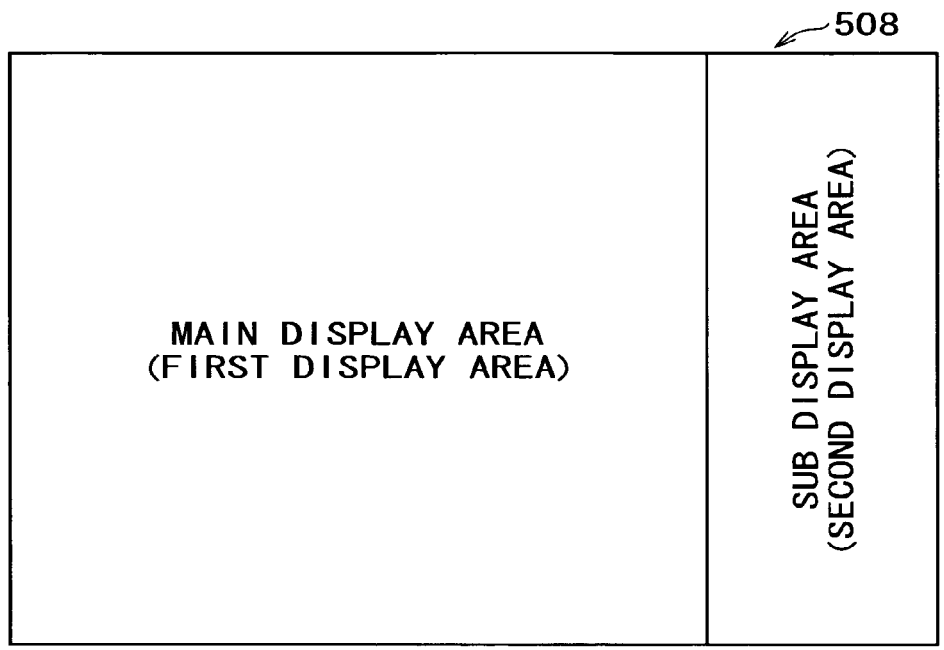
FIGS. 15A and 15B are diagrams illustrating approximate configurations display screens practiced as another embodiment of the invention.
Figure 15B:
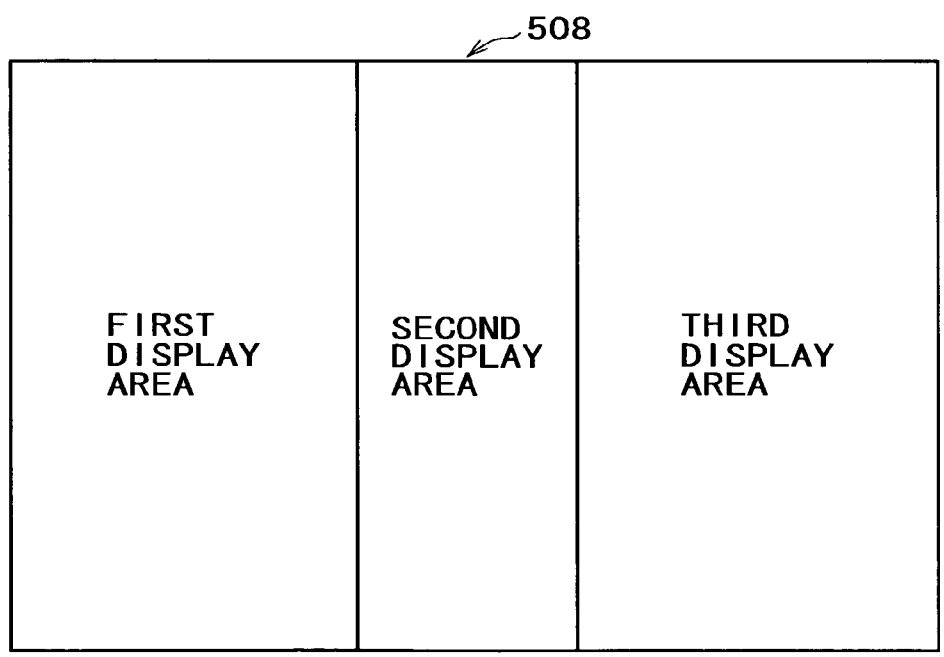

The following describes configurations of the display screens which are shown on the screen display block 508 according to the present embodiment of the invention with reference to FIGS. 15A and 15B. FIGS. 15A and 15B show general configurations of the display screens according to the present embodiment of the invention.

As shown in FIG. 15A, the screen display block 508 has one or more display areas. First, a main display area (or a first display area) is allocated to the screen display block 508. If areas for displaying a plurality of associated pieces of information, such as main contents and sub contents, are required, the main display area provides the parent element such as a root on the top layer. Especially, an area in which the first parent element is displayed is called the first display area.

The main display area according to the present embodiment of the invention shows EPG information which is a program guide of broadcast programs.

As shown in FIG. 15A, a sub display area (or a second display area) displays the associated information or detail information of a content element selected from a content element (or subject) group displayed in the main display area. Especially, a sub display area of the first display area is called the second display area.

It should be noted that the content elements according to the present embodiment of the invention are those content elements which are two or more items and topics for example constituting the main contents. For example, if the main contents is EPG information, the content elements include the contents, cast, and music of each broadcast program constituting the EPG information.

"Selection" according to the present embodiment of the invention denotes a state in which a content element is specified by the clicking of the mouse or the pressing of a button of the input block (not shown), a state in which the mouse cursor is positioned on a content element (a on-mouse state), or a state in which a frame (or a cursor) for selection by the operation of a remote commander is displayed on a content element, for example.

As shown in FIG. 15B, it is also practicable to allocate a third display area to the screen display block 508 in addition to the main display area and the sub display area.

The display areas to be allocated to the screen display block 508 may be configured into a plurality of layers like the first display area, the second display area, and the third display area, for example. Therefore, the display areas in these layers are in a parent-child relationship. For example, for the third display area below the second display area, the second display area is the parent of the third display area.

Figure 16A:
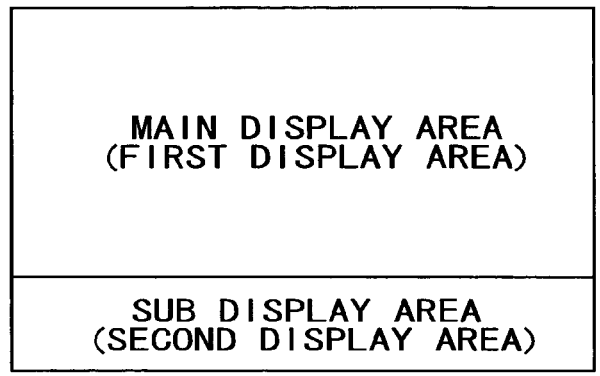
FIGS. 16A, 16B and 16C are diagrams illustrating approximate display areas which are allocated to a screen display block practiced as still another embodiment of the invention.
Figure 16B:
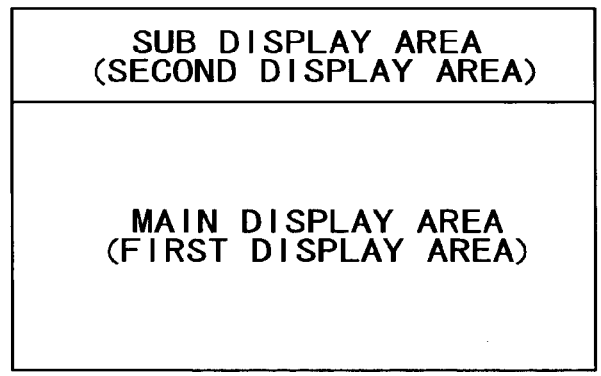
Figure 16C:
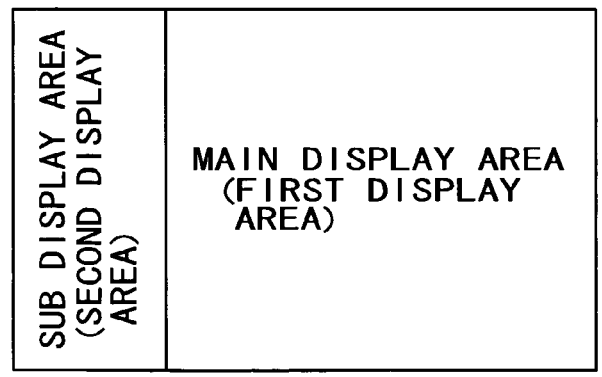

As shown in FIGS. 16A, 16B, and 16C, the display areas are allocated to the screen display block 508 in various patterns. FIG. 16A to 16C show an outline of the display areas allocated to the screen display block according to the present embodiment of the invention.

As shown in FIG. 16A, the screen display block 508 may be arranged with the main display area and the sub display area above and below.

As shown in FIG. 16B, the screen display block 508 may be arranged with the sub display area over the main display area.

As shown in FIG. 16C, the sub display area may be arranged to the left while the main display area to the right. The layouts of the display areas according to the present embodiment of the invention are not restricted to those shown.

There may be a plurality of layers by adding the third display area to the first and second display areas. In what follows, the parent-child relationship of the display areas arranged in layers is expressed in numbers. Let the sub display area of the first display area be the second display area, the sub display area with the second display area being the main display area be the third display area, and the sub display area with the Nth display area being the main display area be the Nth+1 display area, for example.

The screen display block 508 is allocated with the display areas as classified into the main display area and the sub display area, but all the display areas are the same in characteristic. Therefore, there is no special restriction to the correlation between the dimensions of the display areas. In terms of the correlation, the dimension of the main display area may be the largest, for example.

[Layout Patterns of Content Elements]

The following describes the layout patterns of content elements according to the present embodiment of the invention with reference to FIGS. 17A through 17E. These figures show the general configurations of content elements which are displayed in the display areas according to the present embodiment of the invention.

The following description will be made with reference to FIGS. 17A through 17E; in each display area, a plurality of content elements included in content information are displayed as will be described. Examples of display patterns include a list format, a table format, combinations thereof as EPG information, or an irregular format. Each display pattern may be any as long as a desired content element can be identified from among a plurality of content elements.

If a content element is further displayed in an area within a display area, a child content element such as an icon may be arranged in that area. For example, in the display area of one content element of a list format or a table format, a plurality of associated icons may be arranged to provide layered display areas.

Figure 17A:
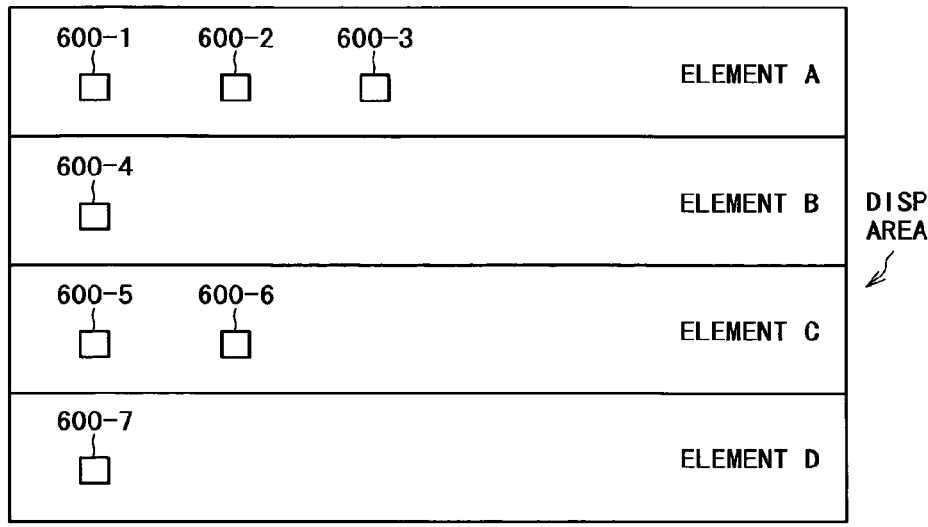

First, referring to FIG. 17A, the display area shows content elements A, B, C, and D from top to bottom in a list format. It should be noted that this display area corresponds to the main display area or the sub display area described above.

The elements A, B, C, and D include icons 600 (600-1, 600-2, . . . , 600-7) as child elements.

Selecting one of the elements A, B, C, and D by clicking the mouse or the like can display the detail information associated with the selected content element in another display area.

Selecting each icon 600 by clicking the mouse for example can allocate various pieces of detail information associated with a content element represented by the icon 600, thereby displaying the detail information. It should be noted that, if there is no detail information associated with a content element, the content element has no icon 600.

Displaying an icon displaying detail information, which are sub contents, as the information associated with each content element facilitates the visual recognition that, as the number of icons increases, there are more pieces of detail information. This also increases the chances of intentionally accessing these content elements to obtain information.

One content element can have one or more icons 600 for each category of detail information to be displayed. Therefore, selecting the icon 600 can efficiently display the detail information of a desired category.

If the main contents is EPG information, the categories according to the present embodiment of the invention include the contents, cast, book, and music of a program, for example. Therefore, arranging the icon 600 for program contents, the icon 600 for cast, the icon 600 for books, and the icon 600 for music for each program corresponding to each content element can display the detail information about the cast associated with the program or the like in the display area.

Figure 17B:
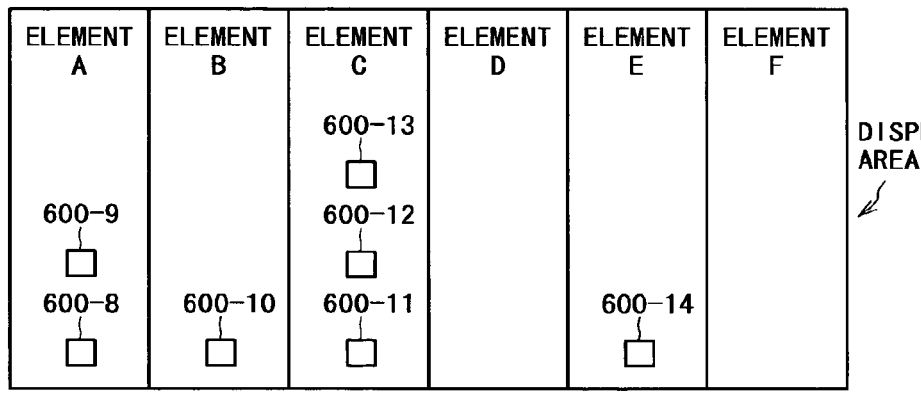

Referring to FIG. 17B, content elements A, B, C, D, E, and F are arranged side by side from the left side in the display area in a list format. The elements A through F further include icons 600 (600-8, 600-9, . . . , 600-14). The other configurational considerations of FIG. 17B are substantially the same as those of FIG. 17A, so that further description thereof will be skipped.

Figure 17C:
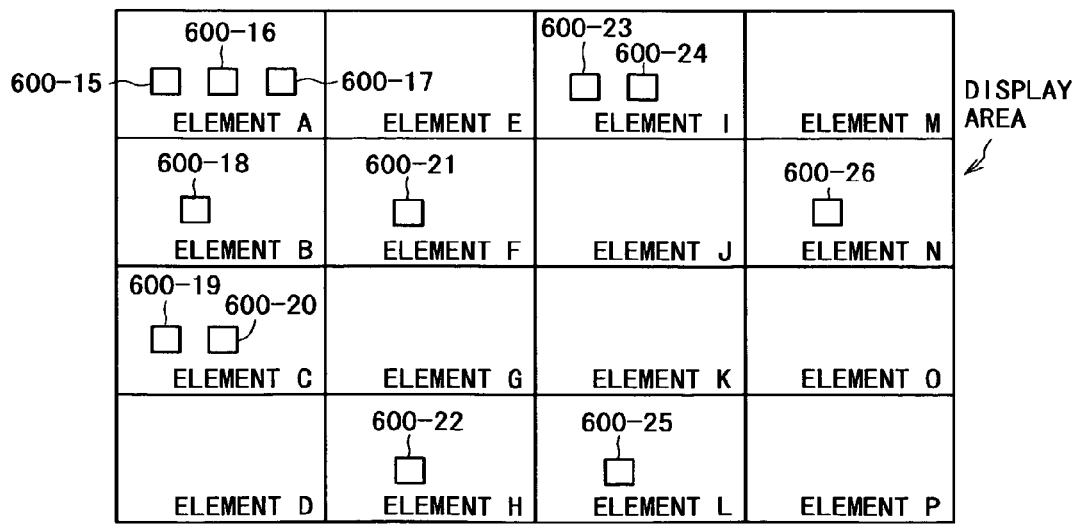

Referring to FIG. 17C, content elements are arranged in a table format in the display area; elements A, B, C, and D from upper left down to bottom left, content elements E, F, G, and H, top to bottom, to the right side of content elements A, B, C, and D, content elements I, J, K, and L, top to bottom, on the right side of content elements E, J, G, and H, and content elements M, N, O, and P, top to bottom, on the right end of the display area. These content elements include icons 600 (600-15, 600-16, . . . , 600-26) as child elements (or child content elements). The other configurational considerations of FIG. 17C are the substantially the same as FIG. 17A, further description thereof will be skipped.

Referring to FIG. 17D, the display area displays EPG information in content elements as a variation to the table format, the vertical axis represents time while the horizontal axis represents broadcasting stations.

In the above-mentioned EPG information, elements A, B, C, and D are arranged for broadcasting station A in the order of broadcasting time; elements E, F, and G are arranged for broadcasting station B in the order of time; and elements H, I, and J are arranged for broadcasting station C in the order of time.

The above-mentioned elements A, B, C, F, and I include icons 600 (600-30, 600-31, . . . , 600-39). The other configurational considerations of FIG. 17D are substantially the same as FIG. 17A, so that further description thereof will be skipped.

Referring to FIG. 17E, content elements are arranged in the display area in an irregular manner (in an irregular format), A, B, C, and D from top left to the right. The elements A, B, C and D include icons 600 (600-40, 600-41, . . . , 600-43). The other configurational considerations are substantially the same as FIG. 17A, so that further description thereof will be skipped.

[Allocation Variations of Display Area]

Figure 18A:
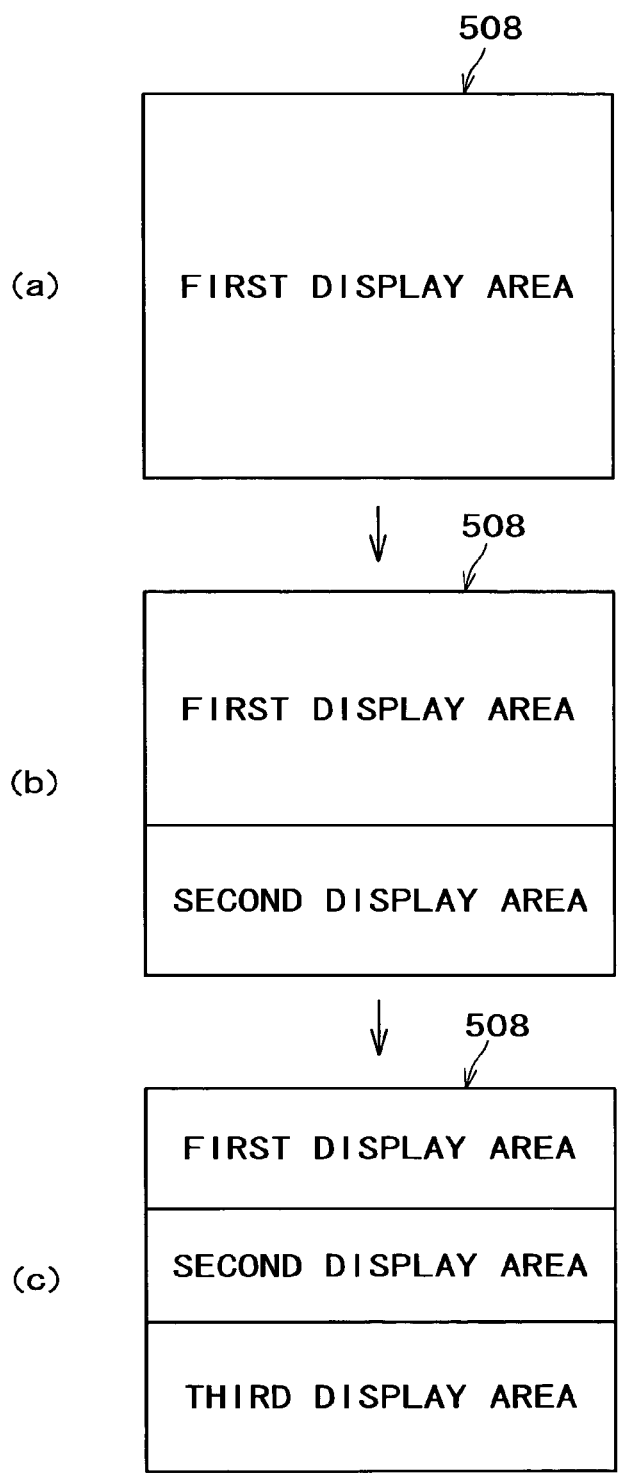

The following describes variations in which display areas are allocated to the screen display block 508 according to the present embodiment of the invention with reference to FIGS. 18A(a) through 18A(c), 18B(a) through 18B(c), 18C(a) through 18C(c), 18D(a) through 18D(c), 18E(a) through 18E(c), and 18F(a) through 18F(c). These figures schematically show the transitions in which the display areas according to the present embodiment of the invention are allocated.

First, referring to FIG. 18A(a), the first display area is arranged in the screen display block 508. The first display area displays content information such as EPG information which is main contents.

When a content element such as a program is selected from the first display area shown in FIG. 18A(a), a new display area for displaying the detail information bound to the selected content element is added.

Referring to FIG. 18A(b), the second display area, which is a newly allocated display area, is arranged below the first display area. Therefore, the first display area is reduced by the size of the second display area. It should be noted that, in the reduction of the first display area, it is practicable to reduce the first display area with a necessary portion left unchanged. This processing will be described later.

As shown in FIG. 18A(b), the first display area and the second display area are allocated to the screen display block 508 so as to be accommodated in one screen, thereby allowing the visual recognition of each display area in its entirety.

Because the detail information about a content element (for example, a program) in the first display area is displayed in the second display area, the first display area and the second display area are in a master-servant relationship. If the number of layers increases to the second layer or the third layer for example, this master-servant relationship persists. For example, the fifth layer and the sixth layer are in a master-servant relationship.

Referring to FIG. 18A(c), when a content element shown in the second display are is selected, a new display area for displaying the detail information bound to the selected element is added as the third display area. It should be noted that the content elements shown in the second display area include various items and topics such as the profiles of cast and previous stories of a program.

As shown in FIG. 18A(c), after allocation of the first display area and the second display area to the screen display block 508, the third display area is added below the second display area such that these display areas are accommodated in one screen of the screen display block 508.

Referring to FIG. 18B(a), the first display area is displayed in the screen display block 508. It should be noted that the first display area displays content information such as EPG information or the like which is main contents. The following describes the difference from FIGS. 18A through 18C.

As shown in FIG. 18B(b), the second display area is arranged over the first display area. Therefore, the first display area is reduced by the size of the second display area.

When a content element shown in the second display area is selected as shown in FIG. 18B(c), a new display area for displaying the detail information bound to the selected content element is added as the third display area.

As shown in FIG. 18B(c), after allocation of the first display area and the second display area to the screen display block 508, the third display area is allocated below the first display area such that these display areas are accommodated in one screen of the screen display block 508.

Figure 18C:
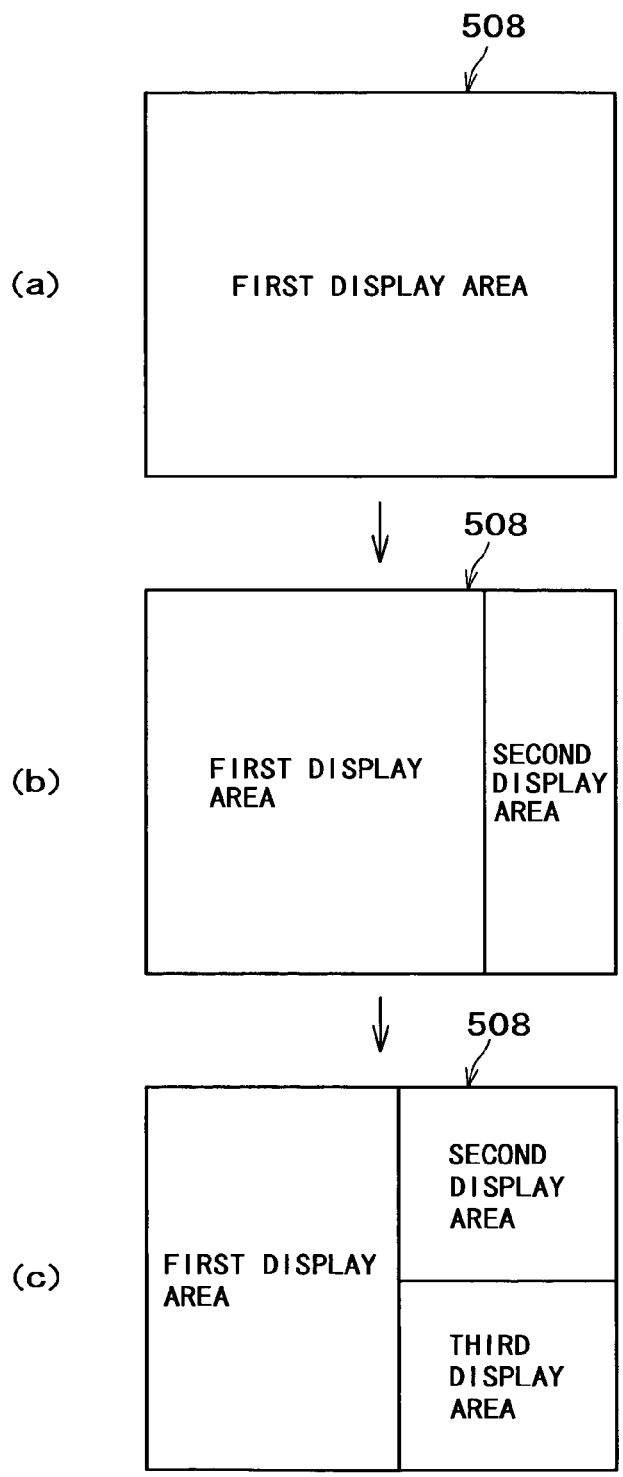

Referring to FIG. 18C(a), the first display area is shown in the screen display block 508. It should be noted that the first display area shows contents information such as EPG information or the like which is main contents. The following describes the difference from FIGS. 18A(a) through 18A(c).

As shown in FIG. 18C(b), the second display area is arranged to the right of the first display area. Therefore, the first display area is reduced by the size of the second display area.

When a content element in the second display area is selected as shown in FIG. 18C(c), a new display area for displaying the detail information bound to the selected content element is added as the third display area.

As shown in FIG. 18C(c), after the allocation of the first display area and the second display area to the screen display block 508, the third display area is allocated below the second display area such that these display areas are accommodated in one screen of the screen display block 508. Therefore, the second display area is reduced by the size of the third display area.

Figure 18D:
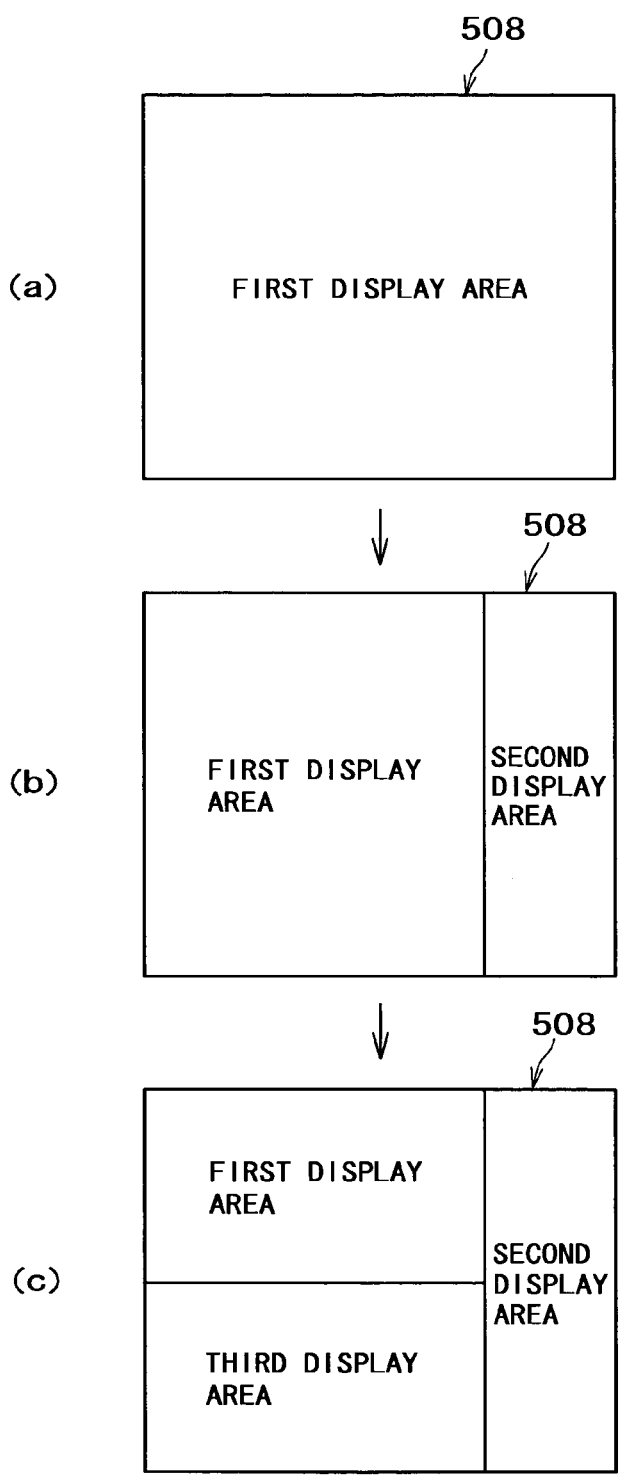

Referring to FIG. 18D(a), the screen display block 508 shows the first display area. It should be noted that the first display area shows content information such as EPG information or the like which is main contents. The following describes the difference from FIGS. 18A(a) through 18A(c).

As shown in FIG. 18D(b), the second display area is arranged to the right of the fist display area. Therefore, the first display area is reduced by the size of the second display area.

Referring to FIG. 18D(c), when a content element displayed in the second display area is selected, a new display area for displaying the detail information bound to the selected content element is added as the third display area.

As shown in FIG. 18D(c), after the allocation of the first display area and the second display area to the screen display block 508, the third display area is allocated below the first display area such that these display areas are accommodated in one screen of the screen display block 508. Therefore, the fist display area is reduced by the size of the third display area.

Referring to FIG. 18E(a), the screen display block 508 shows the first display area. It should be noted that the first display area shows content information such as EPG information or the like which is main contents. The following describes the difference from FIGS. 18A(a) through 18A(c).

As shown in FIG. 18E(b), the second display area is arranged to the right of the first display area. Therefore, the first display area is reduced by the size of the second display area.

As shown in FIG. 18E(c), when a content element displayed in the second display area is further selected, a new area for displaying the detail information bound to the selected content element is added as the third display area.

As shown in FIG. 18E(c), after the allocation of the first display area and the second display area to the screen display block 508, the third display area is allocated below the first display area and the second display area such that these display areas are accommodated in one screen of the screen display block 508. Therefore, the first display area and the second display are reduced by the size of the third display area.

Figure 18F:
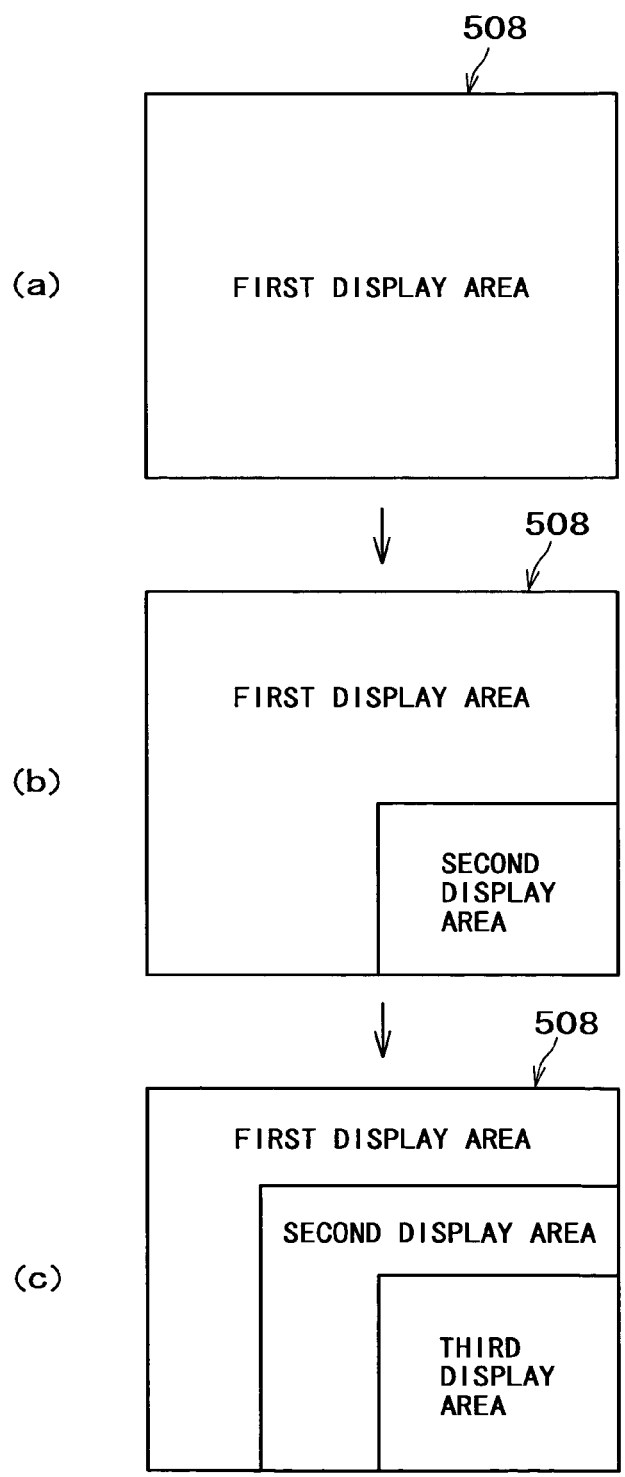

Referring to FIG. 18F(a), the screen display block 508 shows the first display area. It should be noted that the first display area shows content information such as EPG information or the like which is main contents. The following describes the difference from the FIGS. 18A(a) through 18A(c).

As shown in FIG. 18F(b), the second display area is arranged in the lower right corner of the first display area. Therefore the first display area is reduced by the size of the second display area.

As shown in FIG. 18F(c), when a content element displayed in the second display area is selected, a new display area for showing the detail information bound to the selected content element in the second display area is added as the third display area.

As shown in FIG. 18F(c), after the allocation of the first display area and the second display area to the screen display block 508, the third display area is arranged in the lower right corner of the second display area. When the third display area is arranged, the second display area further ensures an area necessary for displaying information while ensuring a predetermined area capable of showing the third display area.

Consequently, the second display area is not overridden by the third display area. The extended area of the second display area and the third display area are allocated by reducing the first display area. It should be noted that the first display area, the second display area, and the third display area are allocated such that they are accommodated in one screen of the screen display block 508.

It should be noted that, in the above-mentioned example, the screen display block 508 according to the present embodiment of the invention shown in FIGS. 18A through 18F shows only the first display area but not exclusively; for example, the screen display block 508 may also show both the first display area and the second display area.

Each display area in each layer shown in FIGS. 18A through 18F dynamically changes in the size of allocated display area in accordance with the amount and attribute of content information to be displayed. Also, each display area is allocated to an area matching the size of the allocated display area. Consequently, the layout of display areas to be allocated depends on the amount of information for example of the content information to be displayed. It should be noted that the amount of information is equivalent to the size of an area for displaying content information or the data capacity of content information and is obtained on the basis of at least one of these size and data capacity.

The following describes the transition in allocating display areas in the screen display block 508 according to the present embodiment of the invention when EPG information is displayed in the first display area, with reference to FIGS. 19A and 19B and FIGS. 20A through 20D. These figures schematically show the transition in allocating display areas with EPG information shown in the first display area according to the present embodiment of the invention.

Referring to FIG. 19A, only the first display area is allocated to the screen display block 508. The first display area shows EPG information, displaying a broadcasting schedule of programs to be broadcast by broadcasting stations. It should be noted that, for the EPG information shown in FIGS. 19A and 19B, only the broadcast programs of broadcasting stations in time zones 19:00 to 21:00 are displayed, scrolling the program guide of EPG information up and down by means of the input block (not shown) can display the broadcast programs of other time zones.

The display areas of the screen display block 508 shown in FIGS. 19A and 19B correspond to those shown in FIGS. 18A through 18F. For example, the first display area shown in FIG. 19A corresponds to the first display area shown in FIG. 18A (a). The first display area and the second display area shown in FIG. 19B correspond to those shown in FIG. 18A(b).

As shown n FIGS. 19A and 19B, with "Station A" which is a broadcasting station, program A1 and program A2 are scheduled for broadcasting as content elements in a time zone 19:00 to 21:00. With "Station B" which is another broadcasting station, program B1 and program B2 are scheduled for broadcasting in a time zone 19:00 to 21:00. With "Station C" which is still another broadcasting station, program C1 and program C2 are scheduled for broadcasting.

Next, when program B2 is selected through the input block, the first display area is reduced so that the selected program and the programs (program A1, program A2, program C1, and program C2) of other broadcasting stations which are to be broadcast in the same time zone as program B2 are partially displayed in the first display area. Consequently, when the first display area is reduced, any other programs than those in the same time zone as program B2 are excluded from the first display area. It should be noted that, of the above-mentioned EPG information, programs are obtained by the partial acquisition block 510 so as to partially display the programs.

In the above-mentioned example, the first display area according to the present embodiment of the invention is reduced so as to leave displayed the selected program and the programs of other broadcast stations which are to be broadcast in the same time zone as the selected program; but the invention is not restricted to this configuration. For example, it is also practicable for the first display area to be reduced to leave displayed the selected program and the programs of the same broadcasting station which are to be broadcast in other time zones or to leave displayed the selected program and other programs of the same category or attribute as the selected program. In the case where the programs to be broadcast in other time zones of the same broadcasting station are left displayed, the vertical areas of the same broadcasting station are left in the reduced first displayed area. For example, if the selected program is program B2, the vertical areas are those in which program B1 and program B2 are displayed.

Whether to reduce the first display area so as to display the selected program and other programs of the same time zone of different broadcasting stations or so as to display the selected program and other programs of the same broadcasting station in other time zones can be selected by registering beforehand this selection with the setting information (not shown) which is stored in a storage block (not shown) of the screen display apparatus 101.

As described above, when the first display area is reduced, the reduced first display area is as indicated by dashed lines as shown in FIG. 19A. Because this reduced first display area is located at the center of the screen of the screen display block 508, it is moved to the top of the screen of the screen display block 508 in a sliding manner. This movement in a sliding manner will be described later.

By moving the reduced first display area to the top of the screen of the screen display block 508, another display area can be allocated to the lower part of the screen of the screen display block 508.

As shown in FIG. 19B, the reduced first display area is in the upper part of the screen of the screen display block 508. In addition, the second display area is newly allocated to the lower part of the screen of the screen display block 508 so as to display the detail information associated with program B2. The allocated second display area displays the above detail information.

The screen display block 508 shown in FIG. 19B is allocated with the first display area and the second display area in the vertical direction. The first display area shows the selected program B2 and other programs (program A1, . . . , program C2) which are in the same time zone as the selected program. The second display area shows the detail information bound to the program B2 selected in the first display area.

Consequently, the layered relationship between a content element in the first display area on the screen display block 508 and this content element's detail information shown in the second display area facilitates the inference of the association between content elements and their detail information. In addition, displaying the information of the display areas of all layers such as the first display area and the second display area for example all over the screen makes it easy the visual recognition of the entire information, thereby enhancing the efficiency of thinking processes.

It should be noted that, in the above-mentioned example, the first display area and the second display area are allocated to the screen of the screen display block 508. However, the invention is not restricted to this configuration. For example, it is also practicable to allocate one or more display area such as a third display area and so on.

In the above-mentioned example, for the pattern of allocating display areas to the screen of the screen display block 508 shown in FIGS. 19A and 19B, the allocation pattern shown in FIG. 18A is used. However, the invention is not restricted to this configuration. For example, the allocation pattern of display area may be any of those shown in FIGS. 18B through 18F.

Figure 20A:
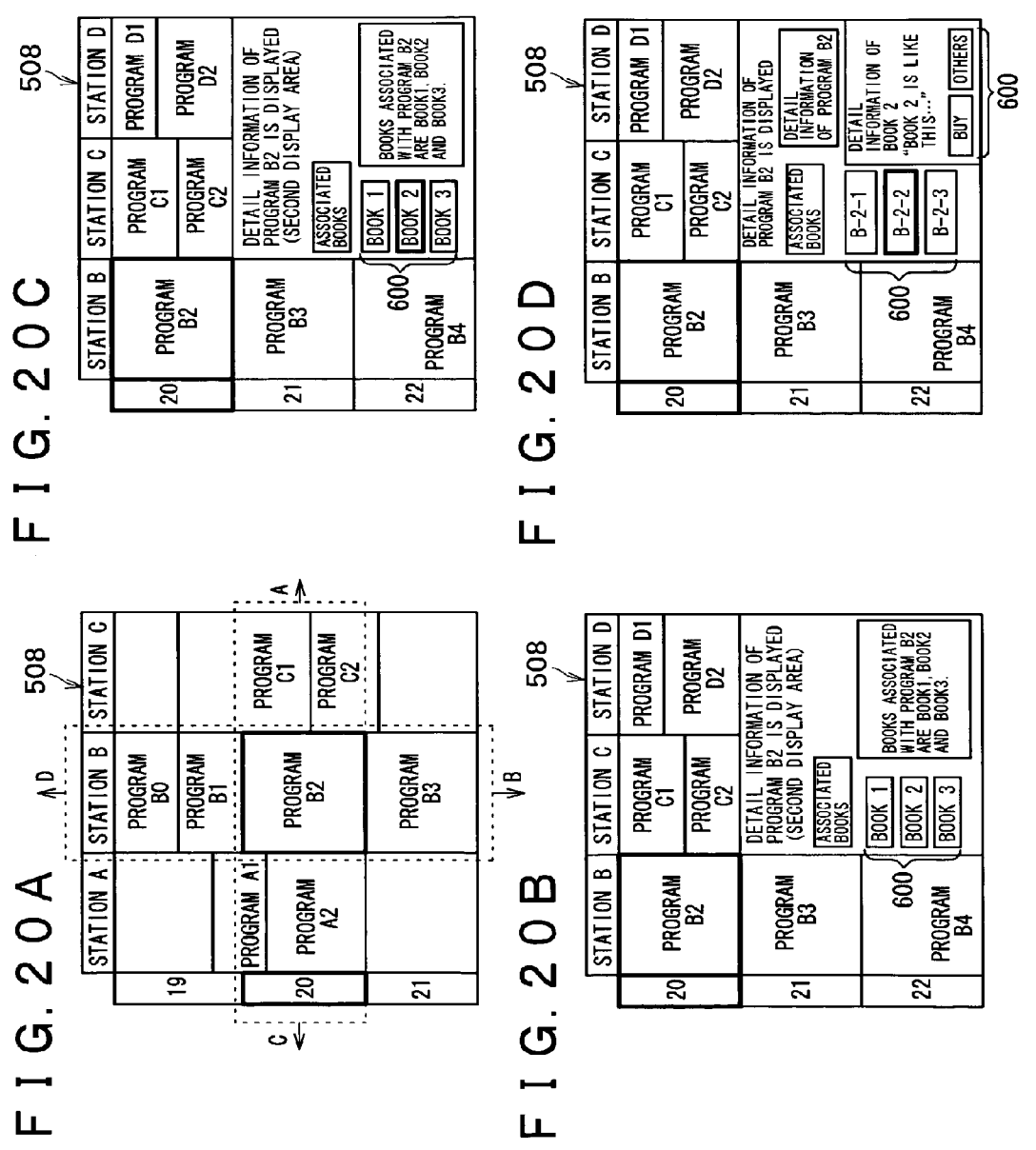

Referring to FIG. 20A, only the first display area is allocated to the screen of the screen display block 508. The first display area shows EPG information, displaying the broadcasting schedules of the programs of different broadcasting stations. It should be noted that the EPG information shown in FIGS. 20A through 20D shows the programs only in the time zone of 19:00 to 21:00; by scrolling the program guide of EPG information through the input block (not shown), programs of other time zones can be displayed.

The display areas of the screen display block 508 shown in FIGS. 20A to 20D correspond to those shown in FIG. 18F described above. For example, the first display area shown in FIG. 20A corresponds to the first display area shown in FIG. 18F(a). The first display area and the second display area shown in FIG. 20B correspond to the first display area and the second display area shown in FIG. 18F(b).

As shown in FIGS. 20A through 20D, with broadcasting station "Station A", program A1 and program A2 are scheduled for broadcasting as content elements in time zone 19:00 to 21:00. Likewise, with broadcasting station "Station B", program B0, program B1, program B2, and program B3 are scheduled for broadcasting in time zone 19:00 to 21:00. With broadcasting station "Station C", program C1 and program C2 are scheduled for broadcasting.

When program B2 is selected through the input block, the first display area is reduced such that the selected program B2 and the programs (program C1, program C2, and program B3) around the program B2 are displayed in the first display area as the areas indicated by dashed lines shown in FIG. 20A. It should be noted that the number of programs to be displayed is determined in accordance with the size of the reduced first display area. When the first display area is reduced, the programs other than those arranged around program B2 are excluded from the reduced first display area. Of the EPG information shown in the first display area, in order to partially display a program, the partial acquisition block 510 acquires that program.

For example, if there is room in the reduced first display area, programs (program D1 and program D2, for example) arranged in the direction indicated by arrow A and programs (program B4 for example) arranged in the direction indicated by arrow B are displayed in the first display area.

It should be noted that, in the above-mentioned example, program B2, program C1, program C2, and program B3 are displayed in the reduced first display area shown in FIG. 20A, but not exclusively. For example, the reduced first display area may be a horizontally reversed "L" shaped area (displaying program B0, program B1, program B2, program A1, and program A2) as shown in FIG. 20A.

When program B2 is selected through the input block, the first display area is reduced to an area shaped a vertically reversed "L" such that selected program B2 and the programs (program B3, program C1, and program C2) around it are displayed in the reduced first display area. It should be noted that the allocation pattern for allocating the programs in the above-mentioned reduced area having vertically reversed "L" shape is registered with above-mentioned setting information for example beforehand.

As described above, when the first display area is reduced to an area having vertically reversed "L" shape, the reduced first display area becomes an area indicated by dashed lines extending in the directions of arrow A and arrow B. Because the reduced first display area is located at the center of the screen of the screen display block 508, it is moved to the upper left of the screen of the screen display block 508 in a sliding manner. This movement by sliding will be described later.

By moving the reduced first display area to the upper left of the screen of the screen display block 508, a display area can be allocated to the lower right of the screen of the screen display block 508.

As shown in FIG. 20B, the reduced first display area is located in the upper left of the screen of the screen display block 508. Further, the second display area for displaying the detail information associated with program B is newly allocated at the lower right of the screen of the screen display block 508. The above-mentioned detail information is shown in the allocated second display area.

The second display area shown in FIG. 20B displays the detail information associated with program B2 and icons 600 composed of "Book1" icon, "Book2" icon, "Book3" icon, and "Book4" icon.

As shown in FIG. 20B, the detail information a text message such as "The books associated with program B2 are book1, book2, and book3" for example. It should be noted that the detail information is not restricted to this example; for example, the detail information may be configured by a still-picture, a moving-picture, or audio information.

The screen display block 508 shown in FIG. 20B is allocated with the second display area to the lower right of the first display area. The first display area shows the selected program B2 and the programs (program B3, program B4, program C1, program C2, program D1, and program D2) around it. The second display area shows the detail information bound to program B2 selected in the first display area.

Referring to FIG. 20C, of the icons 600 displayed in the second display area, a desired icon 600 is selected through the input block. When an icon 600 is selected, the frame of the selected icon becomes thick as "Book2" icon for example, indicating that this icon is active.

When an icon 600 is selected, the detail information associated with the selected icon 600 is displayed in the third display area. Below the layer of the detail information displayed in the second display area including the selected icon 600, the detail information which is displayed in the third display area is located. Consequently, the detailed information narrower in range than that of the second display area is displayed in the third display area.

Referring to FIG. 20D, when "Book2" icon is selected, the detail information associated with "Book2" is displayed in the third display area, so that the second displayed area is reduced to an area having vertically reversed "L" shape. The second display area is reduced so as to correspond to the second display area shown in FIG. 18F(c). It should be noted that the reduction of the second display area varies in accordance with the amount of detail information, of which detail will be described later.

By allocating the third display area to the space provided by the reduction of the second display area, the detail information associated with "Book3" can be displayed in the allocated third display area. It should be noted that the third display area shows icons 600 such as "Buy" for purchasing Book2 and the detail information associated with "Book2" as in the second display area.

It should be noted that, in the above-mentioned example, the second display area and the third display area shown in FIGS. 20A through 20D show the detail information associated with the information of which category is a book. The invention is not restricted to this configuration. For example, the second display area and the third display area may also show the detail information of which category is program contents, music, or cast, for example. In this case, the first display area shows icons 600 corresponding to categories.

There is a layered relationship between the content elements shown in the first display area, the detail information shown in the second display area, and the detail information shown in the third display area and the lower right corner of the screen, which is high in probability of attention, shows the detail information of the lowest layer. This configuration facilitates the inference of the association between the content elements such as programs and their detail information. In addition, displaying the information of the display areas of all layers such as the first display area and the second display area for example all over the screen makes it easy the visual recognition of the entire information, thereby enhancing the efficiency of thinking processes such as motivation for sequentially selecting information, from one layer to another.

It should be noted that, in the above-mentioned example, the first display area, the second display area, and the third display area are allocated to the screen of the screen display block 508. However, the invention is not restricted to this configuration. For example, it is also practicable to additionally allocate a fifth display area and so on.

In the above-mentioned example, for the pattern of allocating display areas to the screen of the screen display block 508 shown in FIGS. 20A through 20D, the allocation pattern shown in FIG. 18F is used. However, the invention is not restricted to this configuration. For example, the allocation pattern of display area may be any of those shown in FIGS. 18B through 18F.

[Screen Display Operation]

Figure 21:
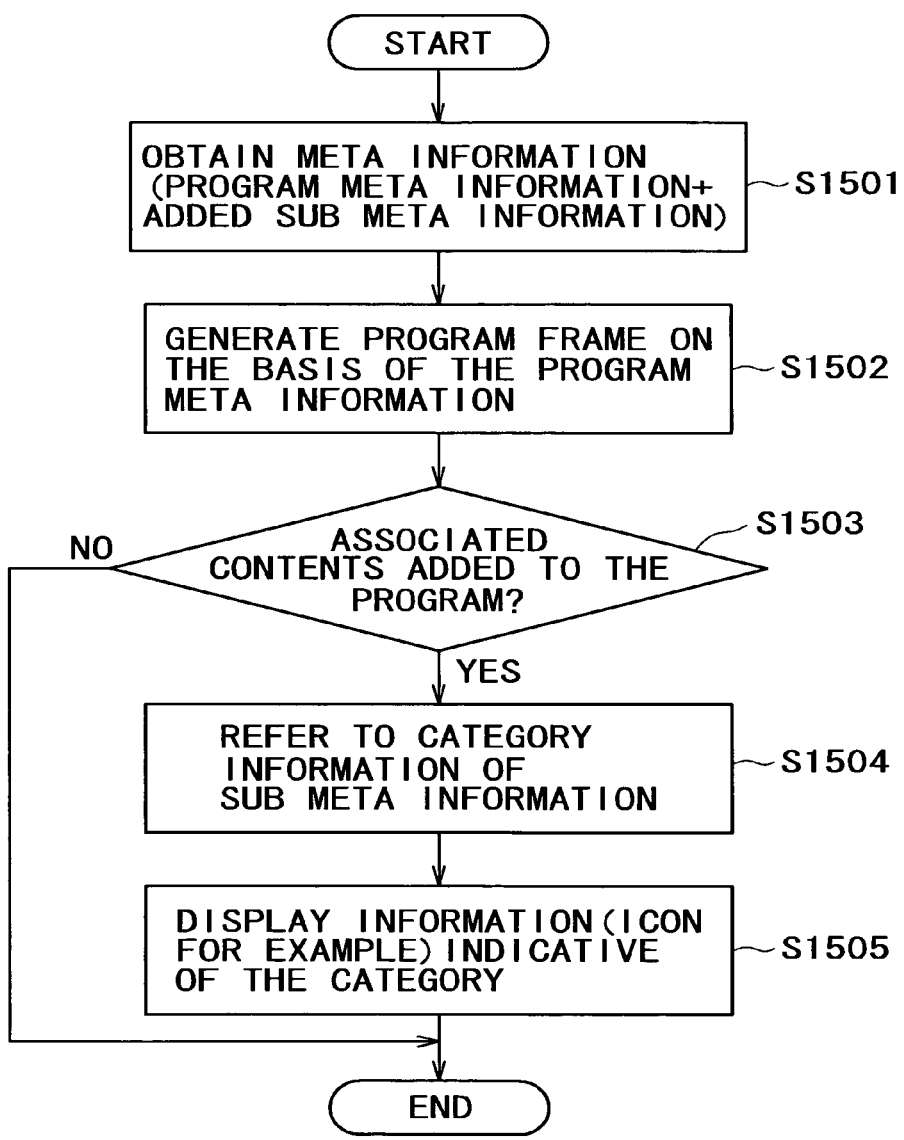
FIG. 21 is a flowchart approximately describing a screen display operation of the screen display system.

The following describes a screen display operation which is applied to the screen display system 100 configured as described above, with reference to FIG. 21. FIG. 21 is a flowchart which outlines a screen display operation of the screen display system 100 according to the present embodiment of the invention.

As shown in FIG. 21, the screen display apparatus 101 receives meta information from the directory service server 106 or the contents service server 107 (S1501). It should be noted that, before receiving meta information, the screen display apparatus 101 must receive meta information reference ID from the broadcasting station 105. The following briefly describes the reception of meta information reference ID.

In order to send meta information reference ID to the screen display apparatus 101, the broadcasting station 105 executes program organization processing through the program organization block 201. When the program organization has been completed in the broadcasting station 105, the main meta information (or program meta information) and sub meta information associated with the organized program are generated. It should be noted that the meta information reference ID for identifying the program is allocated in advance.

Next, the program meta information attachment block 203 and the sub meta information attachment block 202 attach the above-mentioned program meta information and sub meta information to the organization information generated by the organization processing. It should be noted that, in the organization processing for example, attribute information is set to each meta information.

Of the sub contents associated with the program, sub contents for example is selected as detail information to be presented to the viewer and the selected sub contents is associated with the meta information reference ID. In addition, by attaching the meta information reference ID corresponding to that program to the organization information, the program meta information or the sub meta information is associated with each other as shown in FIG. 9.

The program meta information and the sub meta information are bound to the meta information reference ID. Consequently, the program meta information, the sub meta information, and sub-sub meta information for example bound to the above-mentioned meta information reference ID form a data structure which is hierarchically integrated as shown in FIG. 9 by use of the meta information reference ID as a key.

Acquisition of meta information reference ID allows the extraction of only the necessary program meta information or sub meta information from the above-mentioned meta information group bound to that meta information reference ID, thereby partially acquiring the meta information.

Associating the sub meta information and the sub-sub meta information with the meta information reference ID allows to access the sub meta information, sub-sub meta information, or program meta information. It should be noted that the meta information reference ID and the meta information such as program meta information and the sub meta information are collectively held in the directory service server 106.

The sub meta information (including sub-sub meta information), the content information and detail information associated with the sub meta information for example, and the goods associated with content elements are held in the contents service server 107.

When the organization processing has been completed, the identification information transmission block 207 sends basic EPG information and the meta information reference ID associated with this basic EPG information via broadcast wave. It should be noted that the identification information transmission block 207 is also practicable when sending the basic EPG information and the meta information reference ID via the network 103.

The identification information transmission block 207 not only distributes meta information reference ID along with the broadcasting of a program, but also distributes meta information reference ID in advance by attaching the meta information reference ID to or including the same in the basic EPG information which is distributed by various EPG information distribution services.

It should be noted that, in the above-mentioned example, the identification information transmission block 207 according to the present embodiment of the invention sends meta information reference ID along with basic EPG information. However, the invention is not restricted to this configuration. For example, in according with the main contents to be provided, the identification information transmission block 207 may also send only meta information reference ID.

The meta information acquisition/storage block 503 of the screen display apparatus 101 stores the meta information reference ID transmitted via broadcast wave or the network 103 for each broadcasting station 105.

To be more specific, after transmitting the above-mentioned meta information reference ID and program meta information to the screen display apparatus 101, the directory service server 106, upon request from the screen display apparatus 101, sends the sub meta information for example bound to the meta information reference ID to the screen display apparatus 101.

In the distribution via broadcast wave, meta information reference ID can be transmitted along with basic EPG information by allocating the meta information reference ID as a descriptor attribute value of the table information in the SI.

It should be noted that, in the above-mentioned example, the identification information transmission block 207 according to the present embodiment of the invention executes distribution by newly adding meta information reference ID. However, the invention is not restricted to this configuration.

For example, instead of meta information reference ID, a value which can uniquely identify main contents may be used as meta information reference ID. For example, if the main contents is a broadcast program, a value consisting of a plurality of combinations such as combinations of the service ID and the event ID included in the SI information of broadcast wave may be used as meta information reference ID.

Consequently, by receiving basic EPG information and meta information reference ID through the content information acquisition block 505 of the screen display apparatus 101, the content information acquisition block 505 acquires various pieces of meta information such as program meta information and sub meta information from the directory service server 106 (S1501) as shown in FIG. 21.

Figure 22A:
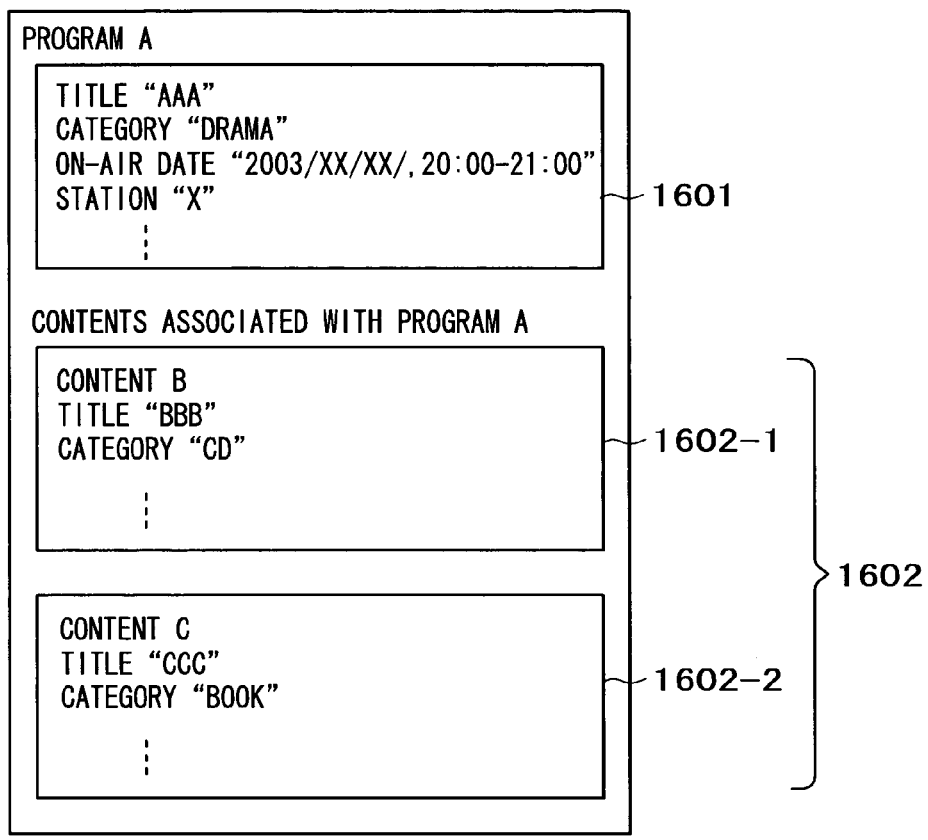
FIGS. 22A, 22B, and 22C are diagrams schematically illustrating another screen display operation of the screen display system.

Referring to FIG. 22A, the directory service server 106 or the contents service server 107 stores and/or manages various pieces of meta information and sub meta information for example. Program meta information 1601 is the program meta information of program A which includes program meta information which is title "AAA", program meta information which is genre "Drama", program meta information which is broadcasting date "2003/XX/XX 20:00 to 21:00", and program meta information which is broadcasting station "X", for example.

Each piece of meta information includes attribute information. In the attribute information of the program meta information of the above-mentioned program A, the attribute value of the above-mentioned "Title" is "AAA" and the attribute value of the above-mentioned "Genre" is "Drama", for example.

The above-mentioned program meta information 1601 is transmitted from the directory service server 106 to the screen display apparatus 101 via the network 103.

Referring to FIG. 22A, sub meta information 1602 is the sub meta information associated with program A. Sub meta information 1602-1 includes the sub meta information which is title "BBB" and the sub meta information which is category "CD" for example. Sub meta information 1602-2 includes the sub meta information which is title "CCC" and the sub meta information which is category "Book" for example.

The above-mentioned sub meta information 1602 is bound to the program meta information which is a main with meta information reference ID being a key. Therefore, when program meta information is selected, the directory service server 106 can recognize the sub meta information associated with that program meta information.

Receiving the program meta information, the meta information acquisition/storage block 503 of the screen display apparatus 101 stores the received program meta information by relating it with the meta information reference ID and the basic EPG information.

The display screen generation block 507 of the screen display apparatus 101 generates a program frame in the EPG information (or the electronic program guide) on the basis of the received program meta information, the meta information reference ID, and the basic EPG information (S1502).

Figure 22B:
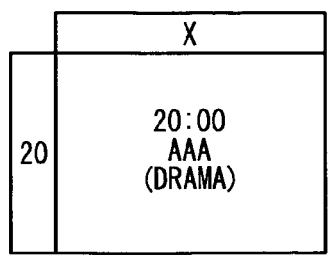

Referring to FIG. 22B, the program frame in the EPG information (or the electronic program guide) is the frame of the arrangement area of programs which are content elements configuring the program guide. The program frame of program A shown in FIG. 22B is a program frame in which the broadcasting station is "X", the broadcast time zone is 20:00, the title is "AAA", and the genre is "Drama".

When the above-mentioned program frame has been generated, the display screen generation block 507 determines the position of displaying the program frame in the display screen on the basis of the broadcasting station and broadcasting time of the program indicated the program meta information.

Next, as shown in FIG. 21, the display screen generation block 507 of the screen display apparatus 101 inquiries the directory service server 106 whether or not there is the sub meta information and so on associated with the generated program frame of program A.

In response, the directory service server 106 searches for the sub meta information and so on associated with program A and sends a search result to the screen display apparatus 101.

If the sub meta information and so on associated with program A are found as a result of the search (S1503), then the acquisition request block 502 of the screen display apparatus 101 accesses the directory service server 106 to reference the sub meta information and so on found by the search (S1504).

After accessed by the acquisition request block 502 of the screen display apparatus 101, the directory service server 106 sends the sub meta information of category "CD" included in the sub meta information 1602-1 and the sub meta information of category "Book" included in the sub meta information 1602-2.

The icon generation block 514 references a category attribute value which is the attribute information included in the sub meta information, thereby generating the icon data which correspond to that category. The item or child content element such as the generated icon data are attached to the program frame and displayed by the screen display block 508. The position of the attachment may be inside or outside of the program frame, whichever is easier in visual recognition of the correlation with the programs.

It should be noted that, for the icon generation block 514 to generate the above-mentioned icon data, the screen display apparatus 101 may store the templates and so on corresponding to categories into its storage block in advance or receive icons which has already generated from the directory service server 106 or the contents service server 107. The timing of the reception may be the time at which EPG information is displayed on the screen, sequentially, or at predetermined intervals.

The content information acquisition block 505 of the screen display apparatus 101 obtains the sub meta information of the above-mentioned category "CD" and the sub meta information of the above-mentioned category "Book". After the acquisition, the meta information acquisition/storage block 503 stores the acquired sub meta information by relating it with the already stored basic EPG information, program meta information, and meta information reference ID. Consequently, the meta information reference ID, the program meta information, and so on can be uniquely identified from the received sub meta information to acquire the identified information.

Figure 22C:
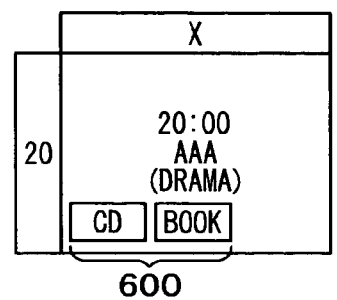

Next, the icon generation block 514 of the screen display apparatus 101 generates the icon data for representing the category of detail information from the above-mentioned sub meta information. As shown in FIG. 22C, from the category attribute values of "Book" and "CD", the icon generation block 514 references the icon data templates to generate the icon data of "Book" and "CD".

The generated icon data "Book" and the icon data "CD" are displayed as a "Book" icon and a "CD" icon respectively at predetermined positions of the program frame. It should be noted that the icons 600 may be arranged at any other positions than shown in FIG. 22C; however, it is desirable to arrange the icons 600 at a certain position together in order to enhance the visual recognition thereof. If there is no category, the icons are not displayed inside the program frame.

It should be noted that, if no information such as the sub meta information and so on associated with program A is found as a result of the above-mentioned search (S1503), the screen display block 508 displays the generated program frame of program A, and subsequently generates the program frames for all received program meta information, upon which the screen display processing according to the present embodiment of the invention comes to an end. In what follows, the operation to be performed after EPG information is displayed on the display screen will be briefly described.

When the program frames have all been generated and displayed on the screen display block 508 as EPG information, a desired program or an icon 600 shown in the program frame can be selected. When the user selects the icon 600 of each category, the selection accept block 504 accepts the selection and the acquisition request block 502 requests the meta information of the content included in the category among the contents bound to the selected program.

Next, in order to obtain the corresponding meta information and the detail information and so on of the link destination from the URI information included in this meta information, the content information acquisition block 505 accesses the storage block of the screen display apparatus 101 and the directory service server 106 to obtain the relevant meta information and detail information.

The acquired meta information and detail information are displayed in the display area as content information. Further, by selecting the content displayed in the list, the detail information and so on can be referenced and displayed.

It should be noted that, if there is no corresponding meta information in the storage block of the screen display apparatus 101 for example, the screen display apparatus 101 can make a inquiry to the directory service server 106 or the contents service server 107 via the network 103.

In the above-mentioned example, the category attribute values are commercial products such as "CD" and "Book". However, the invention is not restricted thereto. For example, various other categories are possible, such as price range and person, for example.

The second display area is used to display the detail information and associated information of the content elements shown in the first display area.

For example, the detail information or associated information of a content element onto which the mouse cursor or the like has been moved on the screen display block 508 on which EPG information is displayed is displayed in the second display area.

When the cursor moves onto the content element of "Broadcasting Station", namely when the cursor moves onto the rectangle area in which broadcasting station "X" shown in FIG. 22B is displayed, the information about that broadcasting station and the program information recommended by the broadcasting station are displayed.

When the mouse cursor for example has been moved over the screen display block 508 on which EPG information is displayed onto content element "Program", the detail information associated with this program is displayed in the second display area.

If the icon 600 displayed for each category in the program frame is selected, the second display area displays a list of sub contents such as the detail information of matching category among the sub contents associated with the program indicated by the selected icon 600.

For the list of sub contents information, which is detail information, various kinds of meta information belonging to the layer below the sub meta information associated with this icon 600 stored beforehand in the storage block of the screen display apparatus 101 are displayed. It should be noted that the screen display apparatus 101 queries the directory service server 106 for example for various kinds of meta information via the network 103 from time to time as required.

For example, if "Cast" icon 600 is selected among the icons 600 displayed in program A, the selection accept block 504 of the screen display apparatus 101 obtains the sub meta information from the attribute values associated with the selected icon and sends the acquired sub meta information to the content information acquisition block 505.

The content information acquisition block 505 obtains, from its storage block, the sub meta information associated with the sub meta information received from the selection accept block 504.

The screen display block 508 displays a list of the acquired sub meta information into the second display area. For example, the second display area shows a list of the names of cast appearing in the program A.

Next, from the list of content element "Cast" shown in the second display area, the user selects the name of a desired cast of program A by use of the input block such as the mouse. The detail information including the cast profile information belonging to the layer below the layer of the sub meta information associated with the selected name is displayed. It should be noted that the detail information, which is content information, may be transmitted via the network 103 on the basis of the URI information included in the sub meta information.

Therefore, the display area generation block 509 allocates an area in which to display the detail information associated with the selected cast on the display screen.

At the same time, the display area control block 511 reduces the EPG information displayed in the first display area. In order to accommodate the EPG information into the reduced first display area, the EPG information is partially taken and the partially taken EPG information is put in the reduced first display area. It should be noted that the partially taken information may include only a list of broadcasting stations (or channels) to one of which the currently selected program belongs, for example.

In addition to the above-mentioned partially acquiring method, various rules may be set as methods of partial acquisition for acquiring the information around a selected program. For example, "only the specified program is acquired", "programs of other channels in the same time zone as the specified program are acquired", and so on. These partial acquisition rules may be registered beforehand with the setting information stored in the storage block of the screen display apparatus 101.

The partially taken EPG information is accommodated in the moved and reduced first display area. The movement of the first display area may be practiced with a transition effect which attracts visual attention from users, such as the movement in a sliding manner.

At the same time, the display area control block 511 changes the display position of the sub contents in the second display area. This sub contents is moved into the space provided by the reduction of the first display area.

It should be noted that, upon movement of the second display area with a transition effect such as sliding for example, the third display area is newly allocated to the free space by the display area generation block 509, in which the detail information such as selected cast's profile and other associated information are displayed. It should be noted that this content information is stored beforehand in the storage block of the screen display apparatus 101 or in the contents service server 107.

Further selecting an item such as the icon 600 from the list of the detail information and other associated information displayed in the third display area allows the allocation of the fourth display area in which to display the detail information and associated information. Likewise, it is practicable to allocate display areas each consisting of a plurality of layers as the first display area, the second display area, and so on to the screen display block 508.

It should be noted that the display areas of all layers are displayed on one screen of the screen display block 508. If each display area has a plurality of layers, the information displayed in the display areas of these layers is associated with one the other.

Consequently, displaying all information such as content information for example throughout all the layers into one screen facilitates the visual grasping of the entire information. In addition, displaying the information displayed in the display areas of all layers into one screen together facilitates the understanding of the information on all layers in a multilateral manner.

Even when browsing the information of relatively lower layers, selecting an item such as icon 600 for example by moving up the cursor to the display area of an upper layer facilitates the displaying of the information such as content information for example belonging to upper layers. For example, in browsing the detail information of a person associated with a program, it becomes easy to select another program shown in the first display area. It should be noted that, when a program shown in the reduced first display area has been selected, the first display area may be expanded to display the EPG information all over the screen.

[Allocating Operation of Display Area]

Figure 23:
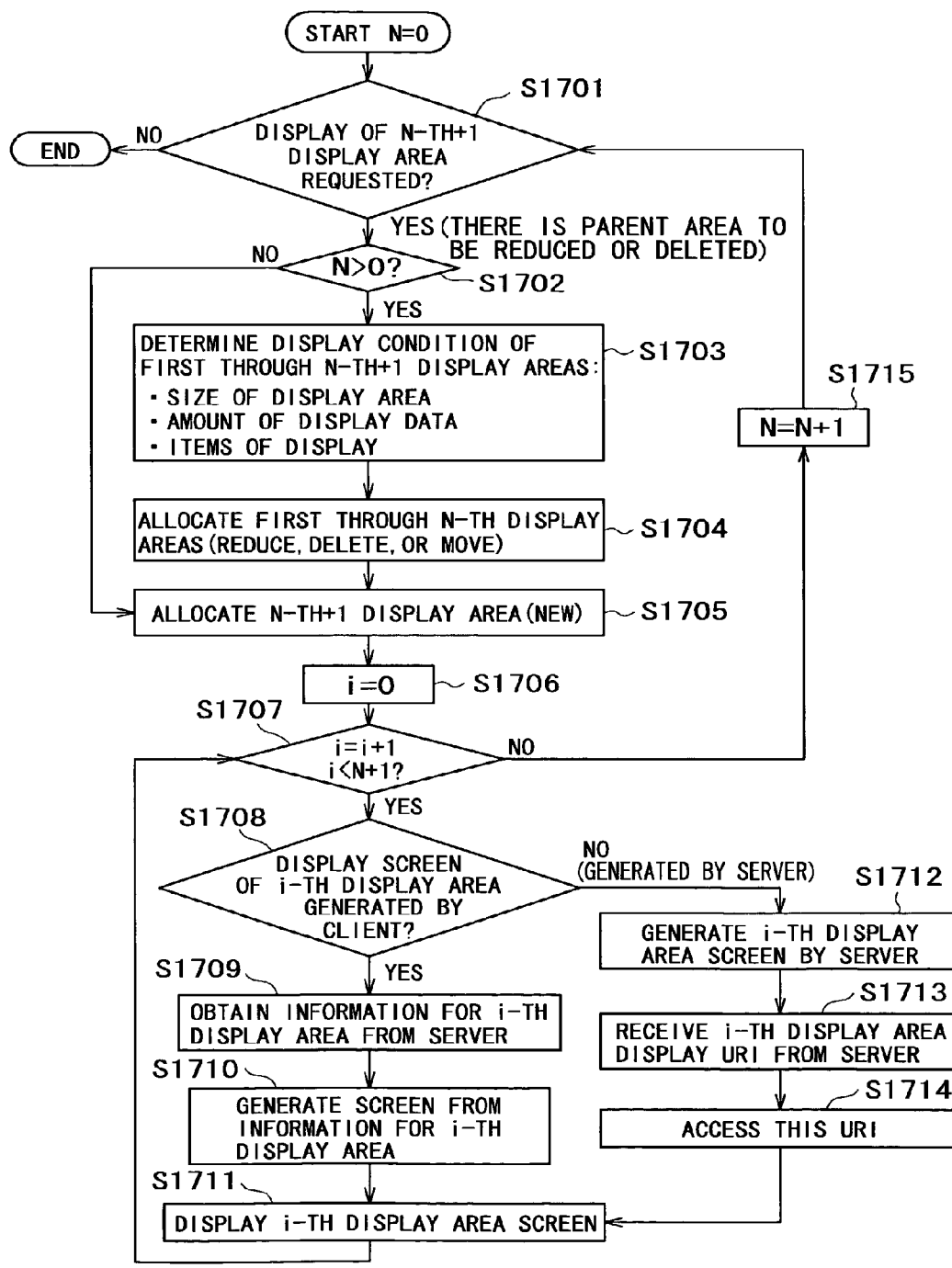
FIG. 23 is a flowchart approximately describing an allocation operation of the display areas of the screen display system.

The following describes the operation of display area allocation which is applied to the screen display system 100 configured as described above, with reference to FIG. 23. FIG. 23 is a flowchart outlining the operation of display area allocation of the screen display system according to the present embodiment of the invention.

In the display area allocating operation according to the present embodiment of the invention, the screen to be displayed in each display area of the screen display block 508 of the screen display apparatus 101 is generated by the screen display apparatus 101 by use of a template on the basis of the information received from the screen display apparatus 101 or acquired from the site which stores the display screen data generated by the directory service server 106 by accessing this site from the screen display apparatus 101 by use of URI information.

If the display screen data is generated by the client side, a method is possible in which the meta information prepared in the server is acquired and the display screen data is generated by executing template conversion of the acquired data on the basis of XML and XSLT, for example.

If the screen generated by the server side is accessed for display, the page prepared by the server side is accessed or the URI of the page dynamically generated by starting up an application program (a CGI program for example) of the server side by sending it necessary information from the client is sent to the client side, which then accesses the server, for example.

The above-mentioned two patterns may be used together in the same screen from time to time. For example, generation of the screen data by the client side and generation of the screen data by the server are selected in accordance with display areas and display contents, for example.

Referring to FIG. 23, first the acquisition request block 502 of the screen display apparatus 101 determines whether or not there is a request for displaying the Nth+1 display area (S1701). For example, the acquisition request block 502 determines that there is a request for the displaying of the first display area (or the initial screen), given the initial state (N=0). If N>0, the user selects an item shown in the Nth display area and further requests the displaying of associated information.

If there is a request for displaying the Nth+1 display area for example (S1701), the acquisition request block 502 determines the value of N. If N=0 (S1701), the area necessary for displaying the initial screen is allocated by the display area generation block 509.

If N>0 (S1701), the display area control block 511 determines the display conditions such as display contents of the first display area to the Nth+1 display area (S1703). The display conditions include the display area allocation patterns as shown in FIGS. 18A through 18F, the restrictions such as the display size and data size of each display area, and the restrictions such as the number of items and sizes of the icon 600, text, and image constituting content elements, for example. On the basis of the display conditions of each display area, the number of items to be displayed can be determined.

If the area of the number of items constituting the information such as detail information is greater than the area which can be displayed in a display area, the determination is also made which range of information is to be left displayed in that display area, for example. It should be noted that top priority is given to leave displayed the content element such as a program selected by the user or the item such as the icon 600 selected by the user. If there is room to additionally display a plurality of items for example, those times which are high in correlation with the selected items for example in that the attribute information is the same or similar for example are partially acquired for display.

The correlation of display items is determined by referencing the meta information attached to each item and those display items which have the same attribute value or associated attribute value are selected with priority, for example.

For example, in EPG information, programs or items which are high in correlation with each other have the same attribute value of "Broadcasting station" (namely, the programs on the same channel), have the same attribute value of "Broadcast Time Zone" (namely, the programs to be broadcast in the same time zone), or have the same attribute value of "Cast" (namely, the same cast are performing).

The following describes the processing of determining display areas by the display area control block 511 according to the present embodiment of the invention with reference to FIGS. 24A through 24E. FIGS. 24A through 24E outline the processing of determining display areas according to the present embodiment of the invention.

Referring to FIG. 24A, the screen display block 508 shows main contents information such as EPG information of the first display area all over the screen. For the main contents information, moving/still pictures such as banner advertisement and a plurality of content elements (element A-1, element A-2, . . . , element C-3) constituted by text, for example.

If sub contents information such as associated detail information exists in each content element, the icon 600 is displayed for each category of the detail information. Consequently, by browsing the displayed icon 600, the amount of the information associated with each content element can easily be known.

The second display area shown in FIG. 24B includes the detail information associated with content elements. This detail information belongs below the layer of the content element included in the first display area shown in FIG. 24A.

The detail information shown in FIG. 24B is configured by text information. If the detail information including only text information, the area necessary for displaying the detail information can be computed from the size of each character (or font size), character style (or font style), or the number of characters.

Therefore, before determining the size of each display area, the display area control block 511 determines whether or not the detail information is only of text information. If the detail information is found to be only of text information, the display area control block 511 obtains such information as font size, font style, or the number of characters and determines the size of each display area on the basis of the obtained information. It should be noted that, if the determined size of each display area is greater than the maximum size preset to the setting information, this maximum size is determined as the size of that display area.

The detail information shown in FIG. 24C is configured by text information and image information (element D-1 and element D-3). In displaying detail information configured by both text information and image information, the area necessary for displaying the detail information can be computed from font size, font style, the number of characters as described above, and image size or the number of images. It should be noted that the image size and the number of images can be acquired from the header information for example contained in an image file.

Consequently, when the second display area shown in FIG. 24B is allocated, the first display area and the second display area displayed in one screen of the screen display block 508 as shown in FIG. 24D.

When the second display area shown in FIG. 24C is allocated, the first display area and the second display area are shown in one screen of the screen display block 508 as shown in FIG. 24E. It should be noted that the reduced first display area shows the content information of element A-1, element A-2, and element A-3.

Next, when the size of each of display areas, the first display area to the Nth display area, has been determined (S1703), the display area control block 511 reduces, expands, or moves (S1704) each of these display areas on the basis of the area information determined in the size determination processing (S1703).

It should be noted that, when reducing each of the display areas, the first display area to the Nth display area, the display area control block 511 partially acquires the items such as content elements and icons 600 for example which are displayed in the reduced display area.

At the same time, the display area generation block 509 newly allocates an Nth+1 display area (S1705). After the process of S1705, the display area generation block 509 initializes a counter (i) (S1706) to generate the display screen including detail information to be displayed in each display area and continues the display screen generation processing until the display screens are generated for all display areas (S1707).

The processing of generating display screens including detail information is executed to generate the display screen to be displayed inside the area of each allocated display area. This display screen generation processing may be executed by the client side or the server side for each display area, as required.

If the display screen generation processing is executed by the client side, the display screen generation block 507 of the screen display apparatus 101 obtains the necessary information such as meta information to be displayed in the i-th display area from the directory service server 106 (S1709), generating a display screen on the basis of the acquired information (S1710) as shown in FIG. 11 or FIG. 14. Also, the display screen generation block 507 generates display screens from the information partially acquired by the display area control block 511 at the time of display area reduction.

When the i-th display screen has been generated, the screen display block 508 displays the generated display screen in the area of the allocated i-th display area (S1711). Consequently, various kinds of information including detail information are shown in the display area of the screen display block 508.

If the display screen generation processing is executed by the directory service server 106 (S1712) and the screen display apparatus 101 obtains the above-mentioned display screen (S1713), the URI access block 513 of the screen display apparatus 101 accesses the display screen URI information prepared on the server side (S1714).

Alternatively, the screen display apparatus 101 sends request information to the directory service server 106 for requesting various kinds of information such as icons 600, texts of content element, and images.

Next, the URI information reception block 512 of the screen display apparatus 101 obtains the display screen URI information generated by a CGI program for example of the directory service server 106 (S1713) and obtains the display screen through the URI access block 513 (S1714).

By repeating the above-mentioned processing (S1707 through S1714) for a plurality of layers as required, the content information of each display area is displayed in each display area (S1711). When the content information of each display area is displayed, the value of N is incremented by one (S1715). Thus, the operation of allocating display areas according to the present embodiment of the invention comes to an end.

It is also practicable that, instead of always displaying the layers of all display areas, the number of display areas displayable on the screen may be restricted to "the fourth display area" for example and, if it becomes necessary to display more than the fourth display area, the display areas may be shifted such that the information displayed in a predetermined display area such as the first display area is replaced by the information displayed in the second display area and, subsequently, the information displayed in the Nth+1 display area is replaced by the information displayed in the Nth display area.

In the operation of allocating display areas according to the present embodiment of the invention, the display areas to be displayed on the display screens are allocated before generating these display screens. However, the invention is not restricted to this configuration. For example, display screens to be internally displayed in display areas may be generated before allocating the display areas, thereby displaying the screens including detail information in the display areas.

[Transitional Operation of Display Area]

The following describes a display area transitional operation in the screen display block 508 according to the present embodiment of the invention with reference to FIGS. 25A through 25C, 26A through 26C, 27A and 27B. These figures schematically show the transitions of the display areas according to the present embodiment of the invention.

Figure 25A:
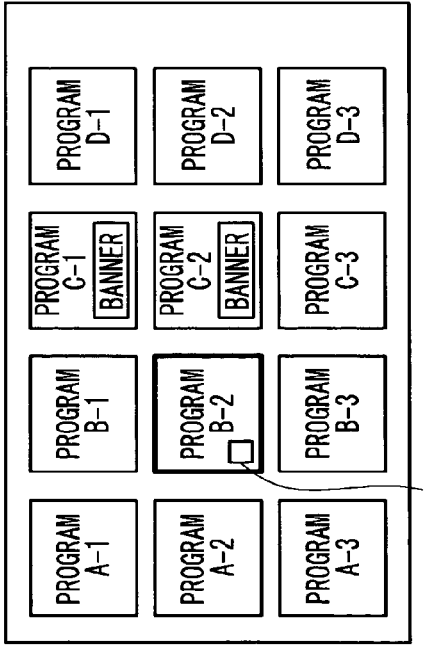
FIGS. 25A, 25B, and 25C are diagrams schematically illustrating a transitional operation of the display areas.

Referring to FIG. 25A, the first display area is allocated to the screen display block 508, displaying EPG information. The EPG information includes program A-1, program A-2, . . . , program D-3.

In the above-mentioned programs, a plurality of selectable icons 600 or banner advertisements are displayed.

As shown in FIG. 25A, when the user selects program B-2 from the programs included in the EPG information displayed in the first display area, the first display area is reduced and the second display area is allocated to display the sub contents information such as detail information associated with the selected program B-2. It should be noted that, in reducing the first display area, the size of the first display area is determined by referencing the display conditions on the basis of the information such as the image size for example of the detail information to be displayed in the second display area.

Figure 25B:
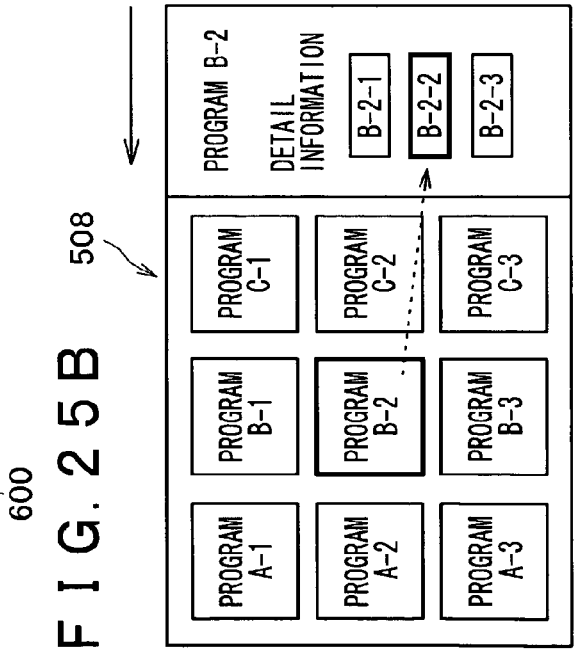

As shown in FIG. 25B, the second display area is moved from the right end of the screen display block 508 in the direction of the arrow in a sliding manner. Therefore, the detail information displayed in the second display area gradually increases in its amount until its entirety is displayed after a predetermined time.

The detail information herein denotes one more pieces of information belonging to layers below the selected content element (program B-2). For the detail information, content elements, B-2-1, B-2-2, and B-2-3 are displayed.

The above-mentioned elements B-2-1, B-2-2, and B-2-3 are the information associated with the program, namely, name of cast, contents of the program, and the original piece of the program, for example, as shown in FIG. 25B.

As shown in FIG. 25B, of the plurality of elements shown in the second display area, if the user pays attention to the element B-2-2 and select it through the input block such as the mouse, the screen display apparatus 101 further reduces the display area of the first display area, thereby allocating the third display area for displaying detail information belonging to the layer below the selected element B-2-2 to a space resulted from the reduction.

When the display range of the first display area is reduced, the partial acquisition block 510 partially acquires the program information of program B-2 which is a part (selected part) selected in the first display area and the part (associated part) associated with program B-2.

The display area control block 511 reduces the first display area so as to display the partially acquired selected part and associated part on the screen. Therefore, the information associated with the first display area and the second display area is displayed on the screen display block 508, thereby facilitating to understand the correlation of information between layers.

Therefore, for reducing the first display area, only the selected program B-2 and the content elements associated with this program B-2 are left displayed, the content elements are rearranged to the size and shape of the reduced first display area if needed, and display positions of the rearranged content elements are moved. By moving the display positions in a sliding manner to allow the user visually grasp the display transition state, the user can efficiently understand the positional relationship of the information before and after the display transition.

Figure 25C:
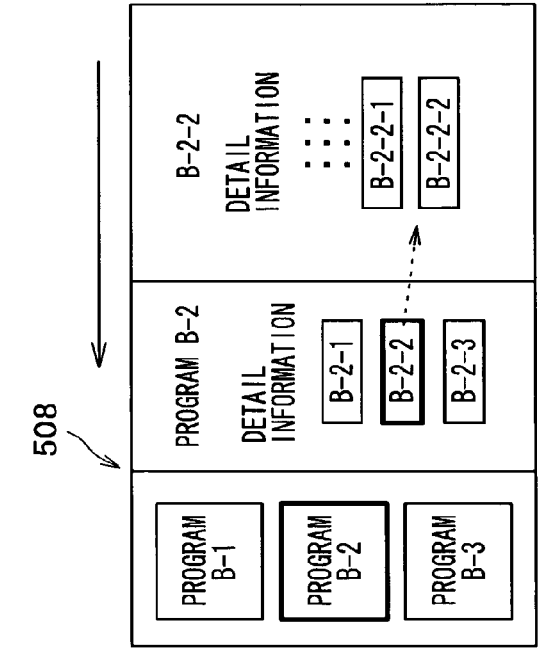

Next, as shown in FIG. 25C, the second display area moves to the space resulted from the reduction of the first display area. In this movement, transitional display is also executed in a sliding manner for example. Further, the third display area is allocated to the space resulted from the moving-out of the second display area, displaying the detail information belonging to the layer below element B-2-2 selected in the second display area in the newly allocated third display area. It should be noted that the second display area may be reduced as required in accordance with the area size of the third display area necessary for displaying the detail information. The above-mentioned processing may also be executed on further layers (from the third display area to the fourth display area, from the fourth display area to the fifth display area, and so on). There is no restriction to the shape of each display area and the position of display area allocation.

Figure 26C:
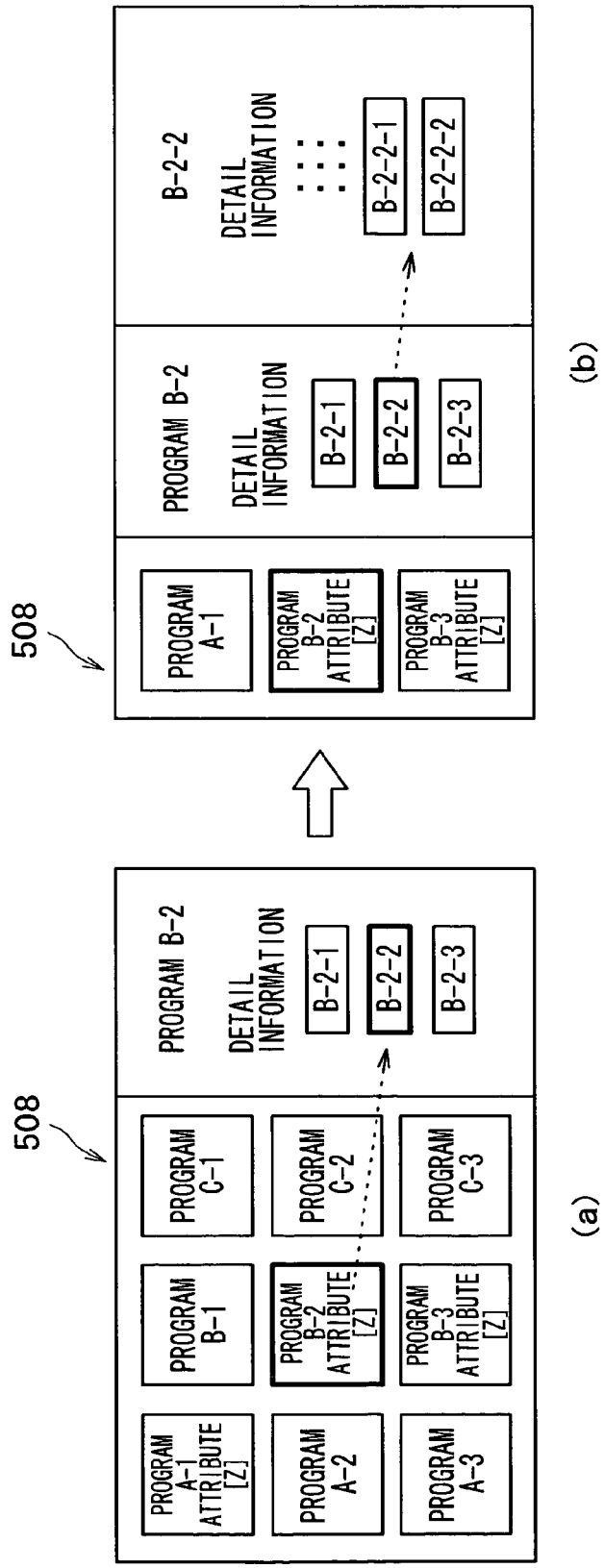

The following describes a variation to the transitional operation of display areas according to the present embodiment of the invention with reference to FIGS. 26A through 26C. It should be noted that the screen display block 508 shown in these figures is allocated with the first display area and the second display area as the initial screen. However, the invention is not restricted to this configuration. For example, only the first display area may be initially allocated.

Referring to FIG. 26A(a), the first display area shows EPG information consisting of a plurality of programs. When "Book" icon displayed in program B-2 is selected, the detail information about "Book" bound to program B-2 is displayed in the second display area.

Referring to FIG. 26A(b), the detail information shown in the second display area has a list of book names associated with program B-2. It should be noted that the configuration is not restricted to a list of book names; for example, an images such as a banner advertisement of books may be displayed in the second display area.

When "Book B-2-2" is selected from the plurality of books, the first display area is reduced in the lateral direction to slide in the left direction of the screen display block 508. As the first display area is reduced, the second display area also slides in the left direction. The third display area is allocated to the space resulted from the reduction of the first display area and the movement of the second display area, the detail information associated with book "B-2-2" being shown in the newly allocated third display area.

Referring to FIG. 26B(a), the first display area shows EPG information consisting of a plurality of programs. When "Book" icon shown in program B-2 is selected, the second display area displays the detail information about "Book" bound to program B-2.

Referring to FIG. 26B(b), the detail information shown in the second display area has a list of book names associated with program B-2. It should be noted that the configuration is not restricted to a list of book names; for example, an image such as a banner advertisement of books may be displayed in the second display area.

Of the above-mentioned plurality of books, when "Book B-2-2" is selected, the first display area is vertically reduced to slide up in the screen display block 508. As the first display area is reduced, the second display area slides below the first display area. Therefore, the first display area is arranged in the upper portion of the display screen and the second display area in the lower portion. The third display area is allocated to the space resulted from the movements of the first display area and the second display area, the detail information for example associated with book "B-2-2" being displayed in this third display area.

Next, as shown in FIG. 26C(a), the first display area shows EPG information consisting of a plurality of programs. When "Book" icon displayed in program B-2 is selected, the detail information of "Book" bound to program B-2 is shown in the second display area. It should be noted that each program constituting the EPG information includes the program meta information associated with the program concerned.

Each program included in the EPG information includes the program meta information indicative of the details of the program. The storage block of the screen display apparatus 101 stores basic EPG information and program meta information in a related manner. This storage block also stores the sub meta information indicative of the sub contents information about each program in a related manner.

The sub contents is of a variety of categories such as Web sites, CDs, DVDs, books, and tickets, for example. The above-mentioned storage block stores the meta information for making distinction between these categories. It should be noted that, instead of storing the above-mentioned meta information in its storage block, the screen display apparatus 101 may use the meta information received from the directory service server 106 or the contents service server 107.

As shown in FIG. 26C(b), the detail information shown in the second display area includes a list of book names associated with program B-2. It should be noted that the invention is not restricted to this configuration. For example, an image such as a banner advertisement of books may be displayed in the second display area.

When "Book B-2-2" is selected from the above-mentioned books, the first display area is reduced vertically, sliding in the left direction of the screen display block 508. Then, when the first display area is reduced, the partial acquisition block 510 partially acquires the programs having the same attribute as that of the program meta information included in the selected program B-2. For example, the program meta information is a title or name of a program.

Consequently, the first display area shows the programs having the same attribute as that of program B-2. As the first display area is reduced, the second display area also slides in the left direction. The third display area is allocated to the space resulted from the movement of the first display area and the second display area, the detail information associated with book "B-2-2" being shown in the newly allocated third display area.

The following describes a variation to the transitional operation of display areas according to the present embodiment of the invention with reference to FIGS. 27A and 27B. It should be noted that only the first display area is allocated to the screen display block 508 as the initial screen. However, the invention is not restricted to this configuration. For example, the first display area and the second display area may be allocated side by side as the initial screen.

Referring to FIG. 27A(a), the first display area is allocated to the screen display block 508 and EPG information is shown in the first display area. The EPG information includes program A-1, program A-2, . . . , program C-3.

In the above-mentioned programs, a plurality of selectable icons 600 or items such as banner advertisements are displayed. The user can understand the amount of the detail information associated with programs by the number of icons 600 or items.

As shown in FIG. 27A(a), when the user selects program B-2 among the programs included in the EPG information displayed in the first display area, the first display area is reduced and the second display area for displaying sub contents information such as detail information associated with program B-2 is allocated. It should be noted that, when the first display area is reduced, the size of the first display area is determined by referencing the display conditions on the basis of the information such as the size of image of the detail information shown in the second display area.

As shown in FIG. 27A(b), the first display area is reduced. Then, when the partial acquisition block 510 partially acquires program B-2, and program B-1 and program B-3 which are associated with program B-2 in terms of the common broadcasting station, the other programs disappear.

As shown in FIG. 27A(c), the reduced first display area slides in the direction of the arrow. It should be noted that, during the transition of the first display area, programs B-1 through B-3 may be slid so as to leave their persistence of vision, thereby making it easy to visually grasp the movement of the first display area, vividly impressing the user with the movement of the first display area.

As shown in FIG. 27B(a), the first display area is allocated to the screen display block 508 and EPG information is shown in the allocated first display area. The EPG information includes the program frames of program A-1, program A-2, . . . , program C-3.

In the above-mentioned programs, a plurality of selectable icons 600 or items such as banner advertisements are displayed. The user can understand the amount of the detail information associated with programs by the number of icons 600 or items.

As shown in FIG. 27B(a), when the user selects program B-2 for example among the programs included in the EPG information shown in the first display area, the first display area is reduced and the second display area for showing the sub contents information such as the detail information associated with the selected program B-2 is allocated. It should be noted that the size of the first display area is determined by referencing the display conditions on the basis of the information such as the size of image of the detail information shown in the second display area when the first display area is reduced.

As shown in FIG. 27B(b), the first display area is reduced. Then, when the partial acquisition block 510 partially acquires the selected program B-2, and program B-1 and program B-3 which are associated with program B-2 in terms of the common broadcasting station, the other programs (program A-1 through program C-3) move behind program B-1, program B-2, and program B-3 in a sliding manner.

Next, when the other programs acquire behind program B-1, program B-2, and program B-3, the reduced first display area slides in the direction of the arrow as shown in FIG. 27B(c). It should be noted that, during the transition of the first display area, programs B-1 through B-3 may be slid so as to leave their persistence of vision, thereby making it easy to visually grasp the movement of the first display area, vividly impressing the user with the movement of the first display area.

[Allocation Processing of Display Area]

Figure 28B:
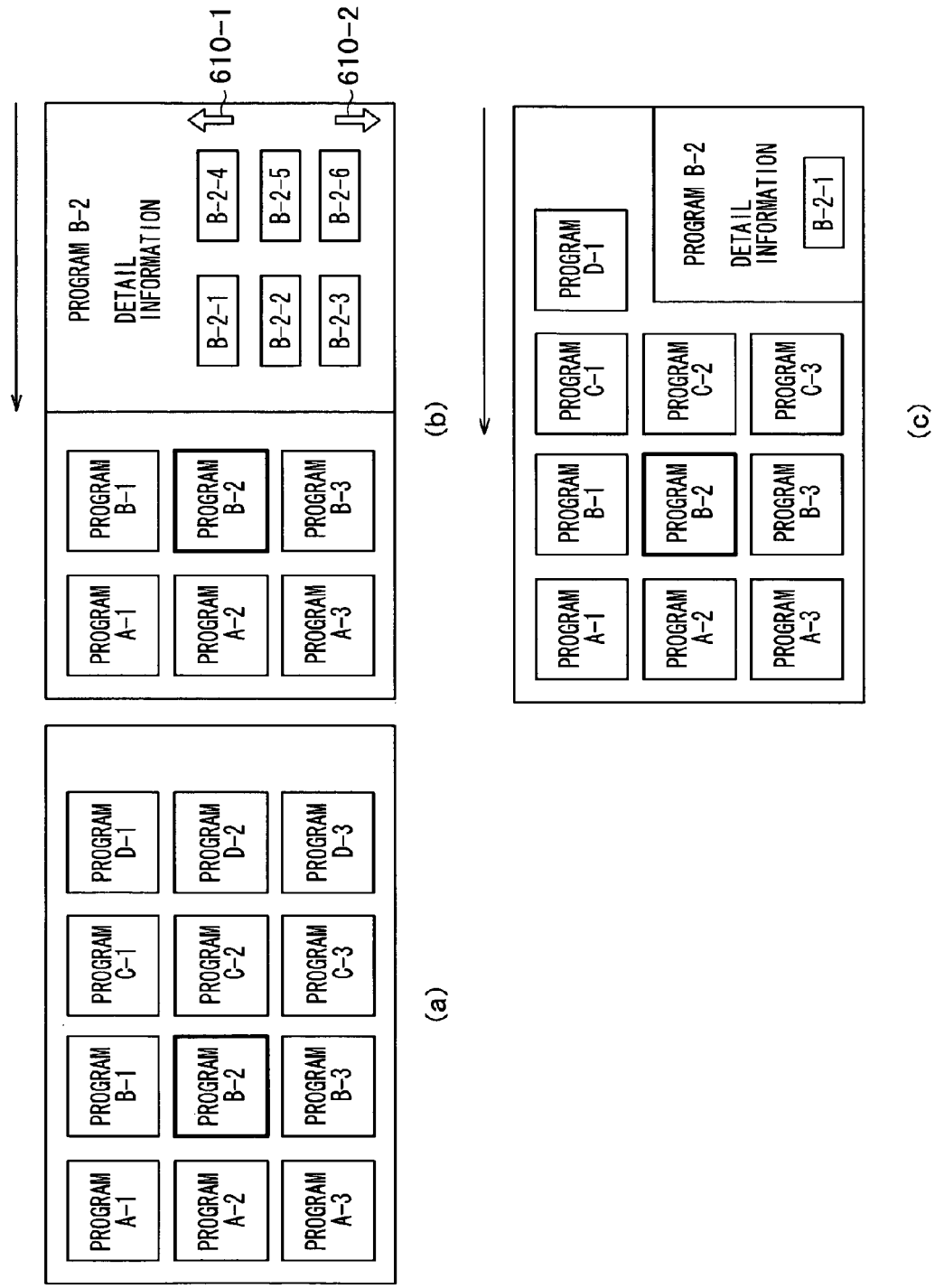

The following describes a variation to the display area allocation processing according to the present embodiment of the invention with reference to FIGS. 28A and 28B. FIGS. 28A and 28B schematically show the allocation processing of display area according to the present embodiment of the invention.

Referring to FIG. 28A(a), the first display area is allocated to the screen display block 508, in which EPG information is shown. The EPG information includes program frames of program A-1, program A-2, . . . , program C-3.

In the above-mentioned programs, a plurality of selectable icons 600 or items such as banner advertisements are displayed. The user can understand the amount of the detail information associated with programs by the number of icons 600 or items.

As shown in FIG. 28A(a), when the user selects program B-2 for example among the programs included in the EPG information shown in the first display area, the first display area is reduced and the second display area for showing the sub contents information such as the detail information associated with the selected program B-2 is allocated. It should be noted that the size of the first display area is determined by referencing the display conditions on the basis of the information such as the size of image of the detail information shown in the second display area when the first display area is reduced.

As shown in FIG. 28A(b), the first display area is reduced. Then, the partial acquisition block 510 acquires the selected program B-2 and the number of programs displayable in the determined first display area. At the same time, the display area control block 511 reduces the first display area, which moves in the left direction in a sliding manner.

Next, when the second display area is allocated, if the area size of the second display area which is the above-mentioned display condition has been determined, the display area control block 511 determines the number of programs to be displayed in the display area, the second display area showing the content information which is the detail information for example associated with program B-2. It should be noted that, as shown in FIG. 28A(b), if the area size of detail information necessary for display is greater than the size of the allocated second display area, a scroll icon 610-1 and a scroll icon 610-2 for scrolling the screen are displayed.

Scrolling the display screen of the screen display block 508 by means of the scroll icon 610-1 or the scroll icon 610-2 allows to display other content elements and icons 600 that are not seen. It should be noted that, if the scroll bar cannot be used, the content elements and icons 600 may be reduced instead to be displayed in the second display area.

Next, as shown in FIG. 28B(c), the first display area is allocated to the screen display block 508, in which EPG information is displayed. The EPG information includes the program frames of program A-1, program A-2, . . . , program C-3.

In the above-mentioned programs, a plurality of selectable icons 600 or items such as banner advertisements are displayed. The user can understand the amount of the detail information associated with programs by the number of icons 600 or items.

As shown in FIG. 28B(a), when the user selects program B-2 for example among the programs included in the EPG information shown in the first display area, the first display area is reduced and the second display area for showing the sub contents information such as the detail information associated with the selected program B-2 is allocated. It should be noted that the size of the first display area is determined by referencing the display conditions on the basis of the information such as the size of image of the detail information shown in the second display area.

As shown in FIG. 28B(b), the first display area is reduced. Then, the partial acquisition block 510 acquires the selected program B-2 and the number of programs displayable in the determined first display area. At the same time, the display area control block 511 reduces the first display area, which moves in the left direction in a sliding manner.

Next, when the second display area is allocated, the display area control block 511 determines the number of content elements to be displayed at a time in the second display area on the basis the restrictions such as the number of images included in the content elements displayable in the second area and the sizes of icons. In accordance with the determined number of images, the content information which is the detail information associated with program B-2 is displayed in the second display area. It should be noted that, as shown in FIG. 28B(b), if the area size of the detail information necessary for display is greater than the size of the allocated second display area, the scroll icon 610-1 and the scroll icon 610-2 are displayed.

Scrolling the display screen of the screen display block 508 by means of the scroll icon 610-1 or the scroll icon 610-2 allows to display other content elements and icons 600 that are not seen. It should be noted that, if the scroll bar cannot be used, the content elements and icons 600 may be reduced instead to be displayed in the second display area.

As shown in FIG. 28B(c), if a restriction is set as a display condition that only one content element is displayable in the second display area for example or if the number of content elements included in the detail information associated with program B-2 is only one, the display area generation block 509 allocates the second display area having a size enough for displaying the detail information including one content element.

As described and according to the invention, providing the association between the pieces of information displayed in a plurality of display areas visually facilitates the determination of the linking between the pieces of content information displayed in the display areas.

Displaying icons and items such as item names in a display area of an content element and linking them with the detail information of other categories or the like visually facilitates the determination of whether or not there exist child contents belonging to the layers below each content element, which further facilitates the access to these pieces of information.

The ECG facilitates the confirmation of the existence of the content which is linked to programs and the access to this content information.

When newly allocating display areas, selecting and displaying only a selected content element and the detail information closely associate therewith in a display area which is higher in layer than a display area to be allocated allow the confirmation the content elements of the upper layer, thereby easily understanding the association between the information of the upper layer and the information of the lower layer. At the same time, the display areas of the layers not required any further can be allocated to other layers from time to time.

With the ECG, if detail information is displayed, the display area of each layer are shown within one screen, so that, while looking at the detail information shown in each display area of any layer, it is easy to trace back the source information of any program and to return to the EPG display screen.

Each display area in each layer can be dynamically reduced or enlarged in accordance with the amount of the content information displayed in each display area, automatically controlling each display area of each layer so as to be accommodated in one screen.

In the reduction, enlargement, movement, or new allocation of display areas, the transition states of these operations are visually displayed such as sliding, thereby facilitating the understanding of the association with previous items while the display state is changing.

The information over many layers can be efficiently displayed in a limited screen area.

While the preferred embodiments of the present invention have been described using specific terms, such description is for illustrative purposes only, and it is to be understood that changes and variations may be made without departing from the spirit or scope of the appended claims.

The above-mentioned embodiments have been described by use of an example in which EPG information is displayed in the first display area; however, the invention is not restricted to this configuration so far as areas which can display content information are allocated. For example, instead of EPG information, portal site information for searching for commercial products (or goods) such as books, music, and movies may be displayed in the first display area.

The above-mentioned embodiments have been described by use of an example in which each of the components of the directory service server 106, the contents service server 107, and the screen display apparatus 101 is implemented by hardware; however, the invention is not restricted to this configuration. For example, each of the components may be implemented by software.

What is claimed is:

1. A display control apparatus for displaying content information on a display screen, comprising:
   a display screen, implemented by hardware, for displaying content information;
   a first information acquisition block for acquiring first-level detail information, wherein said first-level detail information is related to said content information;
   a display control block for controlling the display of information related to the content information on the display screen, wherein the display control block displays the content information including a plurality of icons in a first display area of the display screen, wherein within each icon of said plurality of icons is a display of a plurality of categories associated with said first-level detail information;
   a first selection accept block for accepting a first selection of a category within a first icon of the plurality of icons, wherein upon acceptance of said first selection, said display control block:
      adds a second display area to the display screen; and
      displays said first-level detail information in the second display area corresponding to said first selection;
   a second information acquisition block for acquiring second-level detail information, wherein said second-level detail information is related to said first selection and includes a list of at least one item; and
   a second selection accept block for accepting a second selection of an item from said list of at least one item,
      wherein upon acceptance of said second selection, said display control block:
      reduces a size of at least one of the first display area or the second display area being displayed on the screen to accommodate a third display area on the display screen;
      displays in the first display area at least the category of the first icon corresponding to the first selection and at least another category of the first icon having an attribute value equal to an attribute value of the category of the first icon when the display control block reduces the first display area;
      adds the third display area to the display screen; and
      displays said second-level detail information corresponding to said second selection in the third-display area,
      wherein said first display area displays said content information, said second display area displays said first-level detail information corresponding to said first selection, and said third display area displays said second-level detail information corresponding to said second selection concurrently on the display screen.

2. The display control apparatus according to claim 1, wherein when the category corresponding to the first selection represents content related name information, said first-level detail information is a list of names related to said content information.

3. The display control apparatus according to claim 1, wherein said display control block arranges said plurality of categories within the plurality of icons in accordance with category priorities.

4. The display control apparatus according to claim 1, wherein when the category corresponding to the first selection represents showings information, said first-level detail information is a list of times for showings of said content information.

5. The display control apparatus according to claim 1, wherein when the category corresponding to the first selection represents purchasing information, said first-level detail information is purchasing information related to said content information.

6. The display control apparatus according to claim 1, wherein when the category corresponding to the first selection represents related products or programs, said first-level detail information is products or programs related to said content information.

7. A method of displaying content information on a display screen, comprising:
   acquiring first-level detail information, wherein said first-level detail information is related to said content information;
   displaying said content information including a plurality of icons associated with categories of said first-level detail information in a first display area of the display screen, wherein within each icon of said plurality of icons is a display of a plurality of categories associated with said first-level detail information;
   accepting a first selection of a category within a first icon of the plurality of icons;
   adding a second display area to the display screen upon acceptance of said first selection;
   displaying one or more items associated with said first-level detail information in the second display area, corresponding to said first selection;
   acquiring second-level detail information, wherein said second-level detail information is related to said first selection;
   accepting a second selection of at least one of said items;
   reducing a size of at least one of the first display area or the second display area being displayed on the screen to accommodate a third display area on the screen;
   displaying in the first display area at least the category of the first icon corresponding to the first selection and at least another category of the first icon having an attribute value equal to an attribute value of the category of the first icon when the size of the first display area is reduced;
   adding the third display area to the display screen upon acceptance of said second selection; and
   displaying said second-level detail information corresponding to said second selection in the third display area, wherein
      said content information, first-level detail information corresponding to said first selection, and second-level detail information corresponding to said second selection are displayed concurrently on the display screen.

8. The method according to claim 7, wherein when the category corresponding to the first selection represents content related name information, said first-level detail information is a list of names related to said content information.

9. The method according to claim 7, including arranging said plurality of categories within said plurality of icons in accordance with category priorities.

10. The method according to claim 7, wherein when the category corresponding to the first selection represents showings information, said first-level detail information is a list of times for showings of said content information.

11. The method according to claim 7, wherein when the category corresponding to the first selection represents purchasing information, said first-level detail information is purchasing information related to said content information.

12. The method according to claim 7, wherein when the category corresponding to the first selection represents related products or programs, said first-level detail information is other products or programs related to said content information.

13. The display control apparatus of claim 1, wherein said second-level detailed information includes at least one additional information piece, wherein the at least one additional information piece is a child of said second selection of the first-level detail information, and wherein the at least one additional information piece is not a child of said selection of the content information.

14. The method of claim 7, wherein said second-level detailed information includes at least one additional information piece, wherein the at least one additional information piece is a child of said second selection of the first-level detail information, and wherein the at least one additional information piece is not a child of said selection of the content information.

15. The display control apparatus of claim 2, wherein said second-level detail information is a list of items related to at least one name in said list of names corresponding to said second selection, and wherein said list of items contains at least one item not a child of said selection of the content information.

16. The method of claim 8, wherein said second-level detailed information is a list of items related to at least one name in said list of names corresponding to said second selection, and wherein said list of items contains at least one item not a child of said selection of the content information.

17. The display control apparatus of claim 1, wherein said second-level detailed information contains an icon which when selected facilitates the purchasing of an item related to the second selection, wherein the icon is not a child of said selection of the content information.

18. The method of claim 7, wherein said second-level detailed information contains an icon which when selected facilitates the purchasing of an item related to the second selection, wherein the icon is not a child of said selection of the content information.

* * * * *